United States Patent
Qiao et al.

(10) Patent No.: US 12,508,936 B2
(45) Date of Patent: Dec. 30, 2025

(54) POLICY AND CHARGING CONTROL FOR A VEHICLE TERMINAL

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Jinsook Ryu, Oakton, VA (US); Peyman Talebi Fard, Vienna, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 352 days.

(21) Appl. No.: 18/060,738

(22) Filed: Dec. 1, 2022

(65) Prior Publication Data

US 2023/0122010 A1  Apr. 20, 2023

Related U.S. Application Data

(62) Division of application No. 17/078,298, filed on Oct. 23, 2020, now abandoned.

(Continued)

(51) Int. Cl.
*B60L 53/66* (2019.01)
*B60L 53/68* (2019.01)
(Continued)

(52) U.S. Cl.
CPC ............. *B60L 53/665* (2019.02); *B60L 53/68* (2019.02); *H04W 4/40* (2018.02); *H04W 4/42* (2018.02);

(Continued)

(58) Field of Classification Search
CPC ...... B60L 2240/72; B60L 53/65; B60L 53/66; B60L 53/665; B60L 53/67; B60L 53/68;
(Continued)

(56) References Cited

U.S. PATENT DOCUMENTS

| 7,545,761 B1 | 6/2009 | Kalbag |
| 9,113,290 B2 | 8/2015 | Bhalla |

(Continued)

FOREIGN PATENT DOCUMENTS

WO  2011/115991 A1  9/2011

OTHER PUBLICATIONS

3rd Generation Partnership Project; Technical Specification Group Services and System Aspects; Procedures for the 5G System; Stage 2' 3GPP TS 23.502 V15.6.0 (Jun. 2019) (Year: 2019).*

(Continued)

*Primary Examiner* — Kashif Siddiqui
(74) *Attorney, Agent, or Firm* — Xin Gao; Kavon Nasabzadeh; Jacob L. Mangan

(57) ABSTRACT

A wireless device of a vehicle sends, to an access and mobility function (AMF), a registration request message requesting registration of the wireless device, the registration request message comprising a wireless device identity of the wireless device. The wireless device sends, to a SMF, a message requesting establishment of a packet data unit (PDU) session of the wireless device, wherein the message comprises a vehicle identity of the vehicle, wherein the vehicle identity is different from the wireless device identity. The wireless device receives, from the SMF, a response message for establishment of the PDU session.

20 Claims, 30 Drawing Sheets

Related U.S. Application Data

(60) Provisional application No. 62/925,472, filed on Oct. 24, 2019.

(51) Int. Cl.
    *H04W 4/40*     (2018.01)
    *H04W 4/42*     (2018.01)
    *H04W 4/44*     (2018.01)
    *H04W 4/46*     (2018.01)
    *H04W 4/48*     (2018.01)

(52) U.S. Cl.
    CPC ............... *H04W 4/44* (2018.02); *H04W 4/46* (2018.02); *H04W 4/48* (2018.02); *B60L 2240/72* (2013.01)

(58) Field of Classification Search
    CPC ........... H04W 4/40; H04W 4/42; H04W 4/44; H04W 4/46; H04W 4/48; Y02T 10/70; Y02T 10/7072; Y02T 10/72; Y02T 90/12; Y02T 90/16; Y02T 90/167; Y04S 30/12; Y04S 30/14
    See application file for complete search history.

(56) References Cited

U.S. PATENT DOCUMENTS

| | | | | |
|---|---|---|---|---|
| 10,409,867 | B1 * | 9/2019 | Von Busch | G06F 16/951 |
| 12,004,111 | B2 * | 6/2024 | Shan | H04W 4/40 |
| 2012/0262112 | A1 | 10/2012 | Ross | |
| 2012/0309455 | A1 | 12/2012 | Klose et al. | |
| 2015/0149221 | A1 | 5/2015 | Tremblay | |
| 2019/0289447 | A1 * | 9/2019 | Zhou | H04W 76/14 |
| 2019/0313359 | A1 * | 10/2019 | Lee | H04W 76/14 |
| 2020/0029268 | A1 * | 1/2020 | Russell | H04W 12/06 |
| 2021/0385642 | A1 * | 12/2021 | Di Girolamo | H04W 8/18 |
| 2022/0248363 | A1 * | 8/2022 | Ryu | H04W 60/04 |
| 2022/0369363 | A1 * | 11/2022 | Ferdi | H04W 4/44 |
| 2023/0319529 | A1 * | 10/2023 | Alvarez | H04W 4/44 |
| | | | | 455/414.1 |

OTHER PUBLICATIONS

3GPP TS 22.016 V15.0.0 (Jun. 2018); Technical Specification; 3rd Generation Partnership Project; Technical Specification Group Services and System Aspects; International Mobile station Equipment Identities (IMEI); (Release 15).

3GPP TS 22.261 V16.8.0 (Jun. 2019); Technical Specification; 3rd Generation Partnership Project; Technical Specification Group Services and System Aspects; Service requirements for the 5G system; Stage 1; (Release 16).

3GPP TR 22.822 V16.0.0 (Jun. 2018); Technical Report; 3rd Generation Partnership Project; Technical Specification Group Services and System Aspects; Study on using Satellite Access in 5G; Stage 1; (Release 16).

3GPP TS 23.003 V15.7.0 (Jun. 2019); Technical Specification; 3rd Generation Partnership Project; Technical Specification Group Core Network and Terminals; Numbering, addressing and identification; (Release 15).

3GPP TS 23.203 V16.1.0 (Jun. 2019); Technical Specification; 3rd Generation Partnership Project; Technical Specification Group Services and System Aspects; Policy and charging control architecture; (Release 16).

3GPP TS 23.285 V16.1.0 (Sep. 2019); Technical Specification; 3rd Generation Partnership Project; Technical Specification Group Services and System Aspects; Architecture enhancements for V2X services; (Release 16).

3GPP TS 24.334 V15.2.0 (Sep. 2018); Technical Specification; 3rd Generation Partnership Project; Technical Specification Group Core Network and Terminals; Proximity-services (ProSe) User Equipment (UE) to ProSe function protocol aspects; Stage 3; (Release 15).

3GPP TS 24.386 V15.2.0 (Dec. 2018); Technical Specification; 3rd Generation Partnership Project; Technical Specification Group Core Network and Terminals; User Equipment (UE) to V2X control function; protocol aspects; Stage 3; (Release 15).

3GPP TS 24.501 V16.2.0 (Sep. 2019); Technical Specification; 3rd Generation Partnership Project; Technical Specification Group Core Network and Terminals; Non-Access-Stratum (NAS) protocol for 5G System (5GS); Stage 3; (Release 16).

3GPP TS 32.240 V16.0.0 (Mar. 2019); Technical Specification; 3rd Generation Partnership Project; Technical Specification Group Services and System Aspects; Telecommunication management; Charging management; Charging architecture and principles; (Release 16).

3GPP TS 32.251 V15.5.0 (Jun. 2019); Technical Specification; 3rd Generation Partnership Project; Technical Specification Group Services and System Aspects; Telecommunication management; Charging management; Packet Switched (PS) domain charging; (Release 15).

3GPP TS 32.255 V16.1.0 (Jun. 2019); Technical Specification; 3rd Generation Partnership Project; Technical Specification Group Services and System Aspects; Telecommunication management; Charging management; 5G data connectivity domain charging; stage 2; (Release 16).

3GPP TS 32.256 V0.3.0 (Jul. 2019); Technical Specification; 3rd Generation Partnership Project; Technical Specification Group Services and System Aspects; Charging management; 5G connection and mobility domain charging; stage 2; (Release 16).

3GPP TS 32.260 V16.0.0 (Mar. 2019); Technical Specification; 3rd Generation Partnership Project; Technical Specification Group Services and System Aspects; Telecommunication management; Charging management; IP Multimedia Subsystem (IMS) charging; (Release 16).

3GPP TS 32.272 V15.0.0 (Jun. 2018); Technical Specification; 3rd Generation Partnership Project; Technical Specification Group Services and System Aspects; Telecommunication management; Charging management; Push-to-talk over Cellular (PoC) charging; (Release 15).

3GPP TS 32.275 V15.0.0 (Jun. 2018); Technical Specification; 3rd Generation Partnership Project; Technical Specification Group Services and System Aspects; Telecommunication management; Charging management; MultiMedia Telephony (MMTel) charging; (Release 15).

3GPP TS 32.277 V15.1.0 (Jun. 2018); Technical Specification; 3rd Generation Partnership Project; Technical Specification Group Services and System Aspects; Telecommunication management; Charging management; Proximity-based Services (ProSe) charging; (Release 15).

3GPP TS 32.290 V16.1.0 (Jun. 2019); Technical Specification; 3rd Generation Partnership Project; Technical Specification Group Services and System Aspects; Telecommunication management; Charging management; 5G system; Services, operations and procedures of ; charging using Service Based Interface (SBI); (Release 16).

3GPP TS 32.291 V16.0.0 (Jun. 2019); Technical Specification; 3rd Generation Partnership Project; Technical Specification Group Services and System Aspects; Telecommunication management; Charging management; 5G system, charging service; Stage 3; (Release 16).

3GPP TS 32.297 V16.0.0 (Sep. 2019); Technical Specification; 3rd Generation Partnership Project; Technical Specification Group Services and System Aspects; Telecommunication management; Charging management; Charging Data Record (CDR) file format and transfer, (Release 16).

3GPP TS 32.298 V16.1.0 (Jun. 2019); Technical Specification; 3rd Generation Partnership Project; Technical Specification Group Services and System Aspects; Telecommunication management; Charging management; Charging Data Record (CDR) parameter description; (Release 16).

3GPP TS 32.299 V16.1.0 (Jun. 2019); Technical Specification; 3rd Generation Partnership Project; Technical Specification Group Ser-

(56) References Cited

OTHER PUBLICATIONS vices and System Aspects; Telecommunication management; Charging management; Diameter charging applications; (Release 16).
3GPP TS 38.331 V15.7.0 (Sep. 2019); Technical Specification; 3rd Generation Partnership Project; Technical Specification Group Radio Access Network; NR; Radio Resource Control (RRC) protocol specification; (Release 15).
3GPP TS 23.3030 V15.1.0 (Sep. 2018) Technical Specification; 3rd Generation Partnership Project; Technical Specification Group Services and System Aspects; Proximity-based services (ProSe); Stage 2 (Release 15).
AT&T Connected Car Wi-Fi; AT&T Connected Car and Telematics Platform; p. 1-7; Sep. 16, 2019.
International Telecommunication Union; ITU-T Draft Technical Report; Telecommunication Standardization Sector of TU; Jul. 19, 2019.
Split Charging & Revenue Management Capabilities for Connected Car Services;GSMA Connected Living programme; mAutomotive; Feb. 2013; Version 1.0.
Vehicle Identification Number; Wikipedia; Sep. 25, 2019; p. 1-12.
Vehicle Identification Numbers (VIN Codes)/World Manufacturer Identifier (WMI); Wikipedia; Sep. 25, 2019; p. 1-11.

\* cited by examiner

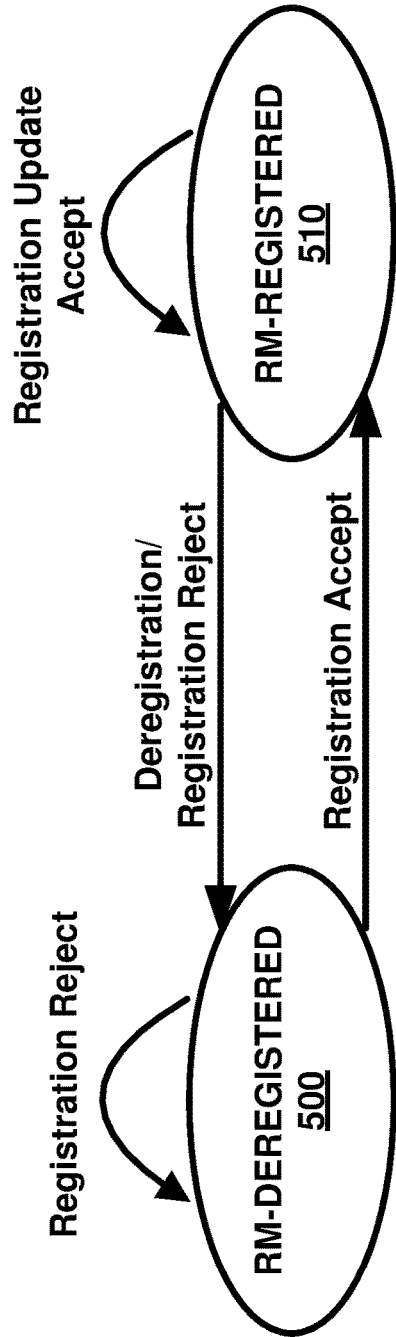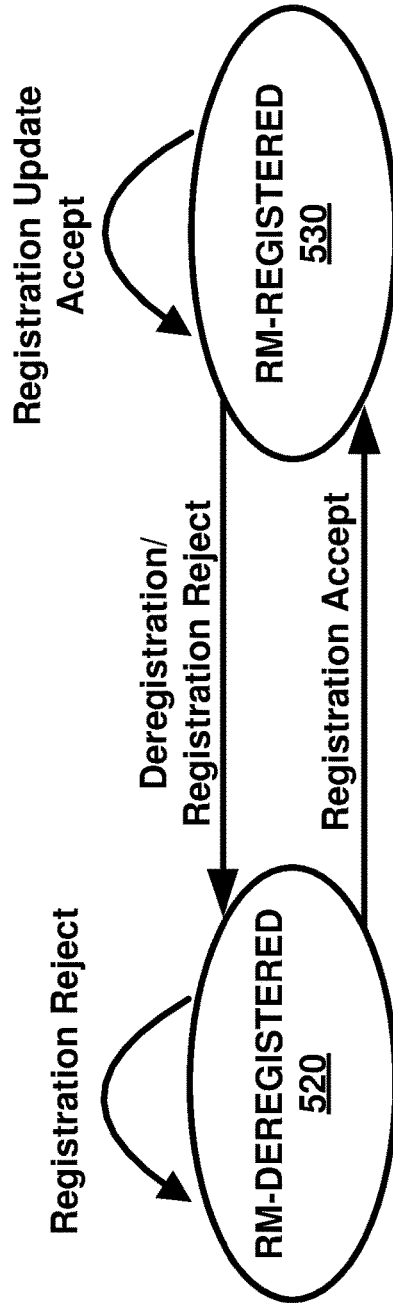

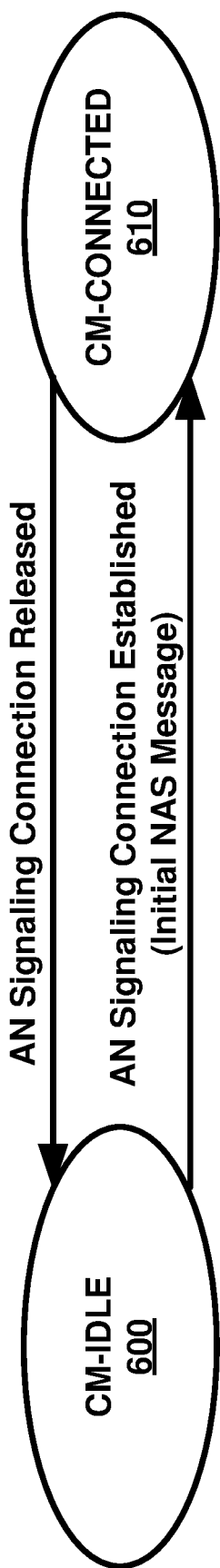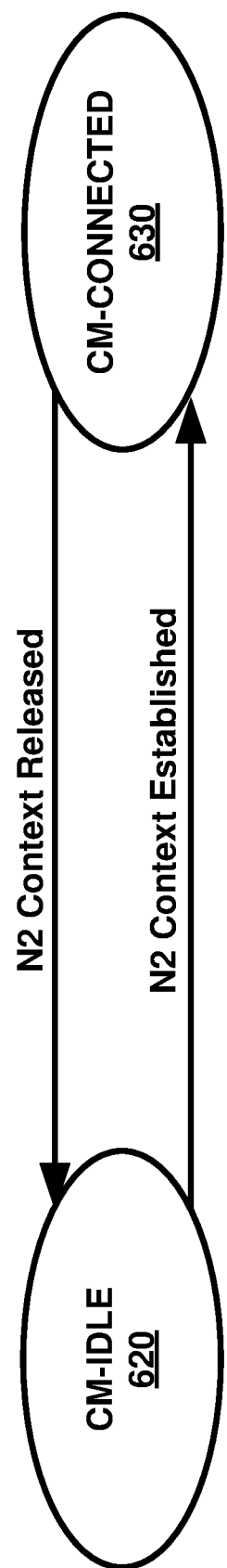
FIG. 6A CM State Transition in UE
FIG. 6B CM State Transition in AMF

Vehicle identification number

| Standard | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | | | | | | VDS | | | | | | | VIS | | | | |
| ISO 3779 | World manufacturer identifier | | | | | | | | | | | | | | | | |
| European Union more than 500 vehicles/year | World manufacturer identifier | | | Indication of "the general characteristics of the vehicle" | | | | | | Indication that provides "clear identification of a particular vehicle" | | | | | | | |
| European Union 500 or fewer vehicles/year | World manufacturer identifier | | 9 | Indication of "the general characteristics of the vehicle" | | | | | | Indication that provides "clear identification of a particular vehicle" | | | | | | | |
| North America more than 2000 vehicles/year | World manufacturer identifier | | | Vehicle attributes | | | | | Check digit | Model year | Plant code | Sequential number | | | | | |
| North America 2000 or fewer vehicles/year | World manufacturer identifier | | 9 | Vehicle attributes | | | | | Check digit | Model year | Plant code | Manufacturer identifier | | | Sequential number | | |

FIG. 16

Example REGISTRATION REQUEST message content

| Information Element | Type/Reference | Presence | Format | Length |
|---|---|---|---|---|
| Extended protocol discriminator | Extended Protocol discriminator | M | V | 1 |
| Security header type | Security header type | M | V | 1/2 |
| Spare half octet | Spare half octet | M | V | 1/2 |
| Registration request message identity | Message type | M | V | 1 |
| 5GS registration type | 5GS registration type | M | V | 1/2 |
| 5GS mobile identity | 5GS mobile identity | M | LV-E | 6-n |
| Non-current native NAS key set identifier | NAS key set identifier | O | TV | 1 |
| 5GMM capability | 5GMM capability | O | TLV | 3-15 |
| UE security capability | UE security capability | O | TLV | 4-10 |
| Requested NSSAI | NSSAI | O | TLV | 4-74 |
| Last visited registered TAI | 5GS tracking area identity | O | TV | 7 |
| Network slicing indication | Network slicing indication | O | TV | 1 |
| NAS message container | NAS message container | O | TLV-E | 4-n |
| Vehicle Parameter | Vehicle Identification Numbers (VIN) | O | TLV | 4-n |

Example VIN content

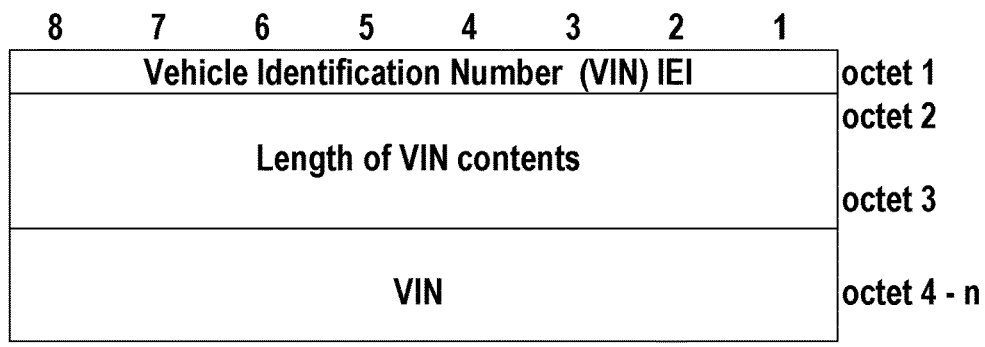

FIG. 20

Example PDU SESSION ESTABLISHMENT REQUEST message content

| Information Element | Type/Reference | Presence | Format | Length |
|---|---|---|---|---|
| Extended protocol discriminator | Extended protocol discriminator | M | V | 1 |
| PDU session ID | PDU session identity | M | V | 1 |
| PTI | Procedure transaction identity | M | V | 1 |
| PDU SESSION ESTABLISHMENT REQUEST message identity | Message type | M | V | 1 |
| Integrity protection maximum data rate | Integrity protection maximum data rate | M | V | 2 |
| PDU session type | PDU session type | O | TV | 1 |
| SSC mode | SSC mode | O | TV | 1 |
| 5GSM capability | 5GSM capability | O | TLV | 3-15 |
| Maximum number of supported packet filters | Maximum number of supported packet filters | O | TV | 3 |
| Extended protocol configuration options | Extended protocol configuration options | O | TLV-E | 4-65538 |
| Vehicle Parameter | Vehicle Identification Numbers (VIN) | O | TLV | 4-n |

Example VIN content

| 8 | 7 | 6 | 5 | 4 | 3 | 2 | 1 | |
|---|---|---|---|---|---|---|---|---|
| colspan=8 Vehicle Identification Number (VIN) IEI | | | | | | | | octet 1 |
| colspan=8 Length of VIN contents | | | | | | | | octet 2 |
| | | | | | | | | octet 3 |
| colspan=8 VIN | | | | | | | | octet 4 - n |

FIG. 21

Example RRCSetupComplete message

```
-- ASN1START
-- TAG-RRCSETUPCOMPLETE-START

RRCSetupComplete ::=        SEQUENCE {
  rrc-TransactionIdentifier    RRC-TransactionIdentifier,
  criticalExtensions           CHOICE {
    rrcSetupComplete             RRCSetupComplete-IEs,
    criticalExtensionsFuture     SEQUENCE {}
  }
}

RRCSetupComplete-IEs ::=    SEQUENCE {
  selectedPLMN-Identity        INTEGER (1..maxPLMN),
  registeredAMF                RegisteredAMF                        OPTIONAL,
  vehicleInformation           parameter based on VIN               OPTIONAL,
  guami-Type                   ENUMERATED {native, mapped}          OPTIONAL,
  s-NSSAI-List     SEQUENCE (SIZE (1..maxNrofS-NSSAI)) OF S-NSSAI
OPTIONAL,
  dedicatedNAS-Message         DedicatedNAS-Message,
  ng-5G-S-TMSI-Value           CHOICE {
    ng-5G-S-TMSI                 NG-5G-S-TMSI,
    ng-5G-S-TMSI-Part2           BIT STRING (SIZE (9))
  }                                                                 OPTIONAL,
  lateNonCriticalExtension     OCTET STRING                         OPTIONAL,
  nonCriticalExtension         SEQUENCE{}                           OPTIONAL
}

RegisteredAMF ::=           SEQUENCE {
  plmn-Identity                PLMN-Identity                        OPTIONAL,
  amf-Identifier               AMF-Identifier
} parameter based on VIN ::=       SEQUENCE {
  world-manufacturer-identifier  WMI       OPTIONAL,
  plant-code                     Plant-Code OPTIONAL,
}

-- TAG-RRCSETUPCOMPLETE-STOP
-- ASN1STOP
```

FIG. 29

POLICY AND CHARGING CONTROL FOR A VEHICLE TERMINAL

CROSS-REFERENCE TO RELATED APPLICATIONS

This application is a division of U.S. patent application Ser. No. 17/078,298, filed Oct. 23, 2020, which claims the benefit of U.S. Provisional Application No. 62/925,472, filed Oct. 24, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 16 is a diagram depicting an example vehicle identification number (VIN) as per an aspect of an example embodiment of the present disclosure.

FIG. 20 is a diagram depicting an example REGISTRATION REQUEST message content and an example VIN content as per an aspect of an example embodiment of the present disclosure.

FIG. 21 is a diagram depicting an example PDU SESSION ESTABLISHMENT REQUEST message and an example VIN content as per an aspect of an example embodiment of the present disclosure.

FIG. 29 is a diagram depicting an example RRCSetupComplete message as per an aspect of an example embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to policy and charging control for Vehicle Terminal (e.g. for 5G or future communication system). Throughout the present disclosure, UE, wireless device, vehicle terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
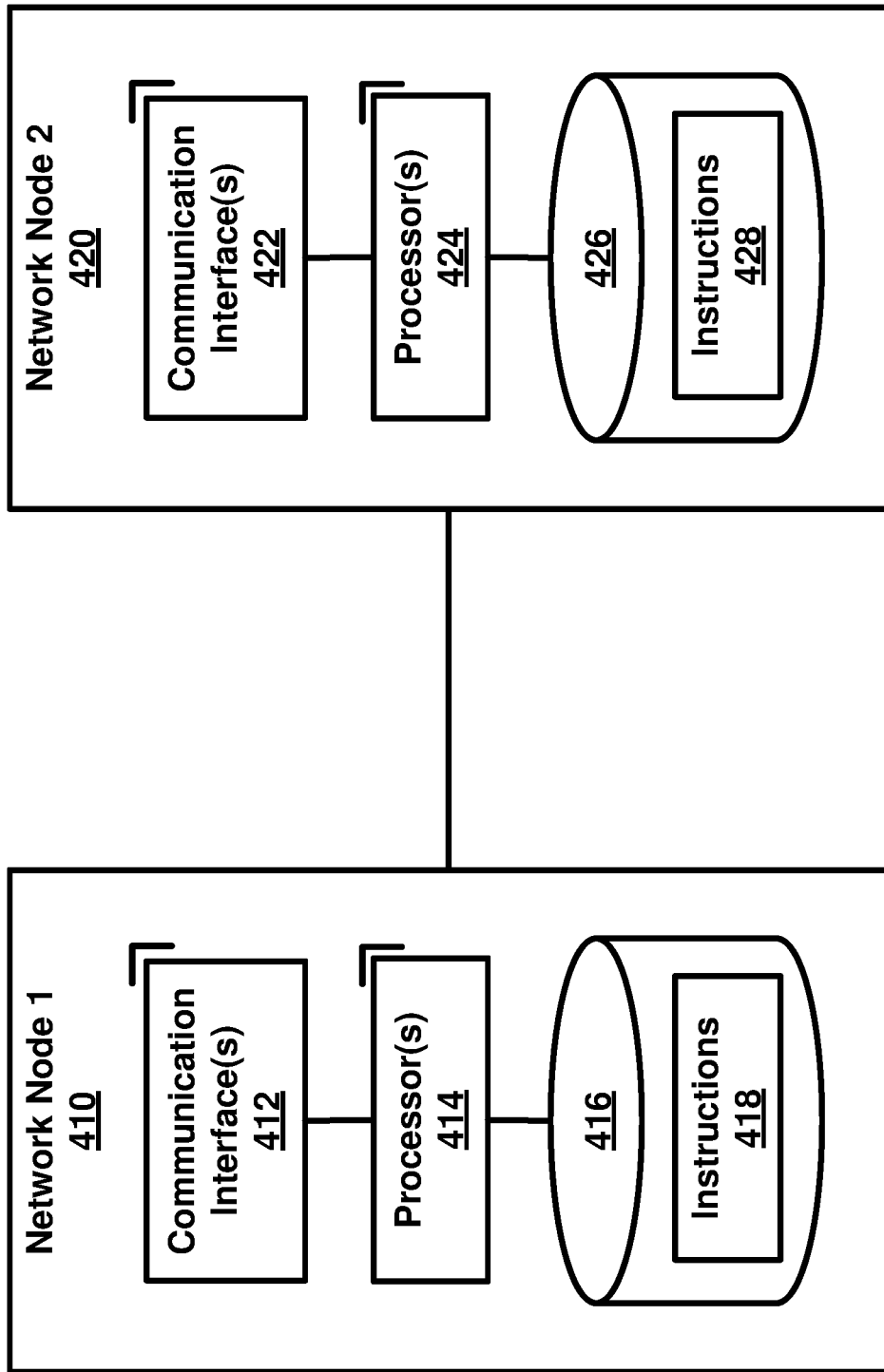
FIG. 4 is a system diagram of an example wireless device as per an aspect of an embodiment of the present disclosure.

Throughout the present disclosure, AMF, SMF, UPF, PCF, CHF, PGW, PCRF, OCS, OFCS are example network functions which may be implemented either as a network element on a dedicated hardware, and/or a network node as depicted FIG. 4, or as a software instance running on a dedicated hardware and/or shared hardware, or as a virtualized function instantiated on an appropriate platform.

Figure 1:
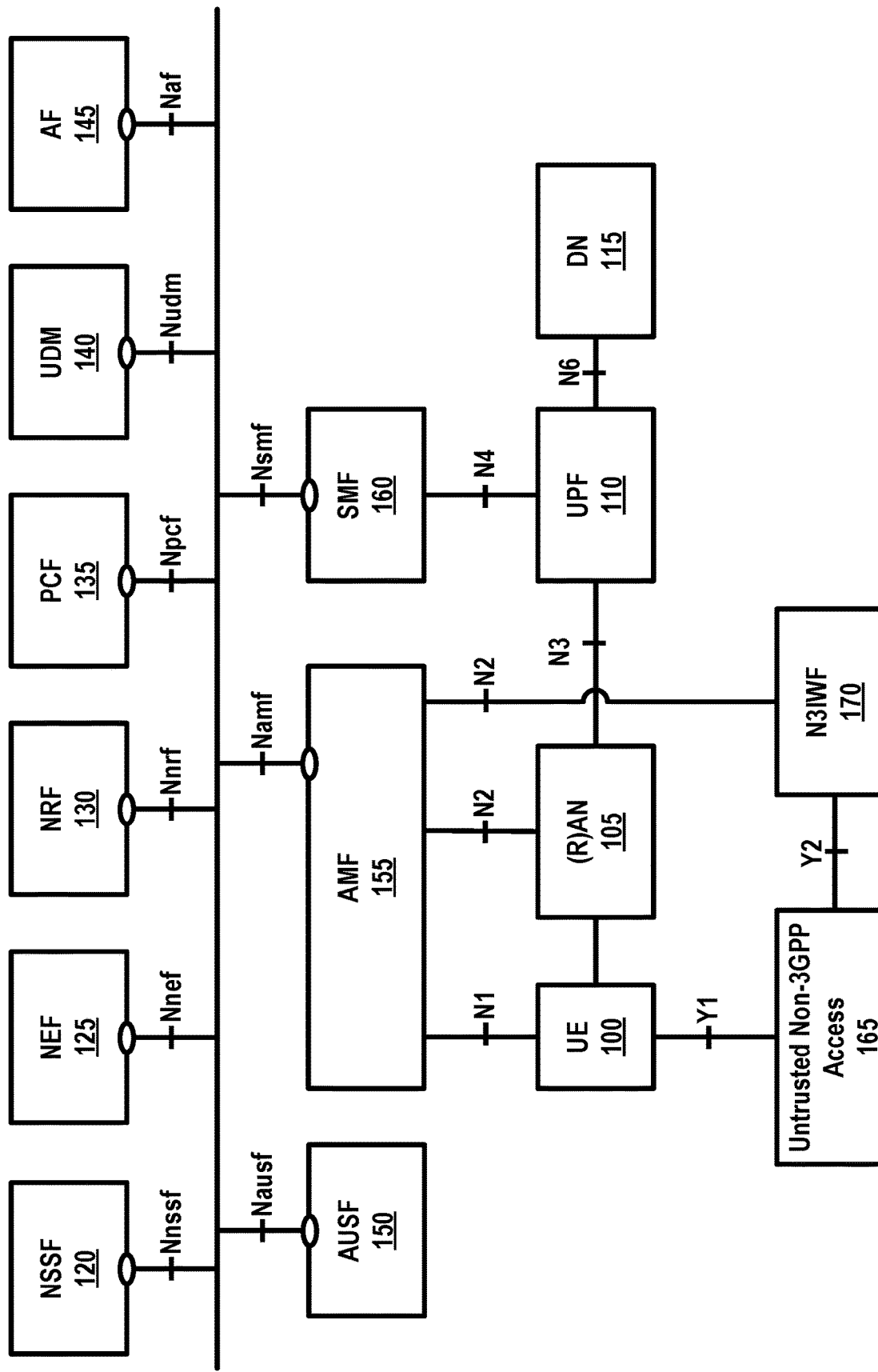
FIG. 1 is a diagram of an example 5G system architecture as per an aspect of an embodiment of the present disclosure.
Figure 2:
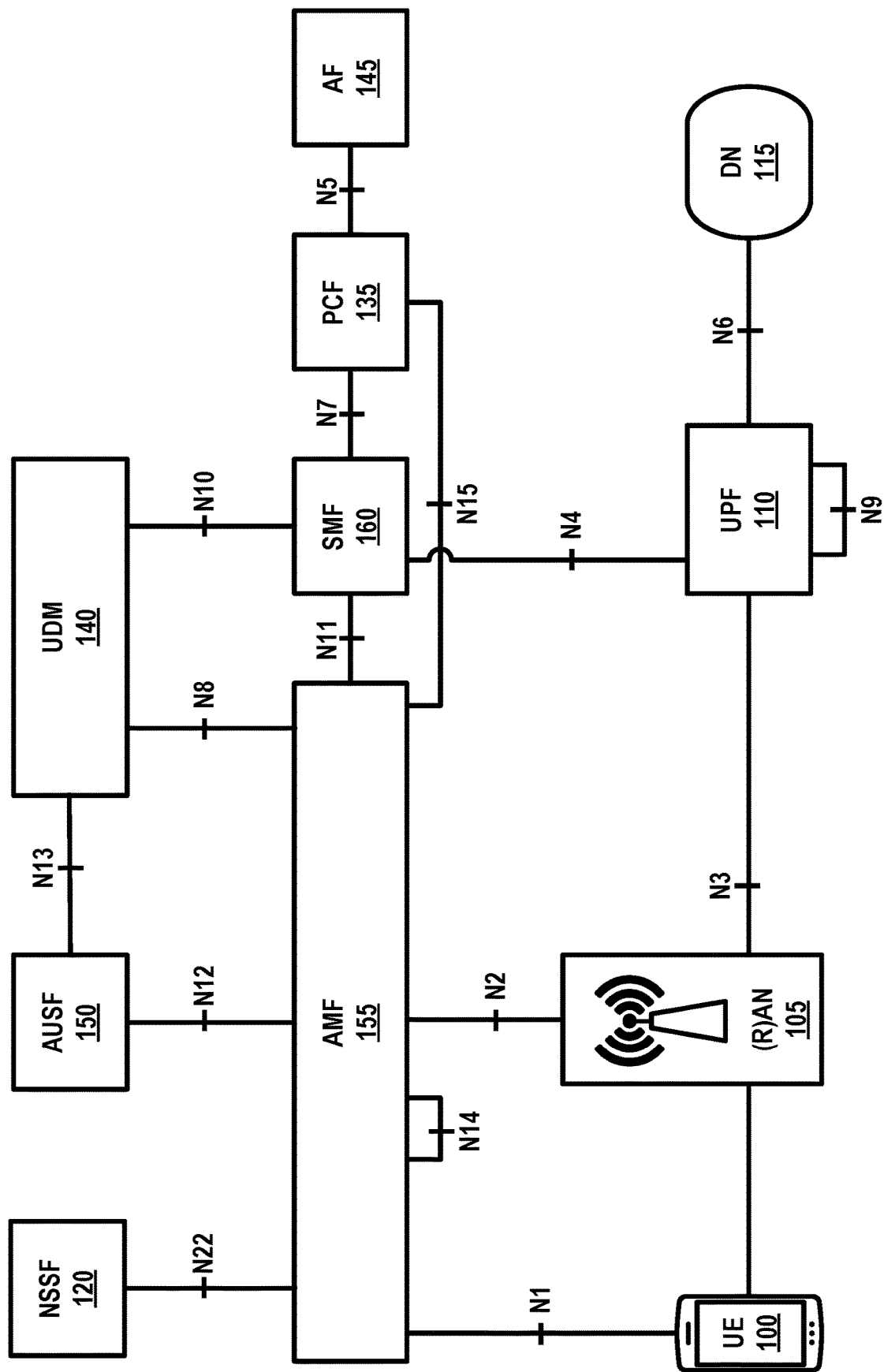
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
CCNF Common Control Network Functions
CDR Charging Data Record
CHF Charging Function
CIoT Cellular IoT
CN Core Network
CP Control Plane C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization and Accounting
DNN Data Network Name
DTMB Digital Terrestrial Multimedia Broadcast
eNodeB evolved Node B
EPS Evolved Packet System
E-UTRAN Evolved Universal Terrestrial Radio Access Network
FDD Frequency Division Duplex
FQDN Fully Qualified Domain Name
F-TEID Fully Qualified TEID
GPSI Generic Public Subscription Identifier
GTP GPRS Tunneling Protocol
GUTI Globally Unique Temporary Identifier
GW Gateway
HTTP Hypertext Transfer Protocol
ID Identifier
IMEI International Mobile Equipment Identity
IMEI DB IMEI Database
IMS IP Multimedia core network Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
LI Lawful Intercept
LAN local area network
MAC Media Access Control
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non Access Stratum
NAT Network address translation
NB-IoT Narrow Band IoT
NEF Network Exposure Function
NF Network Function
NGAP Next Generation Application Protocol
NR New Radio
NG-RAN NR Radio Access Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
PCC Policy and Charging Control
PCF Policy Control Function
PCRF Policy and Charging Rules Function
PDN Packet Data Network
PDU Packet Data Unit
PEI Permanent Equipment Identifier
PGW PDN Gateway
PLMN Public Land Mobile Network
ProSe Proximity-based Services
QFI QoS Flow Identifier
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SEA Security Anchor Function
SGW Serving Gateway
SCM Security Context Management
SM Session Management
SMF Session Management Function
SMSF SMS Function
S-NSSAI Single Network Slice Selection Assistance information
SS Synchronization Signal
SSC Session and Service Continuity
SUCI Served User Correlation ID
SUPI Subscriber Permanent Identifier
TA Tracking Area
TAI Tracking Area Identity
TCP Transmission Control Protocol
TEID Tunnel Endpoint Identifier
UCMF UE radio Capability Management Function
UDR Unified Data Repository
UDM Unified Data Management
UDP User Datagram Protocol
UE User Equipment
UL Uplink
UL CL Uplink Classifier
UPF User Plane Function
V2X Vehicle-To-Everything
WLAN Wireless Local Area Network
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
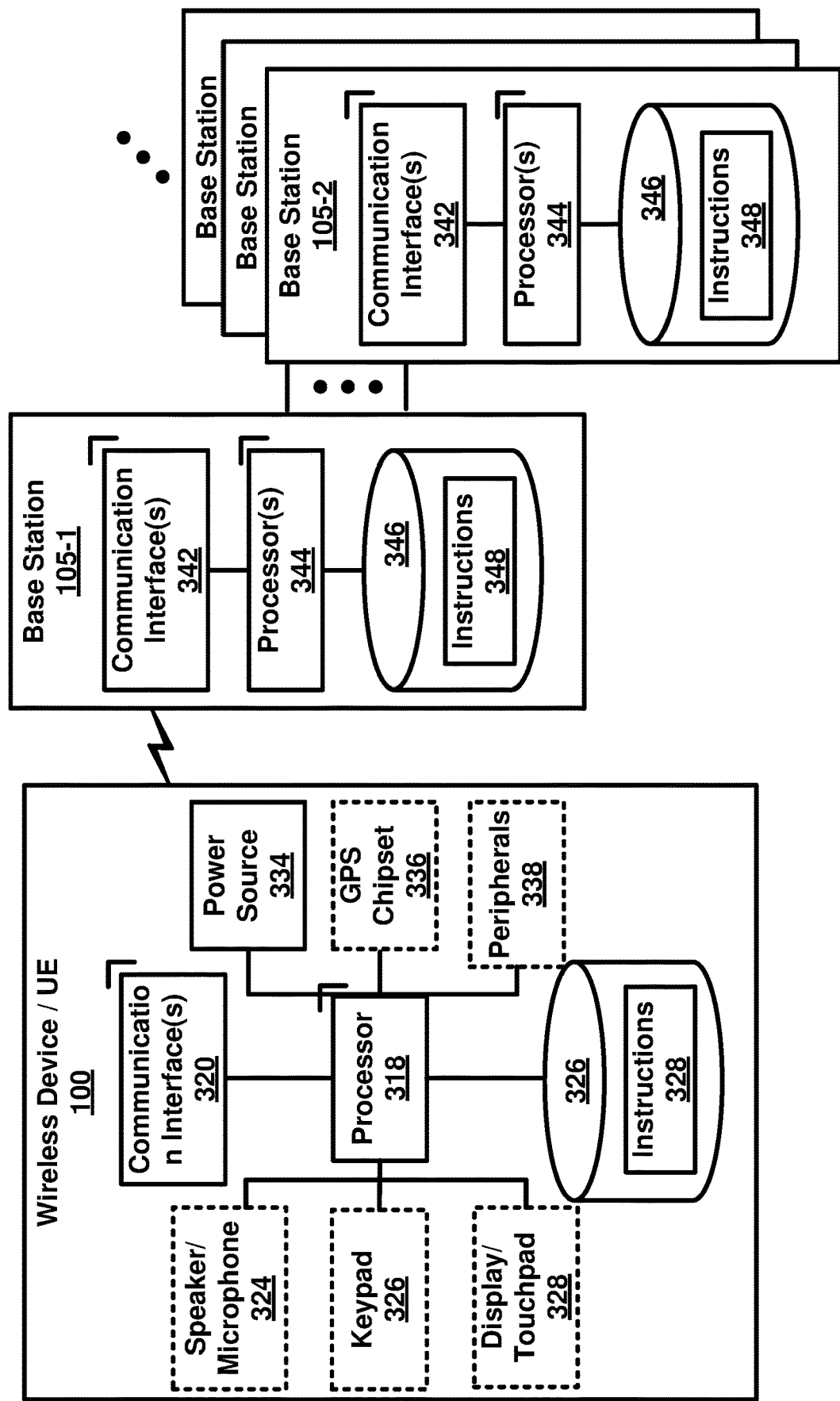
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
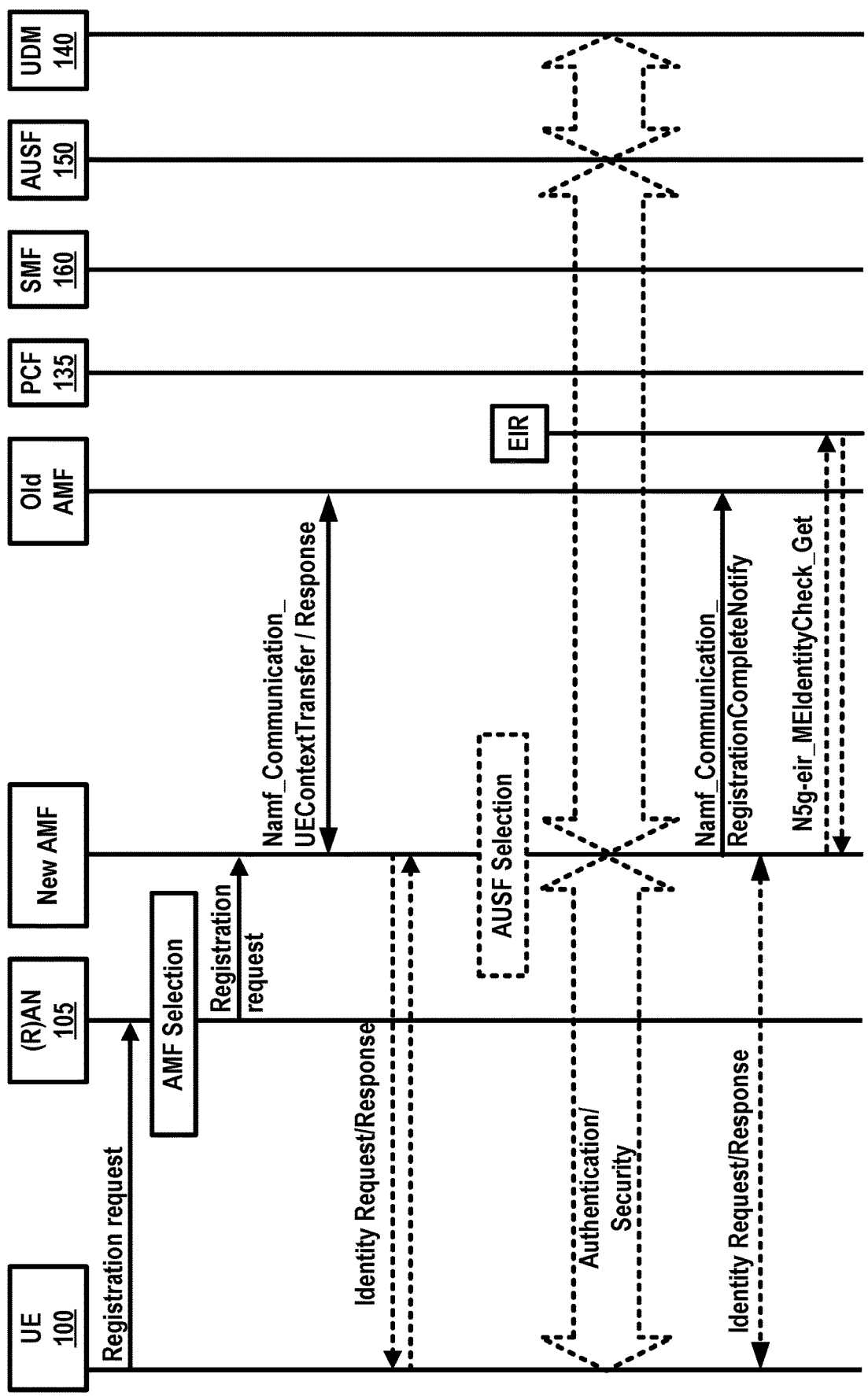
FIG. 8 and FIG. 9 are example call flows for registration procedure as per an aspect of an embodiment of the present disclosure.
Figure 9:
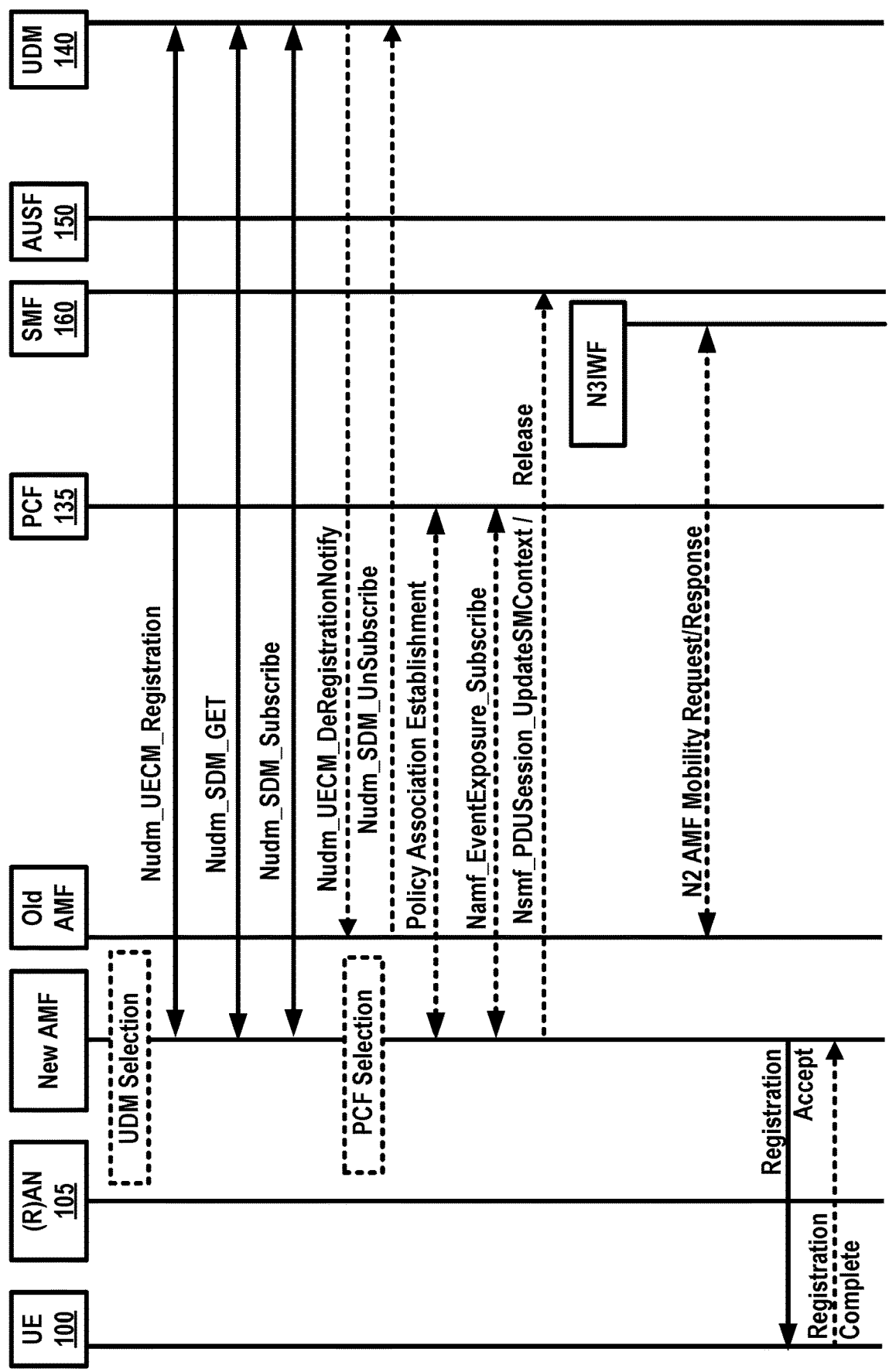

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
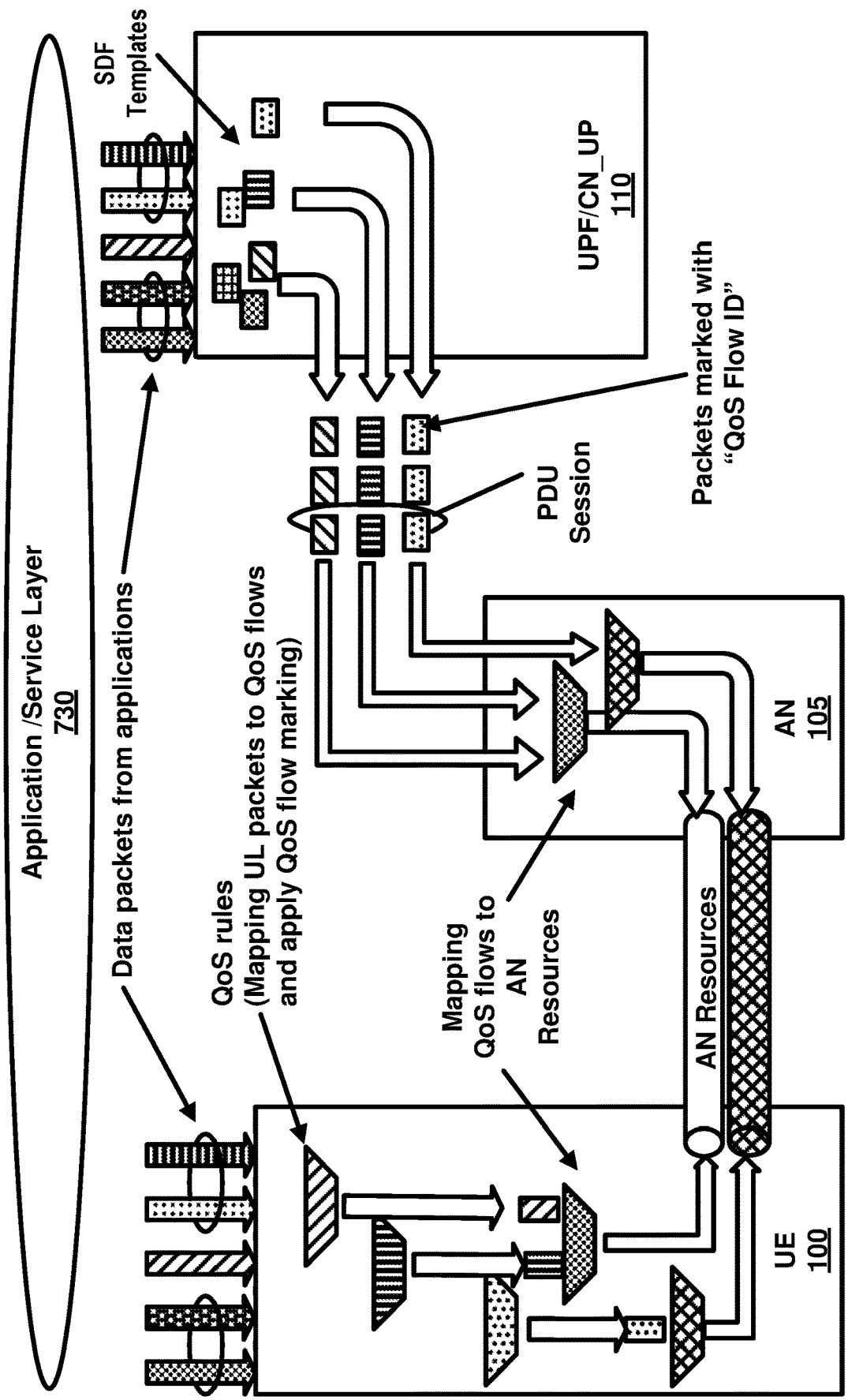
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck_Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query(access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-) PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
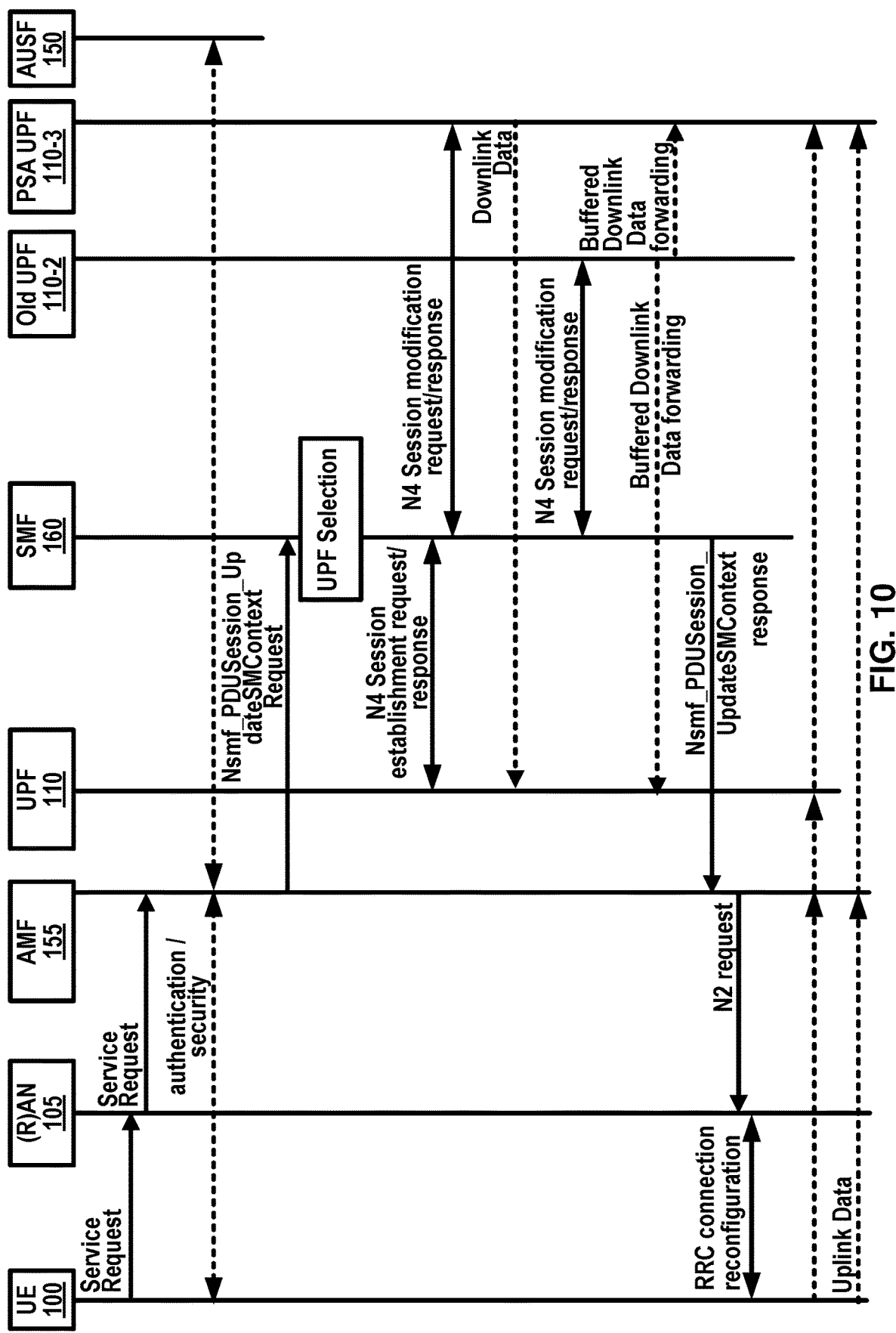
FIG. 10 and FIG. 11 are example call flows for service request procedure as per an aspect of an embodiment of the present disclosure.
Figure 11:
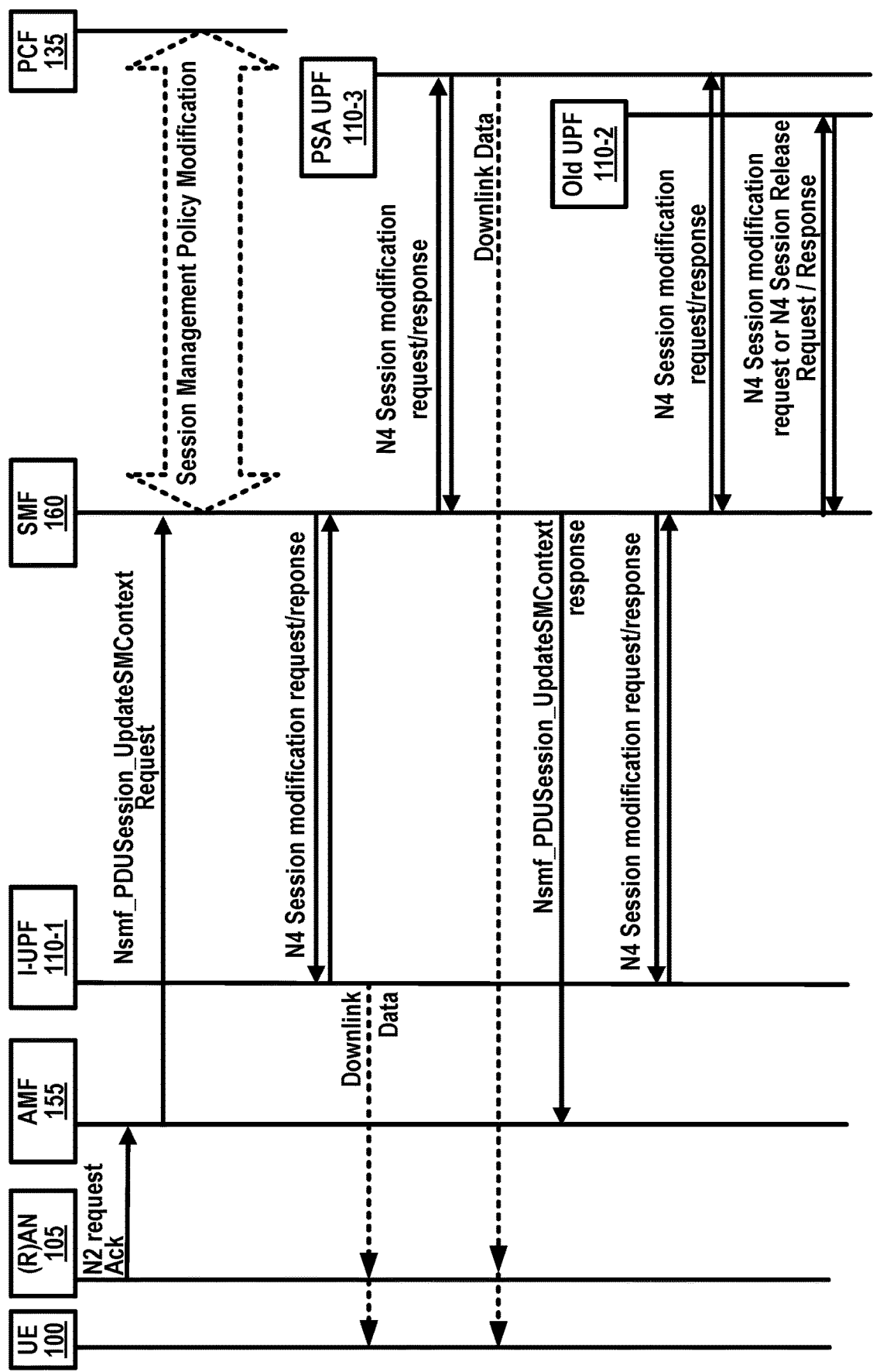

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated if the service request may be triggered for other reasons.

In an example, the (R)AN 105 may send to AMF 155 an N2 Message (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155.

In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure to the new I-UPF 110 and may provide AN tunnel info. The downlink data from the new I-UPF 110 may be forwarded to RAN 105 and UE 100. In an example, the UPF 110 may send to the SMF 160, an N4 session modification response. In an example, the SMF 160 may send to the AMF 155, an Nsmf_PDUSession_UpdateSMContext response.

In an example, if forwarding tunnel may be established to the new I-UPF 110 and if the timer SMF 160 set for forwarding tunnel may be expired, the SMF 160 may sends N4 session modification request to new (intermediate) UPF 110 acting as N3 terminating point to release the forwarding tunnel. In an example, the new (intermediate) UPF 110 may send to the SMF 160 an N4 session modification response. In an example, the SMF 160 may send to the PSA UPF 110-3 an N4 session modification request, or N4 session release request. In an example, if the SMF 160 may continue using the old UPF 110-2, the SMF 160 may send an N4 session modification request, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
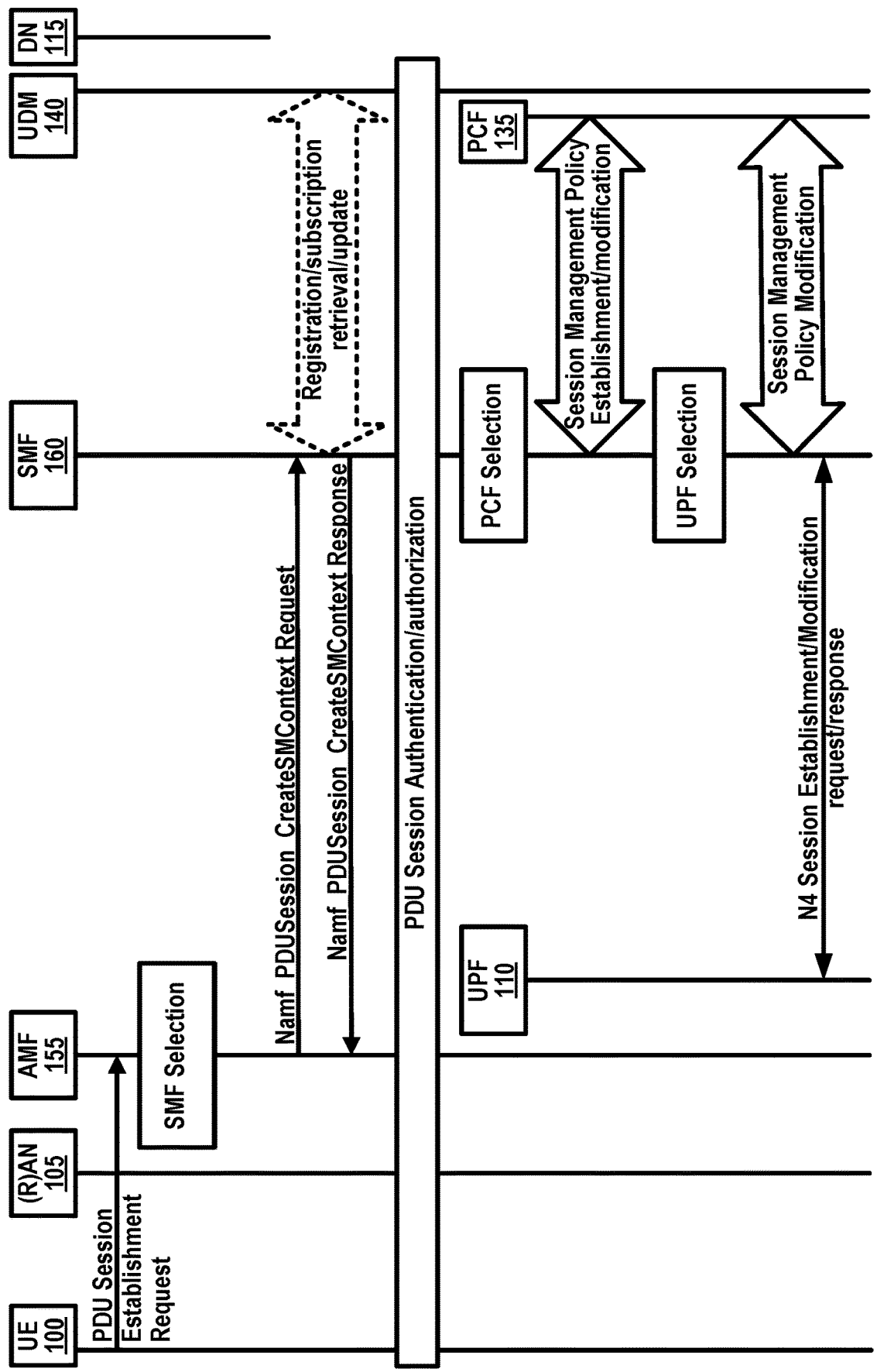
FIG. 12 and FIG. 13 are example call flows for PDU session establishment procedure as per an aspect of an embodiment of the present disclosure.
Figure 13:
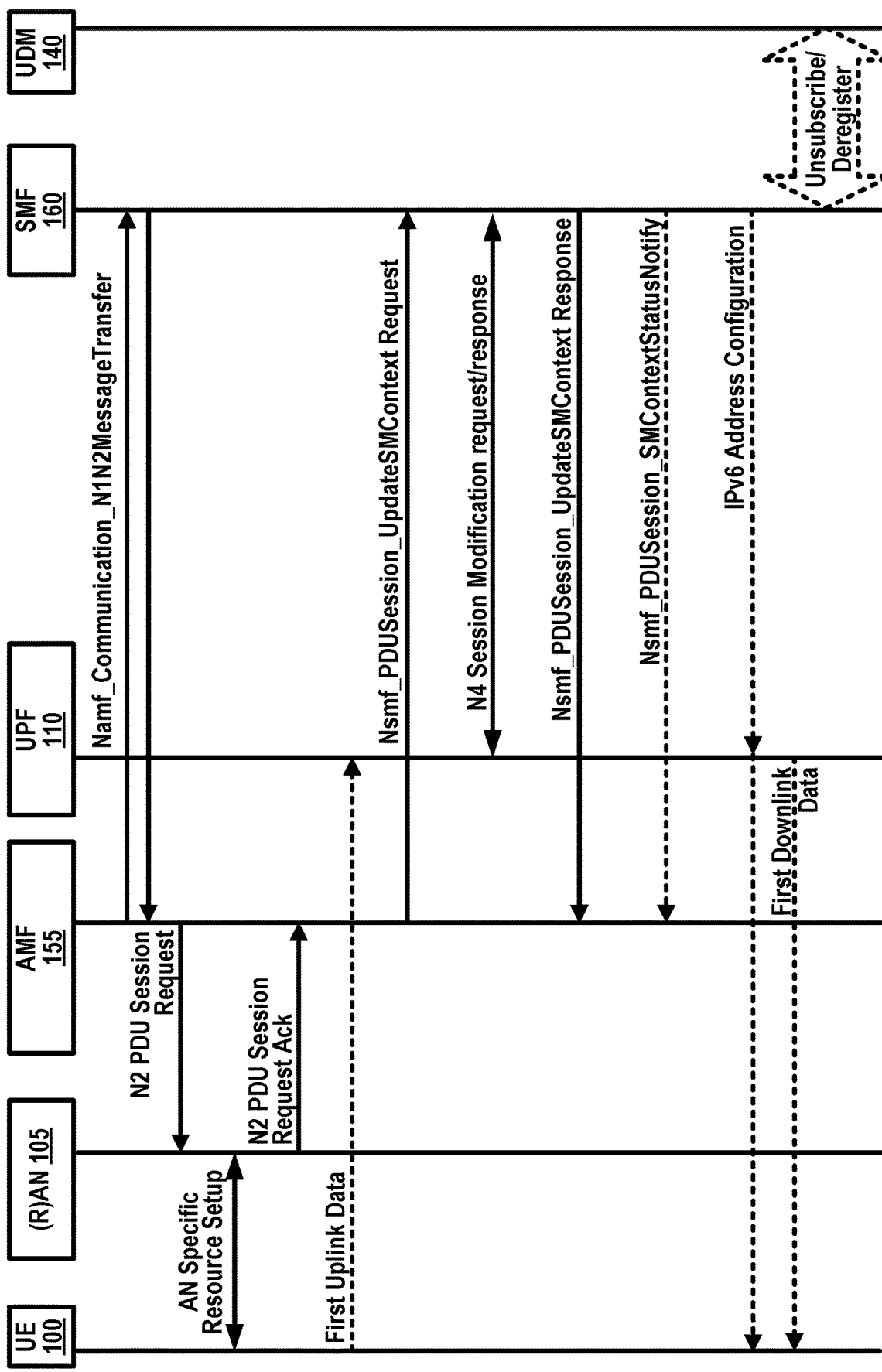

An example PDU session establishment procedure is depicted in FIG. 12 and FIG. 13. In an example embodiment, when the PDU session establishment procedure may be employed, the UE 100 may send to the AMF 155 a NAS Message (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response, e.g., either a PDU session create/update response, Nsmf_PDUSession_CreateSMContext response (cause, SM context ID or N1 SM container (PDU session reject(cause))) or an Nsmf_PDUSession_UpdateSMContext response.

In an example, if the SMF 160 may perform secondary authorization/authentication during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure to establish a PDU session with the PCF 135 and may get the default PCC Rules for the PDU session. The GPSI may be included if available at the SMF 160. If the request type indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type indicates initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type is existing PDU session, the SMF 160 may maintain the same IP address/prefix that may be allocated to the UE 100 in the source network.

In an example, if the request type indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select the UPF 110 and may select SSC mode 1.

In an example, the SMF 160 may perform a session management policy modification procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure with the selected UPF 110. The SMF 160 may initiate an N4 session modification procedure with the selected UPF 110. In an example, the SMF 160 may send an N4 session establishment/modification request to the UPF 110 and may provide packet detection, enforcement, reporting rules, and/ or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response. If CN tunnel info is allocated by the UPF, the CN tunnel info may be provided to SMF 160. In an example, if multiple UPFs are selected for the PDU session, the SMF 160 may initiate N4 session establishment/modification procedure with each UPF 110 of the PDU session.

In an example, the SMF 160 may send to the AMF 155 an Namf_Communication_N1N2MessageTransfer message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer may further comprise the PDU session ID and information allowing the AMF 155 to know which access towards the UE 100 to use.

In an example, the AMF 155 may send to the (R)AN 105 an N2 PDU session request (comprising N2 SM information, NAS message (PDU session ID, N1 SM container (PDU session establishment accept, and/or the like))). In an example, the AMF 155 may send the NAS message that may comprise PDU session ID and PDU session establishment accept targeted to the UE 100 and the N2 SM information received from the SMF 160 within the N2 PDU session request to the (R)AN 105.

In an example, the (R)AN 105 may issue AN specific signaling exchange with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via an Nsmf_PDUSession_UpdateSMContext request (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure with the UPF 110. The SMF 160 may provide AN tunnel info to the UPF 110 as well as the corresponding forwarding rules. In an example, the UPF 110 may provide an N4 session modification response to the SMF 160.

In an example, the SMF 160 may send to the AMF 155 an Nsmf_PDUSession_UpdateSMContext response (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release). In an example, if during the procedure, any time the PDU session establishment is not successful, the SMF 160 may inform the AMF 155 by invoking Nsmf_PDUSession_SMContextStatusNotify(release). The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement and may send it to the UE 100 via N4 and the UPF 110.

In an example, if the PDU session may not be established, the SMF 160 may unsubscribe to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister for the given PDU session using Nudm_UECM_Deregistration (SUPI, DNN, PDU session ID).

Figure 14:
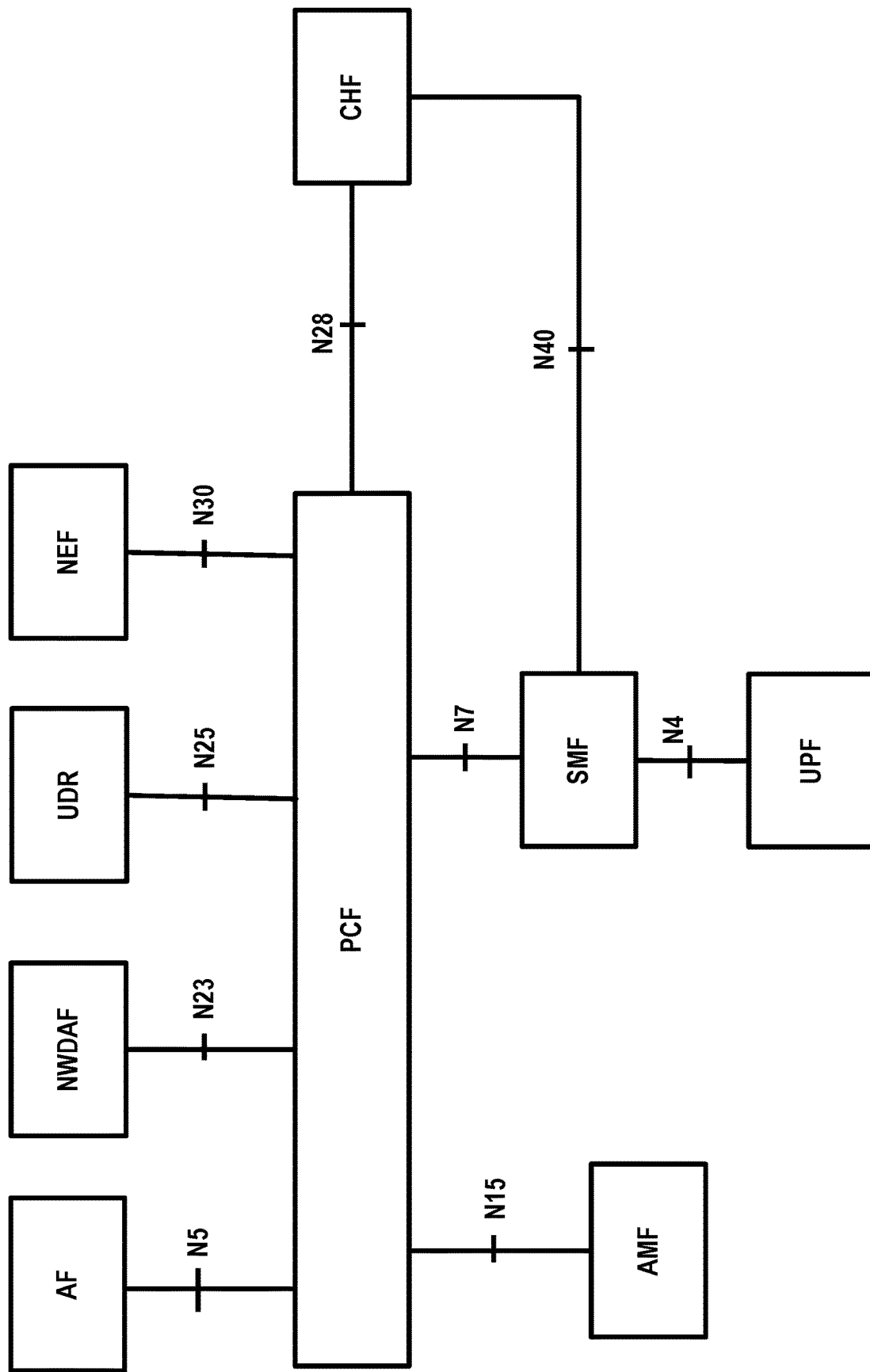
FIG. 14 is a diagram of an example 5G policy and charging control system architecture as per an aspect of an embodiment of the present disclosure.

In an example, FIG. 14 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

As an example, the CHF may support at least one charging method: offline charging, online charging, or converged charging.

As an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. As an example conclusion, offline charging may be a mechanism where charging information does not affect, in real-time, the service rendered.

As an example, online charging may be a process where charging information for network resource usage may be collected concurrently with that resource usage in the same fashion as in offline charging. However, authorization for the network resource usage may be obtained by the network prior to the actual resource usage to occur. As an example, the charging information utilized in online charging may be not necessarily identical to the charging information employed in offline charging. As an example conclusion, online charging may be a mechanism where charging information may affect, in real-time, the service rendered and therefore a direct interaction of the charging mechanism with the control of network resource usage may be required. As an example, converged charging may be a process where online and offline charging may be combined.

Figure 15:
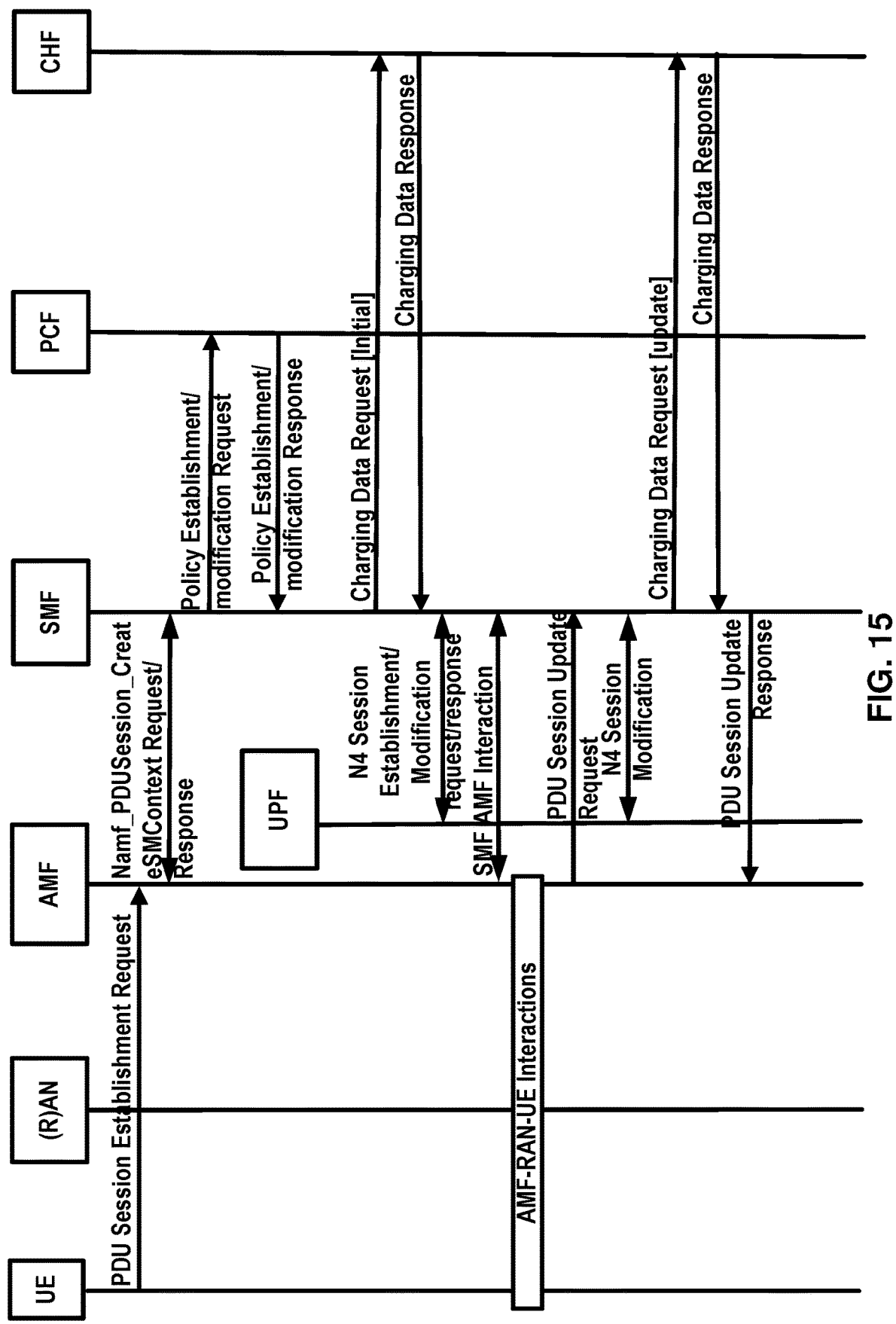
FIG. 15 is an example call flow for PDU session establishment charging as per an aspect of an embodiment of the present disclosure.

FIG. 15 is an example call flow for PDU session establishment charging as per an aspect of an embodiment of the present disclosure. In an example, a UE may initiate a PDU Session establishment procedure comprising one or more of: PDU Session ID, PDU Type, SSC mode, User location information and Access Technology Type Information. In response to the message received from the UE, an AMF may select an SMF and send to the selected SMF a message (e.g. Namf_PDUSession_CreateSMContext Request), the SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response). In an example, the SMF may create a Charging Id for the PDU session and may send a Charging Data Request[initial] message to a CHF for authorization for the subscriber to start the PDU session which is triggered by start of PDU session charging event. In an example, the CHF may open CDR for this PDU session and may acknowledge by sending Charging Data Response [Initial] to the SMF. In an example, the SMF select a UPF and may initiate an N4 Session Establishment/Modification procedure with the selected UPF. The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI. In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may be corresponding to the Access Network address of the N3 tunnel corresponding to the PDU Session. In an example, the AMF may send to the SMF a Nsmf_PDUSession_UpdateSMContext Request message comprising the N2 SM information received from (R)AN to the SMF. In an example, the SMF may initiate an N4 Session Modification procedure with the UPF. The SMF may provide AN Tunnel Info to the UPF as well as the corresponding forwarding rules. The UPF may send to the SMF a response message. In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

In an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message.

In an example, when receiving user data from upper layers to be sent to a given group, a transmitting UE may tag each outgoing protocol data unit with the following information before passing it to lower layers for transmission: a Layer-3 protocol data unit type set to: a) IP packet; or b) Address Resolution Protocol packet; the Source Layer-2 ID set to the ProSe UE ID assigned from the ProSe Key Management Function or self-assigned by the UE; the Destination Layer-2 ID set to the ProSe Layer-2 Group ID; the ProSe Per-Packet Priority associated with the protocol data unit; and the ProSe Per-Packet Reliability (PPPR), if received from the upper layers.

The UE may choose from a range of eight possible values to indicate the required ProSe Per-Packet Priority related to the lower layer handling of this packet data unit. The ProSe Per-Packet Priority may be selected by the application layer and may be independent of the ProSe Layer-2 Group ID, which may be used as the Layer 2 destination address for this packet data unit.

In an example, the UE may initiate usage information report list sending procedure by sending a USAGE_INFORMATION_REPORT_LIST message to a ProSe Function CTF (ADF). If the UE is configured with the IP address of the ProSe Function CTF (ADF), the UE may send the USAGE_INFORMATION_REPORT_LIST message to the configured IP address of the ProSe Function CTF (ADF). If the UE is not configured with the IP address of the ProSe Function CTF (ADF), the UE may send the USAGE_INFORMATION_REPORT_LIST message to the IP address of the ProSe Function discovered. In the USAGE_INFORMATION_REPORT_LIST message, the UE may include a new transaction ID. In the USAGE_INFORMATION_REPORT_LIST message, the UE may include the UE identity set to the UE's IMSI. In the USAGE_INFORMATION_REPORT_LIST message, for each collection period, the UE may include a sequence number of the usage information report. In the USAGE_INFORMATION_REPORT_LIST message, for each collection period, if the UE is configured to report the time stamps when it went in and out of E-UTRAN coverage during the collection period in the usage information, for each going in or out of E-UTRAN coverage, the UE may include information whether the UE was in or out of E-UTRAN coverage, and/or the UE may include the time stamp of the move. If the UE was in E-UTRAN coverage and the UE is configured to report the list of locations of the UE when in E-UTRAN coverage during the collection period in the usage information, for each camping on a cell or usage of a cell in the EMM-CONNECTED mode, the UE may include the E-UTRAN cell global identification of the cell; and the UE may include the time stamp of beginning of the camping on the cell or of beginning of the usage of the cell in the EMM-CONNECTED mode. If the UE is configured to report the group parameters in the usage information, for each group, the UE may include the ProSe Layer-2 Group ID, the UE may include the ProSe Group IP multicast address. If the UE transmitted data during the collection period and the UE is configured to report the time stamps of the first transmission/reception during the collection period in the usage information, shall include the time stamp of the first transmission to the ProSe Group IP multicast address in the collection period. If the UE received data during the collection period and the UE is configured to report the time stamps of the first transmission/reception during the collection period in the usage information, the UE may include the time stamp of the first reception from the ProSe Group IP multicast address in the collection period; the UE may include an IP address used by the UE as a source address; the UE may include the ProSe UE ID. For each transmitter in one-to-many ProSe direct communication, shall include the Source L2 ID and IP address of the transmitter;

In an example, most vehicular audio/video entertainment systems may have FM/AM radio functions. With improvements of networking technologies, online radio and audio/video entertainment services in intelligent connected vehicles may be becoming more and more popular. On one hand, traditional one-way broadcasting systems, e.g., FM/AM, terrestrial digital broadcasting, and satellite broadcasting, may only support one-way transmission mode. Hence, interactive and personalized services may hardly be achieved by such broadcast networks. On the other hand, mobile networks may support two-way transmission modes. By using mobile network, online multimedia entertainment services may be provided to users to satisfy interactive and personalized demands. However, there may be some drawbacks. In one example drawbacks, in certain situations, the cost of mobile Internet may be an important factor impeding the wide deployment of Vehicular Multimedia Networks Services (VMNS) in intelligent connected vehicles. In one example drawbacks, the wireless coverage of mobile networks may not be fully guaranteed. For example, the signal strength may be poor or non-existent in certain locations, and, therefore, users may experience a poor quality connection when at those locations. In one example drawbacks, the mobile network may be congested, which may impact the smoothness of online audio/video playback and degrades the user experience. A Vehicular Multimedia Networks (VMN) may have the one or more characteristics. In an example characteristic, the VMN may be available on a connected vehicle (or/and autonomous vehicle). In an example characteristic, the VMN may include a connectivity layer allowing services to seamlessly use multiple bearers and protocols (satellite, cellular, short range/broadcast, streaming, download). The connectivity layer may be usable by various sub-systems and services such as infotainment or maps. In an example characteristic, the VMN may connect to one or more communication networks, in particular 3G/4G/5G cellular networks, Low Earth Orbit bi-directional communication networks (e.g. Starlink), Satellites (e.g. L Band Broadcast) with both broadcast and bi-directional communications, short range networks (e.g. IEEE 802.11p; 802.11bd), C-V2X (e.g. LTE-V, 5G PC5), terrestrial broadcast networks (e.g. FM, DAB, HD Radio, CDR, DTMB). One or more scenarios may be envisaged for VMN. For example, a vehicle may drive away from the coverage area of the WLAN, but access to services continue to be available via cellular network or satellite network. For example, a vehicle may drive away from the coverage area of the cellular network, but access to services continue to be available via satellite communication. For example, a vehicle may drive away from the coverage area of the satellite network, but access to services continue to be available via cellular communication (e.g. entering an underground parking). For example, the VMS may prefer that large downloads such as map updates and security updates may be performed only on higher bandwidth network such as WLAN. For example, network connectivity may be billed to the driver, or it may be billed to the vehicle manufacturer. In either case, the driver/vehicle manufacturer may want to limit types of data transmitted over higher-cost networks. For example, diagnostic data may be uploaded at a later time when WLAN is available, whereas safety related information may be downloaded via any means available. For example, the VMS may receive indicators over a broadcast network and connect to a server over a cellular or short-range data connection to download metadata about the program. For example, the VMS may transmit/receive multimedia information such as image/video, voice and broadcast messages (such as emergency messages received and retransmitted to nearby vehicles) through wireless short-range communication networks (e.g. C-V2X).

In an example, automakers may have use cases where advanced charging and billing capabilities from mobile network operators may be necessary for successful deployment, for example bundled services, service upgrade, sponsored connectivity, third party infotainment content, and multiple devices with common data. An example bundled service may build on differentiating between service beneficiaries for charging of connectivity, e.g. services where the automaker may cover the recurrent connectivity costs (e.g. remote diagnostics), and the end-customer pays for the connectivity costs (e.g. navigation). An example service upgrade may build upon the differentiation of service beneficiaries, with the focus on upgrading services by either increasing bandwidth thresholds for data consumption or adding new services to the subscriptions. An example sponsored connectivity may build upon an ability to differentiate between service beneficiaries, this use case may envisage third parties sponsoring certain services (so no charge for the end customer), as an addition to a basic series of connected car services paid for by the end customer. An example third party infotainment content may build on an ad hoc ability of the end-customer to select a service provided by a third party content supplier for audio or video downloads. In this use case, the customer may have a set of connected car services activated and opts into an incremental purchase of content. This use case may address the revenue management capabilities between the automaker and the third party content provider. An example multiple devices with common data may involve the end-customer activating a shared data plan to cover in-car service connectivity, as a complement to on-going connected services paid for by the automaker (such as remote diagnostics).

FIG. 16 is an example diagram depicting a vehicle identification number (VIN). The VIN may comprise a world manufacturer identifier. The first three characters of VIN may uniquely identify the manufacturer of the vehicle using the World Manufacturer Identifier or WMI code. A vehicle manufacturer that builds fewer than 1000 vehicles per year may uses a 9 as the third digit and the 12th, 13th and 14th position of the VIN for a second part of the identification. Some manufacturers may use the third character of VIN as a code for a vehicle category (e.g., bus or truck), a division within a manufacturer, or both. For example, within 1G (assigned to General Motors in the United States), 1G1 represents Chevrolet passenger cars; 1G2, Pontiac passenger cars; and 1GC, Chevrolet trucks. The fourth to ninth positions in the VIN may be vehicle descriptor section (VDS). This may be used, according to local regulations, to identify the vehicle type, and may include information on the automobile platform used, the model, and the body style. Each vehicle manufacturer may have a unique system for using this field. Most manufacturers since the 1980s may have used the eighth digit to identify the engine type whenever there is more than one engine choice for the vehicle. Example: for the 2007 Chevrolet Corvette, U is for a 6.0-liter V8 engine, and E is for a 7.0 L V8. In an example, position nine may be used as a check digit in North America and China, but not Europe. The 10th to 17th positions in the VIN may be used as 'vehicle identifier section' (VIS). This may be used by the vehicle manufacturer to identify the individual vehicle in question. This may include information on options installed or engine and transmission choices, but often is a simple sequential number. In North America, the last five digits may be numeric. The 10th position of the VIN may be required worldwide to encode the model year of the vehicle. Besides the three letters that may not be allowed in the VIN itself (I, O and Q), the letters U and Z and the digit 0 may not be used for the model year code. The year code may be the model year for the vehicle. It's may be compulsory in North America and China to use of the 11th position of VIN to identify the assembly plant at which the vehicle was built. Each vehicle manufacturer may have its own set of plant codes. In the United States and China, the 12th to 17th digits may be the vehicle's serial or production number. This may be unique to each vehicle, and every vehicle manufacturer uses its own sequence.

A vehicle terminal may have different entities associated with it such as user, owner, manufacturer, and/or the like. Existing technologies may not efficiently support policy and charging control for vehicle terminal that comprises different billing entities, policy requirements and charging policy requirements. For example, existing technologies may not be able to implement policy and charging control based on vehicle parameter (e.g. vehicle manufacturer name, vehicle model). For example, existing technologies may not be able to provide vehicle manufacturer name and/or vehicle model information to the network. As a result, the network (e.g. PCF) may not be able to determine different policy (e.g. QoS policy) for different vehicle manufacturer name and/or vehicle model. As a result, the network (e.g. PCF) may not be able to determine different charging policy (e.g. charging method, charging rate) for different vehicle manufacturer name and/or vehicle model. The existing technologies may not be able to differentiate different service for different bill payer (e.g. vehicle driver, vehicle manufacturer). As a result, the existing technologies may not be able to implement charging for different bill payer in one PDU session per wireless device/vehicle terminal. Existing technologies may support charging per profile, user id, subscriber information, and/or the like that is tied to a single entity, however existing policy and charging mechanisms may not handle the charging and policy when different entities of a system (e.g., wireless device user, wireless device owner, wireless device manufacturer, and/or the like) are decoupled.

Example embodiments of the present disclosure may provide enhanced mechanisms for implementing policy and charging control for vehicle terminal. Example embodiments of the present disclosure may enhance provisioning of policy and charging for a system that comprises different entities or coupled with different/isolated entities such as wireless device user, wireless device owner, wireless device manufacturer, and/or the like. Example embodiments of the present disclosure may provide enhanced mechanisms for implementing policy and charging control based on vehicle parameter. Example embodiment of the present disclosure may provide enhanced mechanisms for implementing policy and charging control based on vehicle manufacturer name and/or vehicle model information, which may enable the network (e.g. PCF) to determine different policy (e.g. QoS policy) and/or charging policy (e.g. charging method, charging rate) for different vehicle manufacturer name and/or vehicle model. Example embodiment of the present disclosure may provide enhanced mechanisms to differentiate different service for different bill payer (e.g. vehicle driver, vehicle manufacturer), which may enable charging for different bill payer in one PDU session per wireless device/vehicle terminal.

A vehicle terminal may have different communication requirements based on vehicle type, vehicle manufacturer, vehicle model, and/or the like. In existing technology, wireless device parameters and capabilities are communicated with the network. Existing technologies may not efficiently configure a wireless device/vehicle terminal of a vehicle, for example vehicles may have different configuration requirements based on vehicle type, vehicle manufacturer, vehicle model, and/or the like. There is a need to enhance communications between a wireless device/vehicle terminal and wireless network and improve vehicle wireless device/vehicle terminal access control and configuration in a wireless network. Example embodiments enable a vehicle to transmit one or more parameters comprising vehicle information to the network. The one or more parameters may be based on vehicle identification number (VIN). Example embodiments improves access control, configuration, and/or implementation of charging/billing polices for a vehicle wireless device/vehicle terminal.

Figure 17:
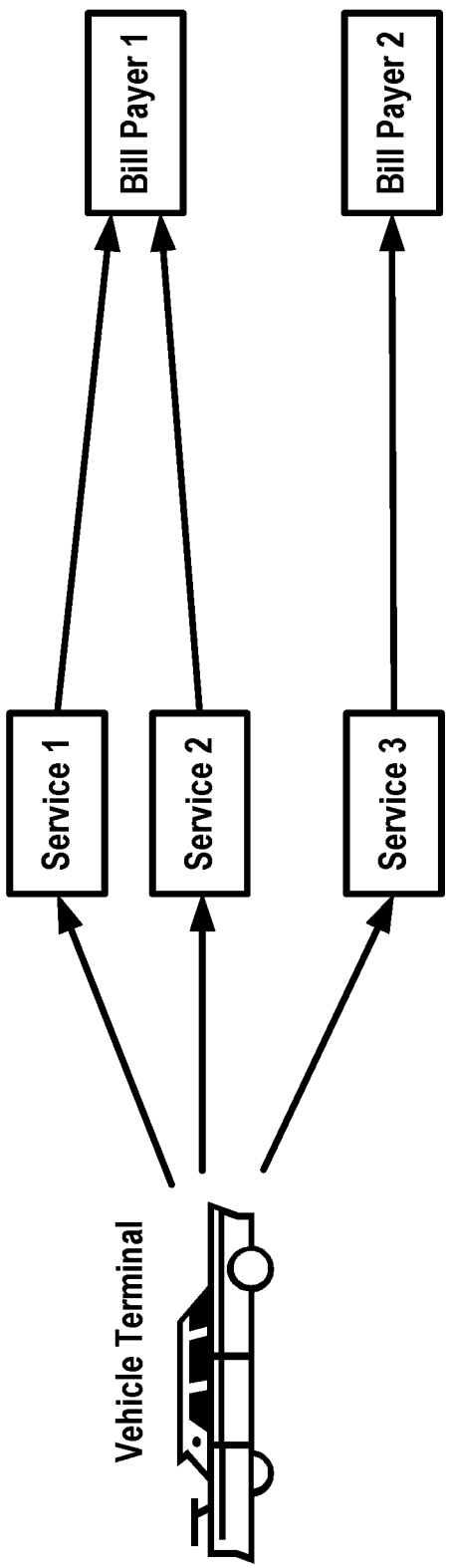
FIG. 17 is a diagram depicting an example service(s) and bill payer(s) relationship as per an aspect of an example embodiment of the present disclosure.

In an example, a vehicle may have one or more terminals (e.g. wireless device, vehicle terminal), the wireless device/vehicle terminal may access to application service (e.g. email, web browsing, video on demand) via a network (e.g., a 3GPP system, 5G cellular network, satellite network, WiFi network, and/or the like). As shown in FIG. 17, a wireless device/vehicle terminal may access one or more application services, for example, the wireless device/vehicle terminal may access application service 1 (e.g. web browsing), application service 2 (video on demand) and application service 3 (vehicle remote diagnostics). For example, the application service 1 and/or application service 2 may be billed to bill payer 1 (e.g. car driver, the passenger in the car), and the application 3 may be billed to bill payer 2 (e.g. vehicle manufacturer). Provisioning of vehicle parameter to the network may enhance the support for mapping the vehicle parameter to one or more policy and charging parties/entities, and/or bill payers.

Figure 18:
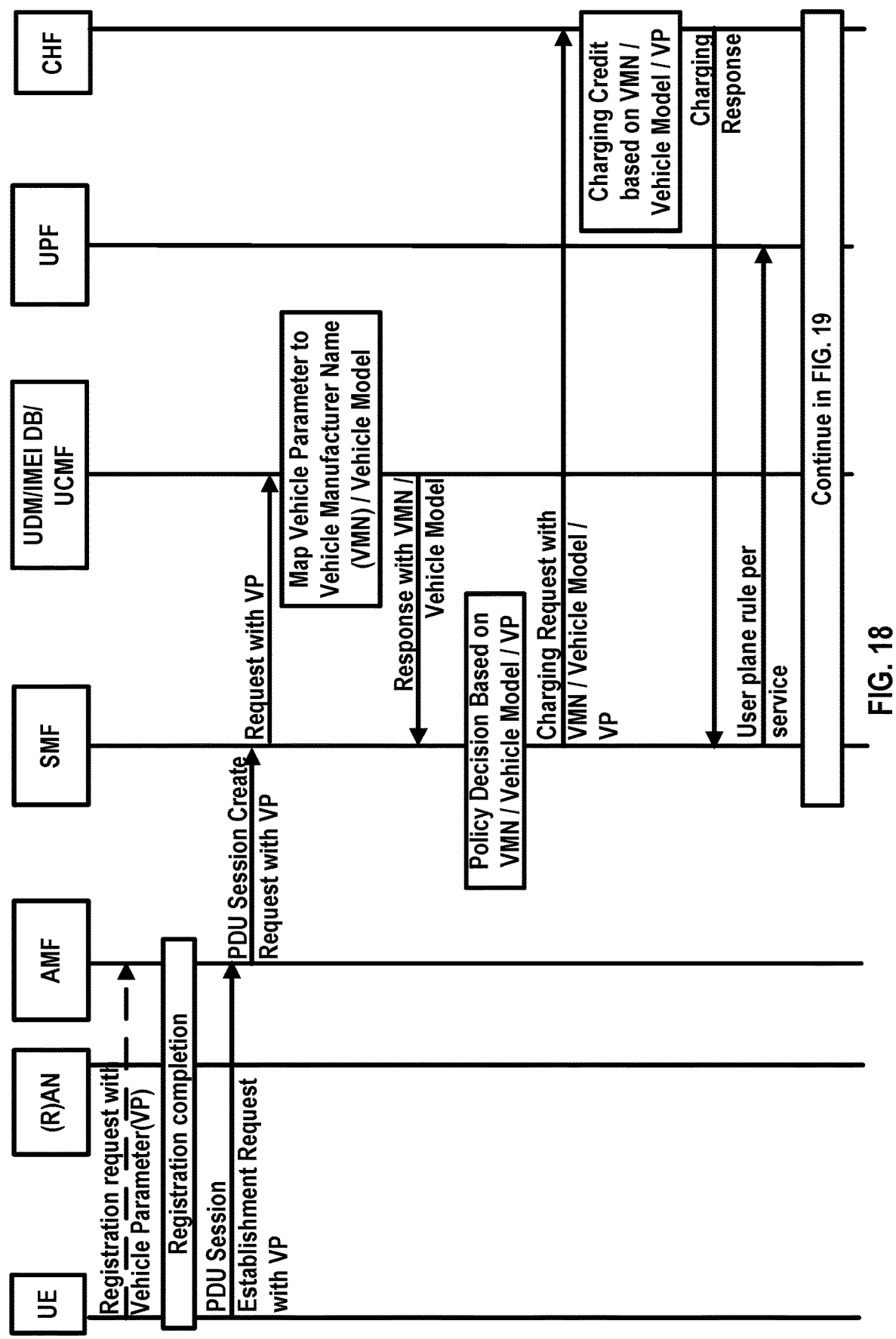
FIG. 18 is a call flow diagram illustrating an aspect of an example embodiment of the present disclosure.
Figure 19:
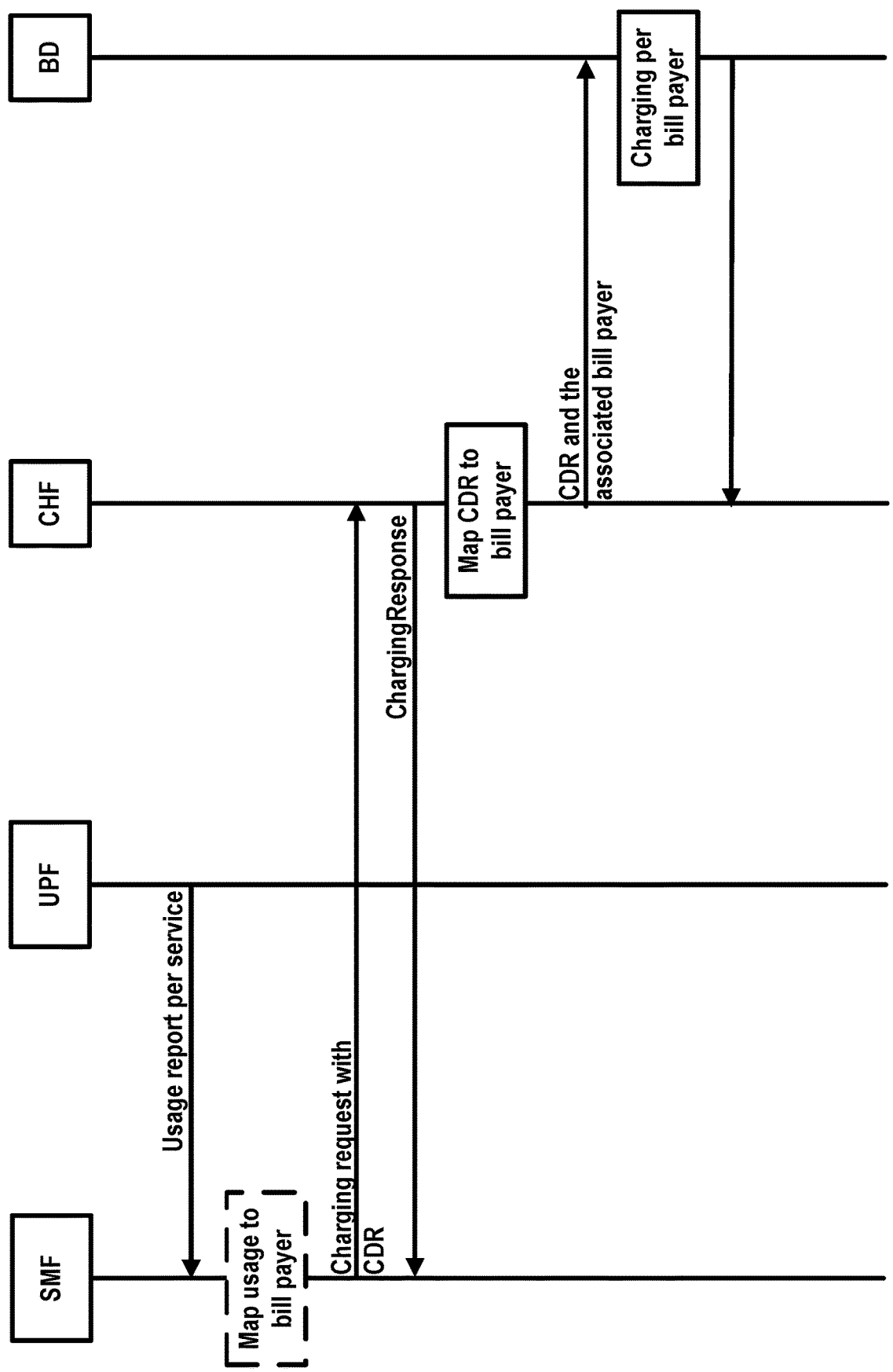
FIG. 19 is a call flow diagram illustrating an aspect of an example embodiment of the present disclosure.

FIG. 18 and FIG. 19 show example call flows which may comprise one or more actions. In an example, a UE may send to a (R)AN an AN message. The AN message may comprise AN parameters and/or registration request message. In an example, the AN parameters may comprise a vehicle parameter. In an example, the registration request message may comprise a vehicle parameter. The vehicle parameter may comprise a UE identity of the vehicle terminal, wherein the UE identity of the vehicle terminal may comprise at least one of: a subscription permanent identifier (SUPI); a subscription concealed identifier (SUCI); a permanent equipment identifier (PEI); a generic public subscription identifier (GPSI); a 5G globally unique temporary identifier (5G-GUTI); a 5G S-Temporary Mobile Subscription Identifier (5G-S-TMSI); or a source layer-2 ID. In an example, the UE identity of the vehicle terminal may comprise user biometric information, and the user biometric information may comprise at least one of: finger-print information; face recognition information; or voice recognition information. In an example, the vehicle parameter may indicate a vehicle manufacturer name (VMN) and/or a vehicle model. In an example, the vehicle parameter may be based on a Vehicle Identification Number (VIN) of a vehicle. For example, the vehicle parameter may comprise a vehicle identification number (VIN). For example, the vehicle parameter may comprise a complete VIN. For example, the vehicle parameter may comprise part of VIN, e.g. world manufacturer identifier, and/or vehicle descriptor section, and/or vehicle identifier section, and/or plant code, and/or production number. In an example, the UE identity of the vehicle terminal (e.g. SUPI, PEI) may comprise the complete VIN or part of VIN, a combination of the VIN and an identifier of a system or hardware installed on the vehicle, and/or the like. For example, the UE identity of the vehicle terminal (e.g. world manufacturer identifier of the VIN) may identify a manufacturer of the vehicle. For example, the UE identity of the vehicle terminal (e.g. vehicle descriptor section of the VIN) may identify a system within the vehicle. For example, the UE identity of the vehicle terminal (e.g. vehicle descriptor section of the VIN and/or the plant code, and/or production number of the VIN) may identify a make/model of the vehicle, a type of the vehicle, and/or the like. For example, the UE identity of the vehicle terminal may comprise an identifier of a department or an organization (government, military, private, and/or the like) that may own the vehicle. In an example, the SMF and/or PCF may employ vehicle parameter, VIN, and/or the like to decouple/extract the identities of different bill payers as required by the charging elements.

In an example, the registration request message may comprise at least one of: registration type, SUCI or 5G-GUTI or PEI, last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, [Requested Active Time], Requested DRX parameters, [extended idle mode DRX parameters], [LADN DNN(s) or Indicator Of Requesting LADN Information], [NAS message container], Support for restriction of use of Enhanced Coverage, [Preferred Network Behaviour], [Service Gap Control Capability]), UE Policy Container (the list of PSIs, indication of UE support for ANDSP and the operating system identifier) and/or [UE Radio Capability ID]). FIG. 20 is a diagram depicting an example REGISTRATION REQUEST message, the REGISTRATION REQUEST message may comprise an information element/parameter indicating vehicle parameter, and the vehicle parameter may comprise a VIN. In an example, the 5GS mobile identity in the REGISTRATION REQUEST message may comprise the UE identity of the vehicle terminal.

In response to the message received from the UE, the (R)AN may send an N2 message to an AMF. The N2 message may comprise N2 parameters and/or the registration request message received from the UE. In an example, the N2 parameters may comprise a vehicle parameter. In an example, the N2 parameters may comprise selected PLMN ID, location information and cell Identity related to the cell in which the UE is camping, In an example, the N2 parameters may comprise UE Context Request which indicates that a UE context including security information needs to be setup at the NG-RAN. In response to the message received from the (R)AN, the AMF may store the vehicle parameter. There may be one or more actions to complete the registration procedure.

In an example, the UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. In an example, the NAS message may comprise the vehicle parameter (e.g. UE identity of the vehicle terminal, VIN). In an example, the PDU session establishment request message may comprise the vehicle parameter (e.g. UE identity of the vehicle terminal, VIN). In an example, the vehicle parameter may comprise a vehicle identification number (VIN). For example, the vehicle parameter may comprise a complete VIN. For example, the vehicle parameter may comprise part of VIN, e.g. world manufacturer identifier, and/or vehicle descriptor section, and/or vehicle identifier section, and/or plant code, and/or production number.

The PDU session establishment request message may comprise at least one of: a PDU session ID, Requested PDU Session Type, or a Requested SSC mode, etc. In response to the message received from the UE, the AMF may select an SMF and send to the SMF a message (e.g. PDUSession_CreateSMContext Request) comprising at least one of: the vehicle parameter, SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF. FIG. 21 is a diagram depicting an example PDU SESSION ESTABLISHMENT REQUEST message, the PDU SESSION ESTABLISHMENT REQUEST message may comprise an information element/parameter indicating vehicle parameter, and the vehicle parameter may comprise a VIN. In an example, the Requested PDU Session Type in the PDU session establishment request message may comprise an information element indicating that the PDU session is for a vehicle, a system or network entity of a vehicle, an infotainment system, and/or the like. In an example, a SUPI may comprise the vehicle parameter, VIN and/or the like. The Request Type in the PDU session establishment request message may indicate that the PDU session may be employed for charging and policy control related to a vehicle. In an example, an information element of the PDU session establishment request message may indicate that the PDU session is for a vehicle or a network element or service of the vehicle, and based on the information element, the vehicle parameter may be derived/extracted from one or more of SUPI, PDU session ID, PEI, user ID, and/or the like.

In response to the message received from the AMF, the SMF may take one or more actions. In an example action, the SMF may send to the AMF a response message (e.g. PDUSession_CreateSMContext Response) comprising at least one of: Cause, SM Context ID or N1 SM container (PDU Session Reject (Cause)). In an example action, the SMF may send to a network function (e.g. UDM, IMEI DB, UCMF) a request message (e.g. subscription request message). The request message (e.g. subscription request message) may comprise the vehicle parameter. The request message (e.g. subscription request message) may indicate requesting subscription information of the wireless device/vehicle terminal. The request message (e.g. subscription request message) may indicate requesting vehicle manufacturer name and/or vehicle model for the vehicle parameter (e.g. UE identity of the vehicle terminal, VIN). For example, the request message (e.g. subscription request message) may comprise an information element indicating requesting vehicle manufacturer name and/or vehicle model for the vehicle parameter.

In response to the message received from the SMF, the network function (e.g. UDM, IMEI DB, UCMF) may map the vehicle parameter to vehicle manufacturer name and/or vehicle model for the wireless device/vehicle terminal (e.g. vehicle manufacturer name and/or vehicle model of the vehicle, where the wireless device/vehicle terminal is installed in the vehicle). In an example embodiment, when vehicle parameter (e.g. VIN) is employed, the network function may derive identities of one or more parties associated with the vehicle. For example, based on the VIN, the vehicle manufacturer may be identified, the VIN may be used by the network function to determine a party/user/organization that owns the vehicle. For example, the network function may send the VIN to a repository function to determine a party/user/organization that owns the vehicle, and/or the like. For example, the network function (e.g. UDM, IMEI DB, UCMF) may determine vehicle manufacturer name and/or vehicle model based on the vehicle parameter. For example, based on subscription information and/or local configuration, the UDM may map the UE identity of the vehicle terminal (e.g. SUPI, PEI, GPSI, 5G-GUTI, 5G-S-TMSI, and/or source layer-2 ID) to a vehicle manufacturer name and/or a vehicle model. For example, based on subscription information and/or local configuration, the UDM may map user biometric information (finger-print information, face recognition information, and/or voice recognition information) to a vehicle manufacturer name and/or a vehicle model. For example, the network function may map the VIN to a vehicle manufacturer name and/or a vehicle model. For example, the network function may determine a vehicle manufacturer name and/or a vehicle model based on a VIN or part of VIN. For example, the network function may determine/derive a vehicle manufacturer name and/or a vehicle model based on a world manufacturer identifier of the VIN. For example, the network function may determine/derive a vehicle manufacturer name and/or a vehicle model based on a vehicle identifier section of the VIN. For example, the network function may determine/derive a vehicle manufacturer name and/or a vehicle model based on a plant code, and/or production number of the VIN. For example, based on local configuration, the IMEI DB may map a PEI/IMEI to a vehicle manufacturer name and/or a vehicle model. The vehicle manufacturer name may indicate a vehicle manufacturer, a car maker, and/or the like, e.g. Mercedes-Benz, BMW. The vehicle model may indicate a vehicle type (e.g. SUV, sedan). The vehicle model may indicate a vehicle series of a vehicle manufacturer, for example, BMW X7, Mercedes-Benz GLE 500. In an example, the network function may determine/derive a subscription service and bill payer information based on the information received from the SMF (e.g. VIN) and/or local configuration. The subscription service and bill payer information may comprise at least one of: a subscription first service type (e.g. web browsing); a subscription first QoS policy for the subscription first service type; a subscription first charging policy (e.g. an online charging method, a charging rate) for the subscription first service type; a subscription first bill payer (e.g. vehicle driver, the passenger in the vehicle) for the subscription first service type; a subscription second service type (e.g. vehicle remote diagnostics); a subscription second QoS policy for the subscription second service type; a subscription second charging policy (e.g. an offline charging method, a charging rate) for the subscription second service type; and/or a subscription second bill payer (e.g. vehicle manufacturer) for the subscription second service type.

The network function (e.g. UDM, IMEI DB, UCMF) may send to the SMF a response message comprising the vehicle manufacturer name and/or the vehicle model. For example, the UDM may send to the SMF a subscription response message, the subscription response message may comprise the vehicle manufacturer name and/or the vehicle model for the wireless device/vehicle terminal. The subscription response message may comprise the subscription information of the wireless device/vehicle terminal. For example, the subscription information of the wireless device/vehicle terminal may comprise the subscription service and bill payer information.

In response to the message received from the network function (e.g. UDM, IMEI DB, UCMF), the SMF may take one or more actions. In an example action, based on the vehicle manufacturer name and/or the vehicle model and/or the vehicle parameter (e.g. VIN) and/or subscription information and/or local policy, the SMF may make policy decision and may determine/generate/create/derive one or more PCC rules comprising one or more charging control rules, the one or more PCC rules and/or the one or more charging control rules may apply to at least one PDU session identified by a PDU session identifier, and/or at least one QoS flow identified by a QoS flow identifier (QFI), and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. For example, based on the vehicle manufacturer name and/or the vehicle model and/or the VIN and/or subscription information and/or local policy, the SMF may determine a PCC rule and/or a charging control rule, wherein the PCC rule and/or the charging control rule may comprise one or more charging parameters. A charging parameter may comprise a service and bill payer information. In an example, the SMF may determine the one or more charging parameters based on the subscription service and bill payer information. For example, the service and bill payer information of a charging parameter may be the same as the subscription service and bill payer information. For example, the service and bill payer information of a charging parameter may be different from the subscription service and bill payer information. In one example, the PCC rule and/or the charging control rule may comprise a charging parameter, and the charging parameter may comprise a service and bill payer information, and the service and bill payer information may comprise at least one of: a first service type (e.g. web browsing); a first QoS policy for the first service type; a first charging policy (e.g. an online charging method, a first charging rate) for the first service type; a first bill payer (e.g. vehicle driver, the passenger in the vehicle) for the first service type; a second service type (e.g. vehicle remote diagnostics); a second QoS policy for the second service type; a second charging policy (e.g. an offline charging method, a second charging rate) for the second service type; a second bill payer (e.g. vehicle manufacturer) for the second service type. For example, the SMF may determine a PCC rule for Mercedes-Benz (vehicle manufacturer) GLE SUV (vehicle model), and the PCC rule may comprise a first service type (e.g. web browsing); a first QoS policy (e.g. bandwidth of 10 Mbps) for the first service type; a first charging rate (e.g. $30 per month) for the first service type; a second service type (e.g. 8K ultra-high-definition (UHD) video); a second QoS policy (e.g. bandwidth of 1 Gbps) for the second service type; a second charging rate (e.g. $100 per month) for the second service type; a first bill payer (e.g. vehicle owner) for the first service type and/or the second service type; a third service type (e.g. vehicle remote maintenance); a third QoS policy (e.g. bandwidth of 5 Mbps) for the third service type; a third charging rate (e.g. $10 per month) for the third service type; a second bill payer (e.g. Mercedes-Benz).

In one example, the PCC rule and/or the charging control rule may comprise a first charging parameter and/or a second charging parameter. The first charging parameter may comprise a first service and bill payer information, and the first service and bill payer information may comprise at least one of: a first service type (e.g. web browsing); a first QoS policy for the first service type; a first charging policy (e.g. an online charging method, a first charging rate) for the first service type; and/or a first bill payer (e.g. vehicle driver, the passenger in the vehicle) for the first service type. The second charging parameter may comprise a second service and bill payer information, and the second service and bill payer information may comprise at least one of: a second service type (e.g. vehicle remote diagnostics); a second QoS policy for the second service type; a second charging policy (e.g. an offline charging method, a second charging rate) for the second service type; and/or a second bill payer (e.g. vehicle manufacturer) for the second service type.

In an example action, the SMF may select a CHF based on the vehicle manufacturer name and/or the vehicle model and/or the vehicle parameter (e.g. VIN), for example, the SMF may select a CHF specifically for the vehicle terminals. In an example action, the SMF may send to the CHF a message (e.g. charging data request). The charging data request message may comprise the vehicle manufacturer name and/or the vehicle model and/or the vehicle parameter (e.g. UE identity of the vehicle terminal, VIN). The charging data request may comprise the PDU session ID. The charging data request message may indicate different service for different bill payer by comprising the one or more charging parameters (e.g. service and bill payer information). The service and bill payer information may be for the PDU session and/or the wireless device/vehicle terminal. In response to the message received from the SMF, based on one or more charging parameters (e.g. service and bill payer information) and/or the vehicle manufacturer name and/or the vehicle model and/or the vehicle parameter (e.g. VIN), the CHF may determine quota (e.g. volume quota, time quota) for the wireless device/vehicle terminal per service type per bill payer. The determined quota may be for the PDU session. The determined quota may be for a QoS flow. For example, the CHF may determine a first volume quota and/or a first time quota for the wireless device/vehicle terminal and/or for the first service type and/or for the first bill payer. For example, the CHF may determine a second volume quota and/or a second time quota for the wireless device/vehicle terminal and/or for the second service type and/or for the second bill payer. The CHF may send to the SMF a response message (e.g. charging data response). The charging data response message may comprise the determined quota (e.g. the first volume quota and/or the first time quota, and/or the second volume quota and/or the second time quota).

In response to the message received from the CHF, the SMF may enforce the determined quota and/or PCC rule and/or charging control rule. For example, based on the vehicle manufacturer name and/or the vehicle model and/or the VIN, the SMF may select a UPF for wireless device/vehicle terminal. In an example action, based on the determined quota received from the CHF, and/or based on the PCC rule and/or charging control rule, the SMF may determine at least one user plane rule for the PDU session and/or the wireless device/vehicle terminal. The at least one user plane rule may comprise: at least one packet detection rule; at least one forwarding action rule; at least one QoS enforcement rule; or at least one usage reporting rule. For example, the SMF may determine the at least one packet detection rule based on the service and bill payer information. For example, the at least one packet detection rule may be associated with a service type (e.g. the first service type). For example, based on the determined quota, the SMF may determine the at least one usage reporting rule associated with the at least one packet detection rule, wherein the usage reporting rule may comprise quota threshold (e.g. volume threshold, time threshold) and/or event (e.g. service stop) and/or trigger (e.g. every midnight) to report the usage.

In an example, the SMF may determine/keep mapping information in a mapping table for the wireless device/vehicle terminal (e.g. identified by the UE identity of the vehicle terminal). The mapping table may comprise the mapping information between the wireless device/vehicle terminal, and/or associated service type for the wireless device/vehicle terminal, and/or the associated bill payer information for the wireless device/vehicle terminal, and/or the associated at least one user plane rule for the wireless device/vehicle terminal, and/or the associated vehicle manufacturer name for the wireless device/vehicle terminal, and/or the associated vehicle model for the wireless device/vehicle terminal, and/or the associated PCC rule for the wireless device/vehicle terminal, and/or associated charging control rule for the wireless device/vehicle terminal, and/or associated PDU session for the wireless device/vehicle terminal. For example, the mapping table may comprise vehicle terminal 1 associated with a first service type (web browsing), and/or associated with the first bill payer (vehicle owner), and/or associated with the first user plane rule, and/or associated with Mercedes-Benz (vehicle manufacturer) GLE SUV (vehicle model), and/or associated with PCC rule 1, and/or associated with charging control rule 1, and/or associated with PDU session 1. For example, the mapping table may comprise a vehicle terminal 1 associated with a second service type (remote car maintenance), and/or associated with the second bill payer (vehicle manufacturer), and/or associated with the second user plane rule, and/or associated with Mercedes-Benz (vehicle manufacturer) GLE SUV (vehicle model), and/or associated with vehicle terminal 1, and/or associated with PCC rule 2, and/or associated with charging control rule 2, and/or associated with PDU session 1.

In an example action, the SMF may send to the UPF a message (e.g. N4 session establishment/modification request). The N4 session establishment/modification request message may comprise the at least one user plane rule and/or the vehicle parameter (e.g. UE identity of the vehicle terminal). For example, the N4 session establishment/modification request message may comprise a first packet detection rule and/or an associated first usage report rule and/or an associated first service type. For example, N4 session establishment/modification request message may comprise a second packet detection rule and/or an associated second usage report rule and/or an associated second service type.

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), for example, the data/traffic packets may match the first service type, or the second service type. The UPF may apply other user plane rules (e.g. associated usage reporting rule) to the data/traffic packets matched the packet detection rule (e.g. the first service type, or the second service type).

In an example, the UPF may enforce the at least one usage reporting rule by measuring network resources usage in terms of traffic data volume, duration (e.g. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (e.g. time) and/or usage report rule information (e.g. an identity of the first usage reporting rule) and/or the UE identity of the vehicle terminal and/or the associated service type (e.g. the associated first service type). For example, the traffic data volume, duration (e.g. time) may be applied to at least one of: the first service type, the second service type, the wireless device/vehicle terminal, the PDU session, a QoS flow, a service data flow, an application, a network slice, or a data network.

In response to the network resource usage report received from the UPF, based on the information received from the UPF and/or the mapping information in the mapping table, the SMF may map the received network resources usage to the service type (e.g. first service type, the second service type) and/or the bill payer (e.g. the first bill payer, the second bill payer) and/or PDU session and/or network slice and/or the wireless device/vehicle terminal. The SMF may map the received network resource usage to the vehicle parameter (e.g. UE identity of the vehicle terminal, VIN) and/or associated vehicle manufacturer name and/or manufacturer model. In an example, the SMF may send to the CHF a message (e.g. charging data request [update]) comprising a CDR and/or associated vehicle parameter (e.g. UE identity of the vehicle terminal, VIN) and/or associated vehicle manufacturer name and/or manufacturer model. The CDR may comprise the network resources usage per service type per bill payer. For example, the CDR may comprise a first volume usage and/or a first time usage for the first service type and/or for the first bill payer. For example, the CDR may comprise a second volume usage and/or a second time usage for the second service type and/or for the second bill payer.

In an example, the SMF may send to the CHF a message (e.g. charging data request [update]) comprising one or more CDRs and/or associated vehicle parameter (e.g. UE identity of the vehicle terminal, VIN) and/or associated vehicle manufacturer name and/or manufacturer model. For example, the charging data request may comprise a first CDR and/or a second CDR. The first CDR may comprise the network resources usage for the first service type and/or for the first bill payer. For example, the first CDR may comprise a first volume usage and/or a first time usage for the first service type and/or for the first bill payer. For example, the second CDR may comprise the network resources usage for the second service type and/or for the second bill payer. For example, the second CDR may comprise a second volume usage and/or a second time usage for the second service type and/or for the second bill payer.

In response to the message received from the SMF, the CHF may take one or more actions. In an example action, the CHF may receive a CDR from the SMF, and the CDR may comprise network resources usage for one or more service types (e.g. the CDR may comprise a first volume/time usage for the first service type and/or a second volume/time usage for the second service type). Based on the vehicle parameter (e.g. UE identity of the vehicle terminal, VIN) and/or vehicle manufacturer name and/or manufacturer model, the CHF may map the network resources usage of the one or more service types to one or more bill payers. For example, the CHF may map the first service type (e.g. web browsing) to the first bill payer (e.g. vehicle driver, the passenger in the vehicle). For example, the CHF may map the second service type (e.g. vehicle remote diagnostics) to the second bill payer (e.g. vehicle manufacturer).

In an example action, the CHF may receive a one or more CDRs (e.g. a first CDR and/or a second CDR) from the SMF, and the one or more CDRs may comprise network resources usage for one or more service types (e.g. a first service type and/or a second service type). For example, the first CDR may comprise a first volume/time usage for the first service type, and the second CDR may comprise a second volume/time usage for the second service type. In an example action, based on vehicle parameter (e.g. UE identity of the vehicle terminal, VIN) and/or vehicle manufacturer name and/or manufacturer model, the CHF may map CDRs to bill payers. For example, the CHF may map the first CDR to a first bill payer (e.g. vehicle driver, the passenger in the vehicle). For example, the CHF may map the second CDR to a second bill payer (e.g. vehicle manufacturer).

In an example action, the CHF may send to a BD a message (e.g. CDR file message). The CDR file message may comprise the CDR and associated bill payer information. In an example, the CDR file message may comprise a CDR, wherein the CDR may comprise a first service type (e.g. web browsing), a first bill payer (e.g. vehicle driver, the passenger in the vehicle) for the first service type, a second service type (e.g. vehicle remote diagnostics), and/or a second bill payer (e.g. vehicle manufacturer) for the second service type. In an example, the CDR file message may comprise one or more CDRs (e.g. a first CDR and/or a second CDR) and/or associated bill payers (e.g. a first bill payer and/or a second bill payer). For example, the CDR file message may comprise a first CDR, a first bill payer for the first CDR, a second CDR, and/or a second bill payer for the second CDR.

Figure 22:
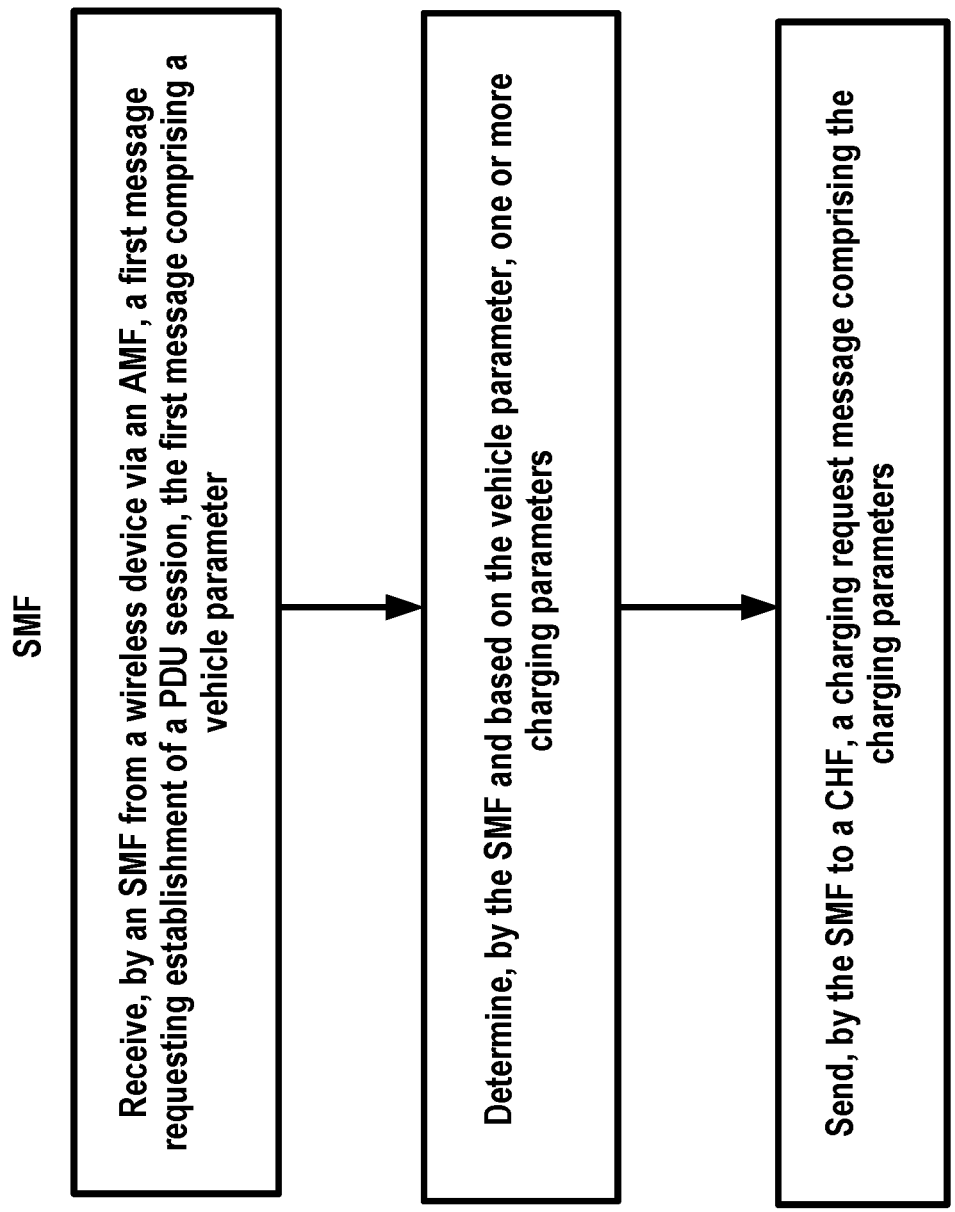
FIG. 22 is a diagram depicting a SMF procedure of an aspect of an example embodiment of the present disclosure.
Figure 23:
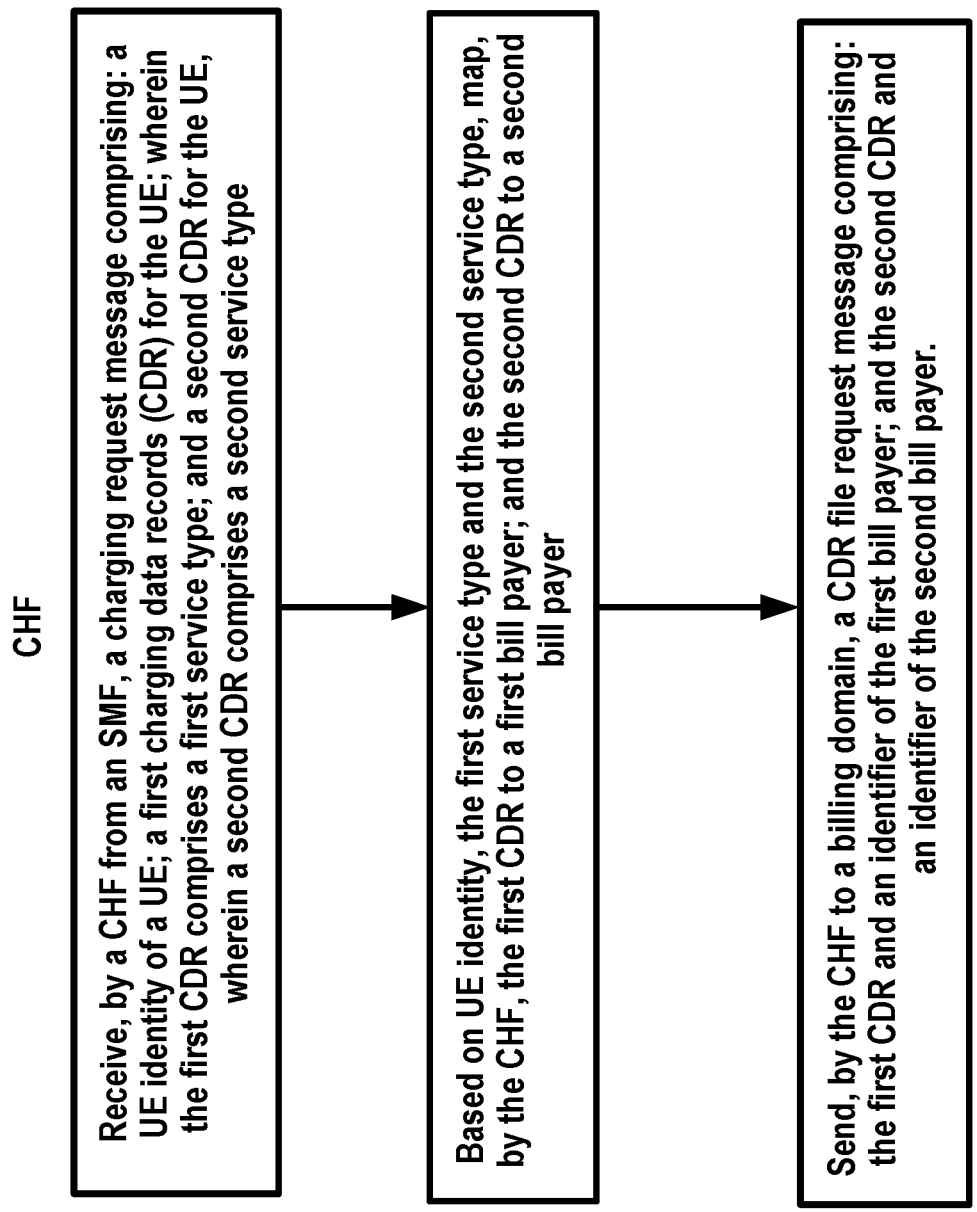
FIG. 23 is a diagram depicting a CHF procedure of an aspect of an example embodiment of the present disclosure.

In response to the message received from the CHF, the BD may perform the charging/accounting for bill payer based on the service type (e.g. the first bill payer pays for the first service, the second bill payer pays for the second service). The BD may perform the charging/accounting for bill payer based on the CDR (e.g. the first bill payer pays for the first CDR, the second bill payer pays for the second CDR). FIG. 22 is an example diagram depicting the procedures of SMF as per an aspect of an embodiment of the present disclosure. FIG. 23 is an example diagram depicting the procedures of CHF as per an aspect of an embodiment of the present disclosure.

Figure 24:
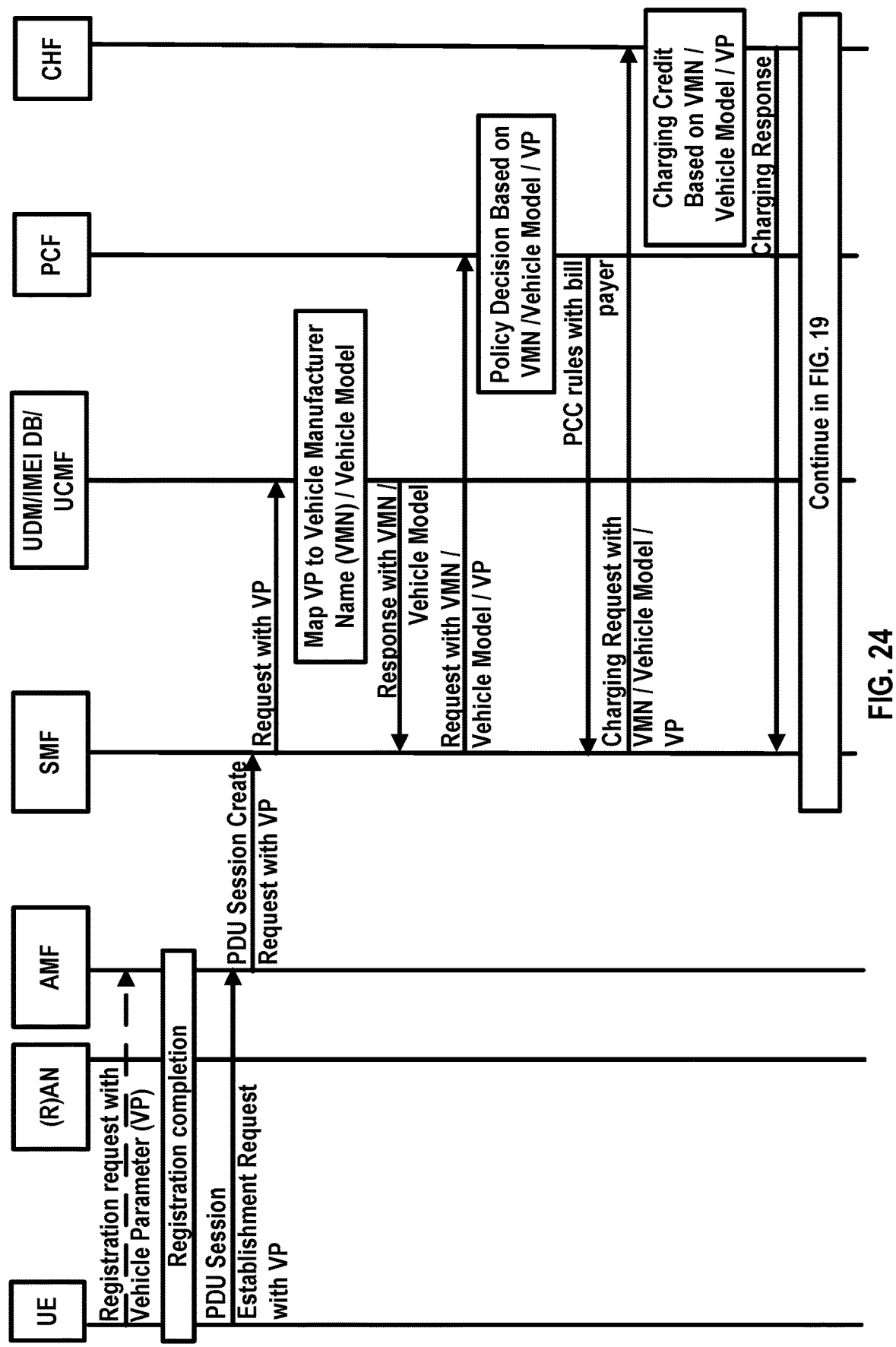
FIG. 24 is a call flow diagram illustrating an aspect of an example embodiment of the present disclosure.

FIG. 24 and FIG. 19 show example call flows which may comprise one or more actions. In an example, a UE may send to a (R)AN an AN message. The AN message may comprise AN parameters and/or registration request message. In an example, the AN parameters may comprise a vehicle parameter. In an example, the registration request message may comprise the vehicle parameter. The vehicle parameter may comprise a UE identity of the vehicle terminal, wherein the UE identity of the vehicle terminal may comprise at least one of: a subscription permanent identifier (SUPI); a subscription concealed identifier (SUCI); a permanent equipment identifier (PEI); a generic public subscription identifier (GPSI); a 5G globally unique temporary identifier (5G-GUTI); a 5G S-Temporary Mobile Subscription Identifier (5G-S-TMSI); or a source layer-2 ID. In an example, the UE identity of the vehicle terminal may comprise user biometric information, and the user biometric information may comprise at least one of: finger-print information; face recognition information; or voice recognition information. In an example, the vehicle parameter may comprise a vehicle identification number (VIN). For example, the vehicle parameter may comprise a complete VIN. For example, the vehicle parameter may comprise part of VIN, e.g. world manufacturer identifier, vehicle descriptor section, vehicle identifier section, plant code, and/or production number. In an example, the UE identity of the vehicle terminal (e.g. SUPI, PEI) may comprise the VIN or part of VIN.

In an example, the registration request message may comprise at least one of: registration type, SUCI or 5G-GUTI or PEI, last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, [Requested Active Time], Requested DRX parameters, [extended idle mode DRX parameters], [LADN DNN(s) or Indicator Of Requesting LADN Information], [NAS message container], Support for restriction of use of Enhanced Coverage, [Preferred Network Behaviour], [Service Gap Control Capability]), UE Policy Container (the list of PSIs, indication of UE support for ANDSP and the operating system identifier) and/or [UE Radio Capability ID]). FIG. 20 is a diagram depicting an example REGISTRATION REQUEST message, the REGISTRATION REQUEST message may comprise an information element/parameter indicating vehicle parameter, and the vehicle parameter may comprise a VIN. In an example, the 5GS mobile identity in the REGISTRATION REQUEST message may comprise the UE identity of the vehicle terminal.

In response to the message received from the UE, the (R)AN may send an N2 message to an AMF. The N2 message may comprise N2 parameters and/or the registration request message received from the UE. In an example, the N2 parameters may comprise the vehicle parameter. In an example, the N2 parameters may comprise selected PLMN ID, location information and cell Identity related to the cell in which the UE is camping, In an example, the N2 parameters may comprise UE Context Request which indicates that a UE context including security information needs to be setup at the NG-RAN. In response to the message received from the (R)AN, the AMF may store the vehicle parameter. There may be one or more actions to complete the registration procedure.

In an example, the UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container. In an example, the NAS message may comprise the vehicle parameter (e.g. UE identity of the vehicle terminal, VIN). In an example, the PDU session establishment request message may comprise the vehicle parameter (e.g. UE identity of the vehicle terminal, VIN). In an example, the vehicle parameter may comprise a vehicle identification number (VIN). For example, the vehicle parameter may comprise a complete VIN. For example, the vehicle parameter may comprise part of VIN, e.g. world manufacturer identifier, vehicle descriptor section, vehicle identifier section, plant code, and/or production number.

The PDU session establishment request message may comprise at least one of: a PDU session ID, Requested PDU Session Type, or a Requested SSC mode, etc. In response to the message received from the UE, the AMF may select an SMF and send to the SMF a message (e.g. PDUSession_CreateSMContext Request) comprising at least one of: the vehicle parameter, SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). As an example, the PCF identifier may be an identifier, or an IP address, or FQDN to identify the PCF. FIG. 21 is a diagram depicting an example PDU SESSION ESTABLISHMENT REQUEST message, the PDU SESSION ESTABLISHMENT REQUEST message may comprise an information element/parameter indicating vehicle parameter, and the vehicle parameter may comprise a VIN.

In response to the message received from the AMF, the SMF may take one or more actions. In an example action, the SMF may send to the AMF a response message (e.g. PDUSession_CreateSMContext Response) comprising at least one of: Cause, SM Context ID or N1 SM container (PDU Session Reject (Cause)). In an example action, the SMF may send to a network function (e.g. UDM, IMEI DB, UCMF) a request message (e.g. subscription request message). The request message (e.g. subscription request message) may comprise the vehicle parameter. The request message (e.g. subscription request message) may indicate requesting subscription information of the wireless device/vehicle terminal. The request message (e.g. subscription request message) may indicate requesting vehicle manufacturer name and/or vehicle model for the vehicle parameter (e.g. UE identity of the vehicle terminal, VIN). For example, the request message (e.g. subscription request message) may comprise an information element indicating requesting vehicle manufacturer name and/or vehicle model for the vehicle parameter.

In response to the message received from the SMF, the network function (e.g. UDM, IMEI DB, UCMF) may map the vehicle parameter to vehicle manufacturer name and/or vehicle model for the wireless device/vehicle terminal (e.g. vehicle manufacturer name and/or vehicle model of the vehicle, where the wireless device/vehicle terminal is installed in the vehicle). For example, the network function (e.g. UDM, IMEI DB, UCMF) may determine vehicle manufacturer name and/or vehicle model based on the vehicle parameter. For example, based on subscription information and/or local configuration, the UDM may map the UE identity of the vehicle terminal (e.g. SUPI, PEI, GPSI, 5G-GUTI, 5G-S-TMSI, and/or source layer-2 ID) to a vehicle manufacturer name and/or a vehicle model. For example, based on subscription information and/or local configuration, the UDM may map user biometric information (finger-print information, face recognition information, and/or voice recognition information) to a vehicle manufacturer name and/or a vehicle model. For example, the network function may map the VIN to a vehicle manufacturer name and/or a vehicle model. For example, the network function may determine a vehicle manufacturer name and/or a vehicle model based on a VIN or part of VIN. For example, the network function may determine/derive a vehicle manufacturer name and/or a vehicle model based on a world manufacturer identifier of the VIN. For example, the network function may determine/derive a vehicle manufacturer name and/or a vehicle model based on a vehicle identifier section of the VIN. For example, the network function may determine/derive a vehicle manufacturer name and/or a vehicle model based on a plant code, and/or production number of the VIN. For example, based on local configuration, the IMEI DB may map a PEI/IMEI to a vehicle manufacturer name and/or a vehicle model. The vehicle manufacturer name may indicate a vehicle manufacturer, a car maker, and/or the like, e.g. Mercedes-Benz, BMW. The vehicle model may indicate a vehicle type (e.g. SUV, sedan). The vehicle model may indicate a vehicle series of a vehicle manufacturer, for example, BMW X7, Mercedes-Benz GLE 500. In an example, the network function may determine/derive a subscription service and bill payer information based on the information received from the SMF (e.g. VIN) and/or local configuration. The subscription service and bill payer information may comprise at least one of: a subscription first service type (e.g. web browsing); a subscription first QoS policy for the subscription first service type; a subscription first charging policy (e.g. an online charging method, a charging rate) for the subscription first service type; a subscription first bill payer (e.g. vehicle driver, the passenger in the vehicle) for the subscription first service type; a subscription second service type (e.g. vehicle remote diagnostics); a subscription second QoS policy for the subscription second service type; a subscription second charging policy (e.g. an offline charging method, a charging rate) for the subscription second service type; and/or a subscription second bill payer (e.g. vehicle manufacturer) for the subscription second service type.

The network function (e.g. UDM, IMEI DB, UCMF) may send to the SMF a response message comprising the vehicle manufacturer name and/or the vehicle model. For example, the UDM may send to the SMF a subscription response message, the subscription response message may comprise the vehicle manufacturer name and/or the vehicle model for the wireless device/vehicle terminal. The subscription response message may comprise the subscription information of the wireless device/vehicle terminal. For example, the subscription information of the wireless device/vehicle terminal may comprise the subscription service and bill payer information.

In response to the message received from the network function (e.g. UDM, IMEI DB, UCMF), the SMF may take one or more actions. In an example action, if dynamic PCC is deployed and a PCF ID is provided by the AMF, the SMF may performs PCF selection procedure by selecting a PCF (e.g. based on the PCF identifier received). The SMF may send to the PCF a message (e.g. policy association establishment request) to establish a PDU session with the selected PCF and get PCC rule and/or charging control rule for the PDU Session and/or for the wireless device/vehicle terminal. The PDU session may be identified by the PDU Session ID. The policy association establishment request message may comprise the vehicle parameter (e.g. UE identity of the vehicle terminal, VIN). The policy association establishment request message may comprise the vehicle manufacturer name and/or the vehicle model for the wireless device/vehicle terminal. The policy association establishment request message may comprise the subscription service and bill payer information. The policy association establishment request message may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF).

In response to the message received, the PCF may take one or more actions. In an example action, based on the vehicle manufacturer name and/or the vehicle model and/or the vehicle parameter (e.g. VIN) and/or subscription information and/or local policy, the PCF may make policy decision and may determine/generate/create/derive one or more PCC rules comprising one or more charging control rules, the one or more PCC rules and/or the one or more charging control rules may apply to at least one PDU session identified by a PDU session identifier, and/or at least one QoS flow identified by a QoS flow identifier (QFI), and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. For example, based on the vehicle manufacturer name and/or the vehicle model and/or the VIN and/or subscription information and/or local policy, the PCF may determine a PCC rule and/or a charging control rule, wherein the PCC rule and/or the charging control rule may comprise a service and bill payer information. In an example, the PCF may determine the service and bill payer information based on the subscription service and bill payer information. For example, the service and bill payer information may be the same as the subscription service and bill payer information. For example, the service and bill payer information may be different from the subscription service and bill payer information. The service and bill payer information may comprise at least one of: a first service type (e.g. web browsing);

a first QoS policy for the first service type; a first charging policy (e.g. an online charging method, a first charging rate) for the first service type; a first bill payer (e.g. vehicle driver, the passenger in the vehicle) for the first service type; a second service type (e.g. vehicle remote diagnostics); a second QoS policy for the second service type; a second charging policy (e.g. an offline charging method, a second charging rate) for the second service type; a second bill payer (e.g. vehicle manufacturer) for the second service type. For example, the PCF may determine a PCC rule for BMW (vehicle manufacturer) X7 (vehicle model), and the PCC rule may comprise a first service type (e.g. web browsing); a first QoS policy (e.g. bandwidth of 10 Mbps) for the first service type; a first charging rate (e.g. $30 per month) for the first service type; a second service type (e.g. video on demand); a second QoS policy (e.g. bandwidth of 100 Mbps) for the second service type; a second charging rate (e.g. $100 per month) for the second service type; a first bill payer (e.g. vehicle owner) for the first service type and/or the second service type; a third service type (e.g. vehicle remote maintenance); a third QoS policy (e.g. bandwidth of 5 Mbps) for the third service type; a third charging rate (e.g. $10 per month) for the third service type; a second bill payer (e.g. BMW). In an example action, the PCF may send to the SMF a response message (e.g. policy association establishment response), the policy association establishment response message may comprise the one or more PCC rules and/or the one or more charging control rules, and the one or more PCC rules and/or the one or more charging control rules may comprise the service and bill payer information.

In response to the message received from the PCF, the SMF may take one or more actions. In an example action, the SMF may select a CHF based on the vehicle parameter, e.g. the SMF may select a CHF specifically for the vehicle terminals. For example, the SMF may select a CHF based on VIN. For example, the SMF may select a CHF based on part of VIN, e.g. vehicle manufacturer name and/or the vehicle model. In an example action, the SMF may send to the CHF a message (e.g. charging data request). The charging data request message may comprise the vehicle manufacturer name and/or the vehicle model and/or the vehicle parameter (e.g. UE identity of the vehicle terminal, VIN). The charging data request may comprise the PDU session ID. The charging data request message may indicate different service for different bill payer by comprising the service and bill payer information. The service and bill payer information may be for the PDU session and/or the wireless device/vehicle terminal. In response to the message received from the SMF, based on service and bill payer information and/or the vehicle manufacturer name and/or the vehicle model and/or the vehicle parameter (e.g. VIN), the CHF may determine quota (e.g. volume quota, time quota) for the wireless device/vehicle terminal per service type per bill payer. The determined quota may be for the PDU session. The determined quota may be for a QoS flow. For example, the CHF may determine a first volume quota and/or a first time quota for the wireless device/vehicle terminal and/or for the first service type and/or for the first bill payer. For example, the CHF may determine a second volume quota and/or a second time quota for the wireless device/vehicle terminal and/or for the second service type and/or for the second bill payer. The CHF may send to the SMF a response message (e.g. charging data response). The charging data response message may comprise the determined quota (e.g. the first volume quota and/or the first time quota, and/or the second volume quota and/or the second time quota).

In response to the message received from the CHF, the SMF may enforce the determined quota (e.g. received from the CHF) and/or the one or more PCC rules and/or the one or more charging control rules (e.g. received from the PCF). For example, based on the vehicle manufacturer name and/or the vehicle model and/or the VIN, the SMF may select a UPF for wireless device/vehicle terminal. In an example action, based on the determined quota received from the CHF, and/or based on the one or more PCC rule and/or one or more charging control rule, the SMF may determine at least one of the following user plane rules for the PDU session and/or the wireless device/vehicle terminal: at least one packet detection rule; at least one forwarding action rule; at least one QoS enforcement rule; or at least one usage reporting rule. For example, the SMF may determine the at least one packet detection rule based on the service and bill payer information (e.g. the first service type, the second service type). For example, based on the determined quota, the SMF may determine the at least one usage reporting rule associated with the at least one packet detection rule, wherein the usage reporting rule may comprise quota threshold (e.g. volume threshold, time threshold) and/or event (e.g. service stop) and/or trigger (e.g. every midnight) to report the usage. In an example action, the SMF may send to the UPF a message (e.g. N4 session establishment/modification request). The N4 session establishment/modification request message may comprise the at least one user plane rules and/or the vehicle parameter (e.g. UE identity of the vehicle terminal).

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), for example, the data/traffic packets may match the first service type, or the second service type. The UPF may apply other user plane rules (e.g. usage reporting rule) to the data/traffic packets matched the packet detection rule (e.g. the first service type, or the second service type).

In an example, the UPF may enforce the at least one usage reporting rule by measuring network resources usage in terms of traffic data volume, duration (e.g. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (e.g. time) applied to at least one of: the first service type, the second service type, the wireless device/vehicle terminal, the PDU session, a QoS flow, a service data flow, an application, a network slice, or a data network.

The SMF may map the received network resources usage to the service type (e.g. first service type, the second service type) and/or the bill payer (e.g. the first bill payer, the second bill payer) and/or PDU session and/or network slice and/or the wireless device/vehicle terminal. The SMF may map the received network resource usage to the vehicle parameter (e.g. UE identity of the vehicle terminal, VIN) and/or associated vehicle manufacturer name and/or manufacturer model. In an example, the SMF may send to the CHF a message (e.g. charging data request [update]) comprising a CDR and/or associated vehicle parameter (e.g. UE identity of the vehicle terminal, VIN) and/or associated vehicle manufacturer name and/or manufacturer model. The CDR may comprise the network resources usage per service type per bill payer. For example, the CDR may comprise a first volume usage and/or a first time usage for the first service type and/or for the first bill payer. For example, the CDR may comprise a second volume usage and/or a second time usage for the second service type and/or for the second bill payer.

In an example, the SMF may send to the CHF a message (e.g. charging data request [update]) comprising one or more CDRs and/or associated vehicle parameter (e.g. UE identity of the vehicle terminal, VIN) and/or associated vehicle manufacturer name and/or manufacturer model. For example, the charging data request may comprise a first CDR and/or a second CDR. The first CDR may comprise the network resources usage for the first service type and/or for the first bill payer. For example, the first CDR may comprise a first volume usage and/or a first time usage for the first service type and/or for the first bill payer. For example, the second CDR may comprise the network resources usage for the second service type and/or for the second bill payer. For example, the second CDR may comprise a second volume usage and/or a second time usage for the second service type and/or for the second bill payer.

In response to the message received from the SMF, the CHF may take one or more actions. In an example action, the CHF may receive a CDR from the SMF, and the CDR may comprise network resources usage for one or more service types (e.g. the CDR may comprise a first volume/time usage for the first service type and/or a second volume/time usage for the second service type). Based on the vehicle parameter (e.g. UE identity of the vehicle terminal, VIN) and/or vehicle manufacturer name and/or manufacturer model, the CHF may map the network resources usage of the one or more service types to one or more bill payers. For example, the CHF may map the first service type (e.g. web browsing) to the first bill payer (e.g. vehicle driver, the passenger in the vehicle). For example, the CHF may map the second service type (e.g. vehicle remote diagnostics) to the second bill payer (e.g. vehicle manufacturer).

In an example action, the CHF may receive a one or more CDRs (e.g. a first CDR and/or a second CDR) from the SMF, and the one or more CDRs may comprise network resources usage for one or more service types (e.g. a first service type and/or a second service type). For example, the first CDR may comprise a first volume/time usage for the first service type, and the second CDR may comprise a second volume/time usage for the second service type. In an example action, based on vehicle parameter (e.g. UE identity of the vehicle terminal, VIN) and/or vehicle manufacturer name and/or manufacturer model, the CHF may map CDRs to bill payers. For example, the CHF may map the first CDR to a first bill payer (e.g. vehicle driver, the passenger in the vehicle). For example, the CHF may map the second CDR to a second bill payer (e.g. vehicle manufacturer).

In an example action, the CHF may send to a BD a message (e.g. CDR file message). The CDR file message may comprise the CDR and associated bill payer information. In an example, the CDR file message may comprise a CDR, wherein the CDR may comprise a first service type (e.g. web browsing), a first bill payer (e.g. vehicle driver, the passenger in the vehicle) for the first service type, a second service type (e.g. vehicle remote diagnostics), and/or a second bill payer (e.g. vehicle manufacturer) for the second service type. In an example, the CDR file message may comprise one or more CDRs (e.g. a first CDR and/or a second CDR) and/or associated bill payers (e.g. a first bill payer and/or a second bill payer). For example, the CDR file message may comprise a first CDR, a first bill payer for the first CDR, a second CDR, and/or a second bill payer for the second CDR.

In response to the message received from the CHF, the BD may perform the charging/accounting for bill payer based on the service type (e.g. the first bill payer pays for the first service, the second bill payer pays for the second service). The BD may perform the charging/accounting for bill payer based on the CDR (e.g. the first bill payer pays for the first CDR, the second bill payer pays for the second CDR).

Figure 25:
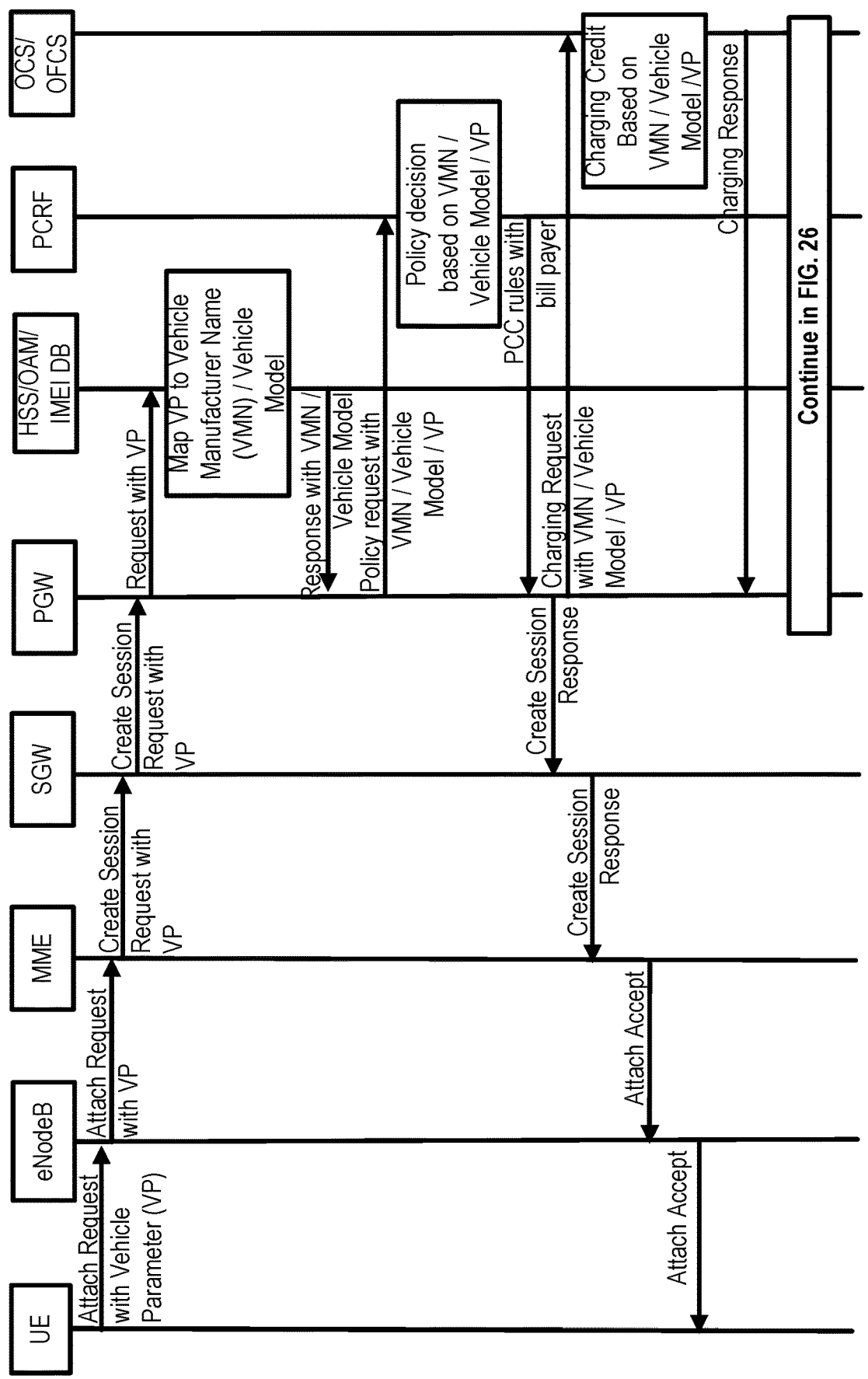
FIG. 25 is a call flow diagram illustrating an aspect of an example embodiment of the present disclosure.
Figure 26:
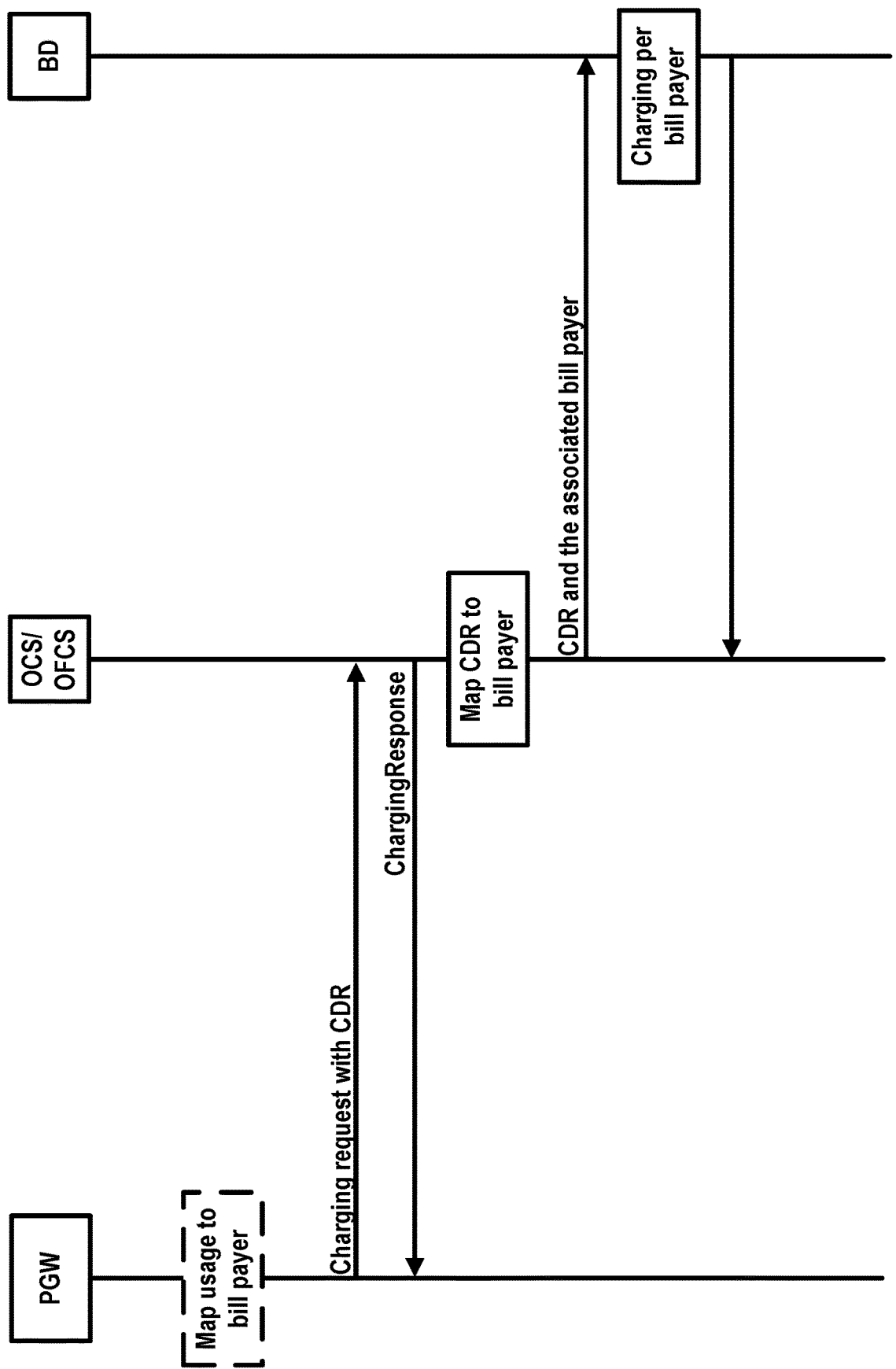
FIG. 26 is a call flow diagram illustrating an aspect of an example embodiment of the present disclosure.

FIG. 25 and FIG. 26 show example call flows which may comprise one or more actions. In an example, a UE may send to an eNodeB a first radio resource control (RRC) message comprising an attach request message. The attach request message may comprise a vehicle parameter. The vehicle parameter may comprise a UE identity of the vehicle terminal, wherein the UE identity of the vehicle terminal may comprise at least one of: an international mobile subscriber identity (IMSI); an International Mobile Equipment Identity (IMEI); a Mobile Station International Subscriber Directory Number (MSISDN); a globally unique temporary identifier (GUTI); a Temporary Mobile Subscription Identifier (TMSI); or a source layer-2 ID. In an example, the UE identity of the vehicle terminal may comprise user biometric information, and the user biometric information may comprise at least one of: finger-print information; face recognition information; or voice recognition information. In an example, the vehicle parameter may comprise a vehicle identification number (VIN). For example, the vehicle parameter may comprise a complete VIN. For example, the vehicle parameter may comprise part of VIN, e.g. world manufacturer identifier, vehicle descriptor section, vehicle identifier section, plant code, and/or production number. In an example, the UE identity of the vehicle terminal (e.g. GUTI, IMEI) may comprise the complete VIN or part of VIN.

The attach request message may comprise one or more of the following parameters: last visited TAI (if available), UE core network capability, attach type, MS network capability, and/or the like. In response to the message received from the UE, the eNodeB may forward to the MME the received attach request message comprising the vehicle parameter.

In response to the message received from the eNodeB, the MME may select a gateway (e.g. SGW or combined SGW/PGW), and send to the SGW a message, e.g. a create session request message. The create session request message may comprise the vehicle parameter. The create session request message may comprise one or more of the following parameters: MME TEID for control plane, RAT type, PGW address, PDN Address, default EPS bearer QoS, PDN type, subscribed APN-AMBR, EPS bearer Id, and/or protocol configuration options. In response to the message received from the MME, the SGW may create a new entry in its EPS Bearer table and store the information received from the MME, and may send to a PGW a create session request message comprising the information received from the MME (e.g. vehicle parameter). The create session request message may comprise one or more of the following parameters: Serving GW address for the user plane, Serving GW TEID of the user plane, Serving GW TEID of the control plane.

In response to the message received from the SGW, the PGW may take one or more actions. In an example action, the PGW may create a new entry in its EPS bearer context table, store the information received from the SGW, and generates a Charging Id for the default bearer. The new entry allows the PGW to route user plane PDUs between the S-GW and the packet data network. In an example action, the PGW may send to a network function (e.g. HSS, IMEI DB, OAM) a request message (e.g. subscription request message). The request message (e.g. subscription request message) may comprise the vehicle parameter. The request message (e.g. subscription request message) may indicate requesting subscription information of the wireless device/vehicle terminal. The request message (e.g. subscription request message) may indicate requesting vehicle manufacturer name and/or vehicle model for the vehicle parameter (e.g. UE identity of the vehicle terminal, VIN). For example, the request message (e.g. subscription request message) may comprise an information element indicating requesting vehicle manufacturer name and/or vehicle model for the vehicle parameter.

In response to the message received from the PGW, the network function (e.g. HSS, IMEI DB, OAM) may map the vehicle parameter to vehicle manufacturer name and/or vehicle model for the wireless device/vehicle terminal. For example, the network function (e.g. HSS, IMEI DB, OAM) may determine vehicle manufacturer name and/or vehicle model based on the vehicle parameter. For example, based on subscription information and/or local configuration, the HSS may map the UE identity of the vehicle terminal (e.g. IMSI, IMEI) to a vehicle manufacturer name and/or a vehicle model. For example, based on subscription information and/or local configuration, the HSS may map user biometric information (finger-print information, face recognition information, and/or voice recognition information) to a vehicle manufacturer name and/or a vehicle model. For example, the HSS/IMEI DB/OAM may map the VIN to a vehicle manufacturer name and/or a vehicle model. For example, the HSS/IMEI DB/OAM may determine a vehicle manufacturer name and/or a vehicle model based on a VIN or part of VIN. For example, the HSS/IMEI DB/OAM may determine/derive a vehicle manufacturer name and/or a vehicle model based on a world manufacturer identifier of the VIN. For example, the HSS/IMEI DB/OAM may determine/derive a vehicle manufacturer name and/or a vehicle model based on a vehicle identifier section of the VIN. For example, the HSS/IMEI DB/OAM may determine/derive a vehicle manufacturer name and/or a vehicle model based on a plant code, and/or production number of the VIN. For example, based on local configuration, the IMEI DB may map an IMEI to a vehicle manufacturer name and/or a vehicle model. The network function (e.g. HSS, IMEI DB, OAM) may send to the PGW a response message comprising the vehicle manufacturer name and/or the vehicle model. For example, the HSS may send to the PGW a subscription response message, the subscription response message may comprise the vehicle manufacturer name and/or the vehicle model for the wireless device/vehicle terminal. The subscription response message may comprise the subscription information of the wireless device/vehicle terminal. For example, the subscription information of the wireless device/vehicle terminal may comprise a subscription first service type (e.g. web browsing); a subscription first QoS policy for the subscription first service type; a subscription first charging policy (e.g. a charging rate) for the subscription first service type; a subscription first bill payer (e.g. vehicle driver, the passenger in the vehicle) for the subscription first service type; a subscription second service type (e.g. vehicle remote diagnostics); a subscription second QoS policy for the subscription second service type; a subscription second charging policy (e.g. a charging rate) for the subscription second service type; a subscription second bill payer (e.g. vehicle manufacturer) for the subscription second service type.

In response to the message received from the network function, the PGW may take one or more actions. In an example, PCC is not deployed, based on the vehicle manufacturer name and/or the vehicle model and/or the vehicle parameter (e.g. VIN) and/or subscription information and/or local policy, the PGW may make policy decision and may determine/generate/create/derive one or more PCC rules comprising one or more charging control rules, the one or more PCC rules and/or the one or more charging control rules may apply to the IP-CAN session and/or the vehicle terminal. For example, based on the vehicle manufacturer name and/or the vehicle model and/or the VIN and/or subscription information and/or local policy, the PGW may determine a PCC rule and/or a charging control rule, wherein the PCC rule and/or the charging control rule may comprise a service and bill payer information. The service and bill payer information may comprise at least one of: a first service type (e.g. web browsing); a first QoS policy for the first service type; a first charging policy (e.g. an online charging method, a first charging rate) for the first service type; a first bill payer (e.g. vehicle driver, the passenger in the vehicle) for the first service type; a second service type (e.g. vehicle remote diagnostics); a second QoS policy for the second service type; a second charging policy (e.g. an offline charging method, a second charging rate) for the second service type; a second bill payer (e.g. vehicle manufacturer) for the second service type. For example, the PGW may determine a PCC rule for Mercedes-Benz (vehicle manufacturer) GLE SUV (vehicle model), and the PCC rule may comprise a first service type (e.g. web browsing); a first QoS policy (e.g. bandwidth of 10 Mbps) for the first service type; a first charging rate (e.g. $30 per month) for the first service type; a second service type (e.g. 8K ultra-high-definition (UHD) video); a second QoS policy (e.g. bandwidth of 1 Gbps) for the second service type; a second charging rate (e.g. $100 per month) for the second service type; a first bill payer (e.g. vehicle owner) for the first service type and/or the second service type; a third service type (e.g. vehicle remote maintenance); a third QoS policy (e.g. bandwidth of 5 Mbps) for the third service type; a third charging rate (e.g. $10 per month) for the third service type; a second bill payer (e.g. Mercedes-Benz).

In an example, PCC is deployed, the PGW may send to a PCRF a message (e.g. IP-CAN session establishment request) to get the policy (s) for an IP-CAN session and/or for the wireless device/vehicle terminal. The IP-CAN session establishment request message may comprise vehicle manufacturer name and/or the vehicle model and/or the vehicle parameter (e.g. VIN). The IP-CAN session establishment request message may comprise IPv4 address and/or the IPv6 prefix of the UE and/or APN.

In response to the message received from the PGW, the PCRF may take one or more actions. In an example action, based on the vehicle manufacturer name and/or the vehicle model and/or the vehicle parameter (e.g. VIN) and/or subscription information and/or local policy, the PCRF may make policy decision and may determine/generate/create/derive one or more PCC rules comprising one or more charging control rules, the one or more PCC rules and/or the one or more charging control rules may apply to the IP-CAN session and/or the wireless device/vehicle terminal and/or service data flow and/or application. For example, based on the vehicle manufacturer name and/or the vehicle model and/or the VIN and/or subscription information and/or local policy, the PCRF may determine a PCC rule and/or a charging control rule, wherein the PCC rule and/or the charging control rule may comprise a service and bill payer information. The service and bill payer information may comprise at least one of: a first service type (e.g. web browsing); a first QoS policy for the first service type; a first charging policy (e.g. an online charging method, a first charging rate) for the first service type; a first bill payer (e.g. vehicle driver, the passenger in the vehicle) for the first service type; a second service type (e.g. vehicle remote diagnostics); a second QoS policy for the second service type; a second charging policy (e.g. an offline charging method, a second charging rate) for the second service type; a second bill payer (e.g. vehicle manufacturer) for the second service type. For example, the PCRF may determine a PCC rule for BMW (vehicle manufacturer) X7 (vehicle model), and the PCC rule may comprise a first service type (e.g. web browsing); a first QoS policy (e.g. bandwidth of 10 Mbps) for the first service type; a first charging rate (e.g. $30 per month) for the first service type; a second service type (e.g. video on demand); a second QoS policy (e.g. bandwidth of 100 Mbps) for the second service type; a second charging rate (e.g. $100 per month) for the second service type; a first bill payer (e.g. vehicle owner) for the first service type and/or the second service type; a third service type (e.g. vehicle remote maintenance); a third QoS policy (e.g. bandwidth of 5 Mbps) for the third service type; a third charging rate (e.g. $10 per month) for the third service type; a second bill payer (e.g. BMW). In an example action, the PCRF may send to the PGW a response message (e.g. IP-CAN session establishment response), the IP-CAN session establishment response message may comprise the one or more PCC rules and/or the one or more charging control rules, and the one or more PCC rules and/or the one or more charging control rules may comprise the service and bill payer information.

In response to the message received from the PCRF, the PGW may take one or more actions. In an example action, the PGW may send to the SGW a create session response message comprising one or more of the following parameters: PGW address for the user plane, PGW TEID of the user plane, PGW TEID of the control plane, PDN Type, PDN Address, EPS bearer Id, EPS bearer QoS, charging Id, and/or APN-AMBR). In response to the message received from the PGW, the SGW may correlate the Serving GW Address for the user plane and Serving GW TEID of the user plane, with the PGW address for the user plane and PGW TEID of the user plane received from the PGW. The SGW may send to the MME a create session response message comprising at least one of: PDN Type, PDN address, SGW address for User Plane, SGW TEID for User Plane, SGW TEID for control plane, EPS bearer Id, EPS bearer QoS, PGW address and TEID (GTP-based S5/S8) at the PGW for uplink traffic and/or APN-AMBR. The message may comprise restricted local operator service information received from the PGW. The MME may send to the eNodeB an attach accept message comprising one or more of the following parameters: GUTI, TAI List, and/or session management request message, where the session management request message may comprise one or more of the following parameters: APN, PDN type, PDN address, EPS bearer Identity, protocol configuration options, header compression configuration. The attach accept message may be contained in an S1_MME control message initial context setup request. The S1-AP initial context setup request message may also comprise the EPS bearer QoS, the UE-AMBR, EPS bearer Identity, as well as the TEID at the Serving GW used for user plane and the address of the Serving GW for user plane. The attach accept message may comprise the restricted local operator service information. In response to the message received from the MME, the eNodeB may send to the UE an RRC connection reconfiguration message comprising EPS radio bearer identity, and the attach accept message will be sent along to the UE, and/or the restricted local operator service information. Other signaling interactions may be performed by UE, eNodeB, MME and SGW to complete the attach procedure.

In an example action, the PGW may select an OCS/OFCS based on the vehicle manufacturer name and/or the vehicle model and/or the vehicle parameter (e.g. VIN), for example, the PGW may select an OCS/OFCS specifically for the vehicle terminals. In an example action, the PGW may send to the OCS a message (e.g. charging data request). The charging data request message may comprise the vehicle manufacturer name and/or the vehicle model and/or the vehicle parameter (e.g. UE identity of the vehicle terminal, VIN). The charging data request message may indicate different service for different bill payer by comprising the service and bill payer information. In response to the message received from the PGW, based on service and bill payer information and/or the vehicle manufacturer name and/or the vehicle model and/or the vehicle parameter (e.g. VIN), the OCS may determine quota (e.g. volume quota, time quota) for the wireless device/vehicle terminal per service type per bill payer. For example, the OCS may determine a first volume quota and/or a first time quota for the wireless device/vehicle terminal and/or for the first service type and/or for the first bill payer. For example, the OCS may determine a second volume quota and/or a second time quota for the wireless device/vehicle terminal and/or for the second service type and/or for the second bill payer. The OCS may send to the PGW a response message (e.g. charging data response). The charging data response message may comprise the determined quota (e.g. the first volume quota and/or the first time quota, and/or the second volume quota and/or the second time quota).

In response to the message received from the OCS, the PGW may enforce the determined quota (e.g. received from the OCS) and/or the one or more PCC rules and/or the one or more charging control rules (e.g. received from the PCRF). For example, when the UE sends traffic data to a data network (e.g. internet) and/or receives traffic data from the data network, based on the determine quota and/or the one or more PCC rules, the PGW may measuring network resources usage in terms of traffic data volume, duration (e.g. time) and/or events. The PGW may report the network resources usage to the OCS/OFCS when the quota/threshold reached, and/or event and/or another trigger is (are) met. In an example, the PGW may map the network resources usage to the service type (e.g. the first service type, the second service type) and/or the bill payer (e.g. the first bill payer, the second bill payer) and/or IP-CAN session and/or the wireless device/vehicle terminal. The PGW may map the network resources usage to the vehicle parameter (e.g. UE identity of the vehicle terminal, VIN) and/or associated vehicle manufacturer name and/or manufacturer model. In an example, the PGW may send to the OCS/OFCS a message (e.g. charging data request [update]) comprising a CDR and/or associated vehicle parameter (e.g. UE identity of the vehicle terminal, VIN) and/or associated vehicle manufacturer name and/or manufacturer model. The CDR may comprise the network resources usage per service type per bill payer. For example, the CDR may comprise a first volume usage and/or a first time usage for the first service type and/or for the first bill payer. For example, the CDR may comprise a second volume usage and/or a second time usage for the second service type and/or for the second bill payer.

In an example, the PGW may send to the OCS/OFCS a message (e.g. charging data request [update]) comprising one or more CDRs and/or associated vehicle parameter (e.g. UE identity of the vehicle terminal, VIN) and/or associated vehicle manufacturer name and/or manufacturer model. For example, the charging data request may comprise a first CDR and/or a second CDR. The first CDR may comprise the network resources usage for the first service type and/or for the first bill payer. For example, the first CDR may comprise a first volume usage and/or a first time usage for the first service type and/or for the first bill payer. For example, the second CDR may comprise the network resources usage for the second service type and/or for the second bill payer. For example, the second CDR may comprise a second volume usage and/or a second time usage for the second service type and/or for the second bill payer.

In response to the message received from the PGW, the OCS/OFCS may take one or more actions. In an example action, the OCS/OFCS may receive a CDR from the PGW, and the CDR may comprise network resources usage for one or more service types (e.g. the CDR may comprise a first volume/time usage for the first service type and/or a second volume/time usage for the second service type). Based on the vehicle parameter (e.g. UE identity of the vehicle terminal, VIN) and/or vehicle manufacturer name and/or manufacturer model, the OCS/OFCS may map the network resources usage of the one or more service types to one or more bill payers. For example, the OCS/OFCS may map the first service type (e.g. web browsing) to the first bill payer (e.g. vehicle driver, the passenger in the vehicle). For example, the OCS/OFCS may map the second service type (e.g. vehicle remote diagnostics) to the second bill payer (e.g. vehicle manufacturer).

In an example action, the OCS/OFCS may receive a one or more CDRs (e.g. a first CDR and/or a second CDR) from the PGW, and the one or more CDRs may comprise network resources usage for one or more service types (e.g. a first service type and/or a second service type). For example, the first CDR may comprise a first volume/time usage for the first service type, and the second CDR may comprise a second volume/time usage for the second service type. In an example action, based on vehicle parameter (e.g. UE identity of the vehicle terminal, VIN) and/or vehicle manufacturer name and/or manufacturer model, the OCS/OFCS may map CDRs to bill payers. For example, the OCS/OFCS may map the first CDR to a first bill payer (e.g. vehicle driver, the passenger in the vehicle). For example, the OCS/OFCS may map the second CDR to a second bill payer (e.g. vehicle manufacturer).

In an example action, the OCS/OFCS may send to a BD a message (e.g. CDR file message). The CDR file message may comprise the CDR and associated bill payer information. In an example, the CDR file message may comprise a CDR, wherein the CDR may comprise a first service type (e.g. web browsing), a first bill payer (e.g. vehicle driver, the passenger in the vehicle) for the first service type, a second service type (e.g. vehicle remote diagnostics), and/or a second bill payer (e.g. vehicle manufacturer) for the second service type. In an example, the CDR file message may comprise one or more CDRs (e.g. a first CDR and/or a second CDR) and/or associated bill payers (e.g. a first bill payer and/or a second bill payer). For example, the CDR file message may comprise a first CDR, a first bill payer for the first CDR, a second CDR, and/or a second bill payer for the second CDR.

In response to the message received from the OCS/OFCS, the BD may perform the charging/accounting for bill payer based on the service type (e.g. the first bill payer pays for the first service, the second bill payer pays for the second service). The BD may perform the charging/accounting for bill payer based on the CDR (e.g. the first bill payer pays for the first CDR, the second bill payer pays for the second CDR).

Figure 27:
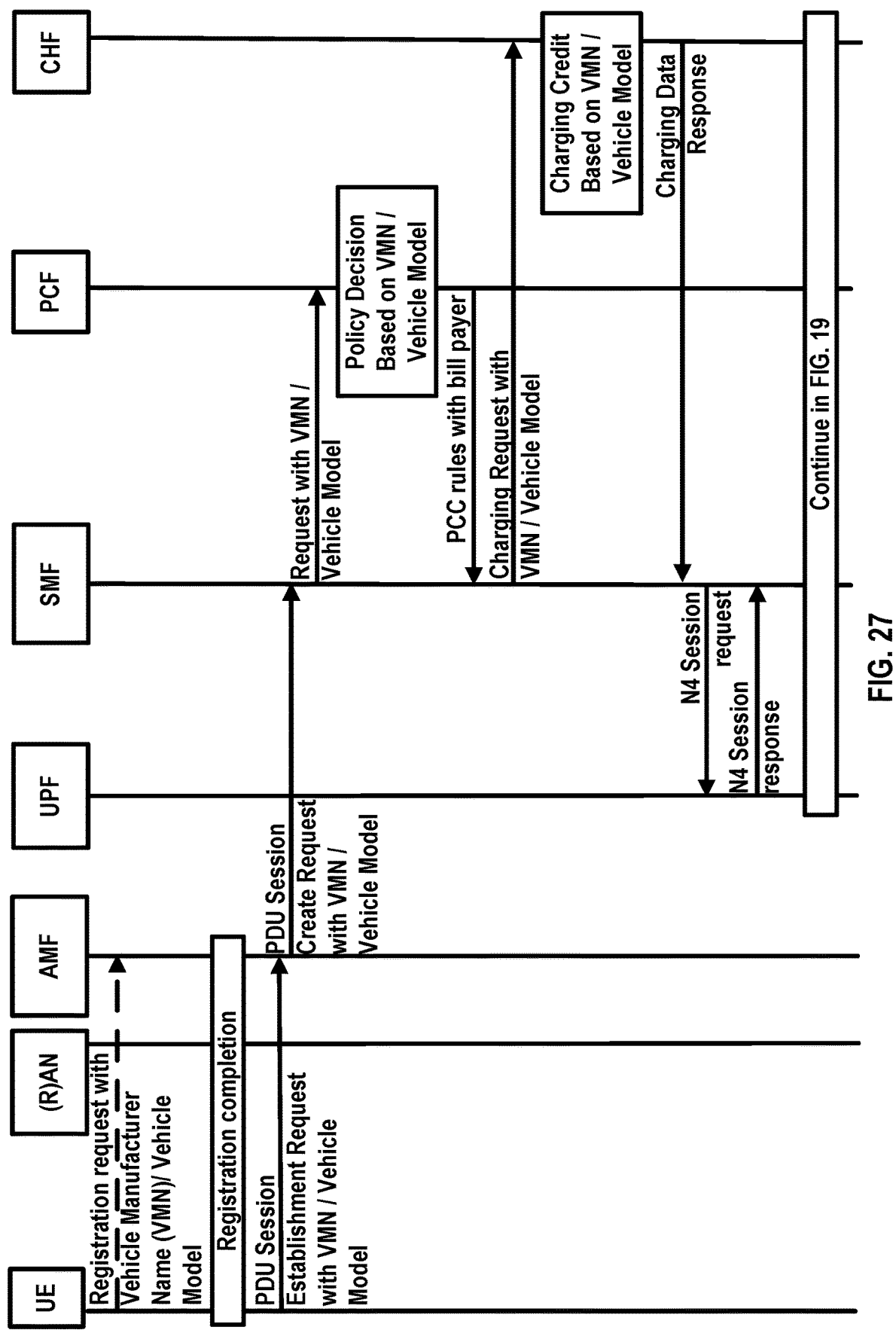
FIG. 27 is a call flow diagram illustrating an aspect of an example embodiment of the present disclosure.

FIG. 27 and FIG. 19 show example call flows which may comprise one or more actions. In an example, a UE may send to a (R)AN an AN message. The AN message may comprise AN parameters and/or registration request message. In an example, the AN parameters may comprise a vehicle manufacturer name and/or a vehicle model. In an example, the AN parameters may comprise a vehicle parameter, and the vehicle parameter may comprise a vehicle manufacturer name and/or a vehicle model. In an example, the registration request message may comprise vehicle manufacturer name and/or vehicle model. In an example, the registration request message may comprise a vehicle parameter, and the vehicle parameter may comprise a vehicle manufacturer name and/or a vehicle model. The vehicle manufacturer name may indicate a vehicle manufacturer, a car maker, and/or the like, e.g. Mercedes-Benz, BMW. The vehicle model may indicate a vehicle type (e.g. SUV, sedan). The vehicle model may indicate a vehicle series of a vehicle manufacturer, for example, BMW X5, BMW X7, Mercedes-Benz GLE 500. In an example, the registration request message may comprise at least one of: registration type, UE identity of the vehicle terminal (e.g. SUCI or 5G-GUTI or PEI), last visited TAI (if available), Security parameters, Requested NSSAI, [Mapping Of Requested NSSAI], Default Configured NSSAI Indication, UE Radio Capability Update, UE MM Core Network Capability, PDU Session status, List Of PDU Sessions To Be Activated, Follow-on request, MICO mode preference, [Requested Active Time], Requested DRX parameters, [extended idle mode DRX parameters], [LADN DNN(s) or Indicator Of Requesting LADN Information], [NAS message container], Support for restriction of use of Enhanced Coverage, [Preferred Network Behaviour], [Service Gap Control Capability]), UE Policy Container (the list of PSIs, indication of UE support for ANDSP and the operating system identifier) and/or [UE Radio Capability ID]).

In response to the message received from the UE, the (R)AN may send an N2 message to an AMF. The N2 message may comprise N2 parameters and/or the registration request message received from the UE. In an example, the N2 parameters may comprise vehicle manufacturer name and/or vehicle model. In an example, the N2 parameters may comprise selected PLMN ID, location information and cell Identity related to the cell in which the UE is camping, In an example, the N2 parameters may comprise UE Context Request which indicates that a UE context including security information needs to be setup at the NG-RAN. In response to the message received from the (R)AN, the AMF may store the vehicle manufacturer name and/or vehicle model.

In an example, the UE may send to an AMF a NAS message comprising at least one of: S-NSSAI(s), DNN, PDU Session ID, Request type, or N1 SM container (PDU session establishment request). The UE may initiate a UE requested PDU session establishment procedure by the transmission of a NAS message comprising a PDU session establishment request message within the N1 SM container.

In an example, the NAS message may comprise the vehicle manufacturer name and/or vehicle model. In an example, the NAS message may comprise a vehicle parameter, and the vehicle parameter may comprise the vehicle manufacturer name and/or the vehicle model. In an example, the PDU session establishment request message may comprise the vehicle manufacturer name and/or vehicle model. In an example, the PDU session establishment request message may comprise a first parameter indicating a vehicle manufacturer name (VMN) and a second parameter indicating a vehicle model. In an example, the PDU session establishment request message may comprise a vehicle parameter, and the vehicle parameter may comprise the vehicle manufacturer name and/or the vehicle model. The PDU session establishment request message may comprise at least one of: a PDU session ID, Requested PDU Session Type, or a Requested SSC mode, etc. In response to the message received from the UE, the AMF may select an SMF and send to the SMF a message (e.g. PDUSession_CreateSMContext Request) comprising at least one of: UE identity of the vehicle terminal (e.g. SUPI, SUCI, 5G-GUTI or PEI), DNN, S-NSSAI(s) and/or network slice instance identifier(s), PDU Session ID, AMF ID, Request Type, PCF identifier, Priority Access, N1 SM container (PDU Session Establishment Request), User location information, Access Type). As an example, the PCF identifier may be an identifier, or an IP address, or FQDN to identify the PCF. In response to the message received from the AMF, the SMF may take one or more actions. In an example action, the SMF may send to the AMF a response message (e.g. PDUSession_CreateSMContext Response) comprising at least one of: Cause, SM Context ID or N1 SM container (PDU Session Reject (Cause)).

In an example action, if dynamic PCC is deployed and a PCF ID is provided by the AMF, the SMF may performs PCF selection procedure by selecting a PCF (e.g. based on the PCF identifier received). The SMF may send to the PCF a message (e.g. policy association establishment request) to establish a PDU session with the selected PCF and get PCC rule and/or charging control rule for the PDU Session and/or for the wireless device/vehicle terminal. The PDU session may be identified by the PDU Session ID. The policy association establishment request message may comprise the vehicle manufacturer name and/or the vehicle model for the wireless device/vehicle terminal. The policy association establishment request message may comprise at least one of: UE identity of the vehicle terminal (e.g. SUPI, SUCI, 5G-GUTI or PEI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF).

In response to the message received, the PCF may take one or more actions. In an example action, based on the vehicle manufacturer name and/or the vehicle model and/or subscription information and/or local policy, the PCF may make policy decision and may determine/generate/create/derive one or more PCC rules comprising one or more charging control rules, the one or more PCC rules and/or the one or more charging control rules may apply to at least one PDU session identified by a PDU session identifier, and/or at least one QoS flow identified by a QoS flow identifier (QFI), and/or at least one service data flow identified by at least one service data flow filter, and/or at least one application identified by an application identifier, and/or a wireless device identified by a UE identity, and/or a data network identified by a DNN, and/or a network slice identified by an S-NSSAI and/or a network slice instance identifier. For example, based on the vehicle manufacturer name and/or the vehicle model and/or the UE identity of the vehicle terminal and/or subscription information and/or local policy, the PCF may determine a PCC rule and/or a charging control rule, wherein the PCC rule and/or the charging control rule may comprise a service and bill payer information. The service and bill payer information may comprise at least one of: a first service type (e.g. web browsing); a first QoS policy for the first service type; a first charging policy (e.g. an online charging method, a first charging rate) for the first service type; a first bill payer (e.g. vehicle driver, the passenger in the vehicle) for the first service type; a second service type (e.g. vehicle remote diagnostics); a second QoS policy for the second service type; a second charging policy (e.g. an offline charging method, a second charging rate) for the second service type; a second bill payer (e.g. vehicle manufacturer) for the second service type. For example, the PCF may determine a PCC rule for BMW (vehicle manufacturer) X7 (vehicle model), and the PCC rule may comprise a first service type (e.g. web browsing); a first QoS policy (e.g. bandwidth of 10 Mbps) for the first service type; a first charging rate (e.g. $30 per month) for the first service type; a second service type (e.g. video on demand); a second QoS policy (e.g. bandwidth of 100 Mbps) for the second service type; a second charging rate (e.g. $100 per month) for the second service type; a first bill payer (e.g. vehicle owner) for the first service type and/or the second service type; a third service type (e.g. vehicle remote maintenance); a third QoS policy (e.g. bandwidth of 5 Mbps) for the third service type; a third charging rate (e.g. $10 per month) for the third service type; a second bill payer (e.g. BMW). In an example action, the PCF may send to the SMF a response message (e.g. policy association establishment response), the policy association establishment response message may comprise the one or more PCC rules and/or the one or more charging control rules, and the one or more PCC rules and/or the one or more charging control rules may comprise the service and bill payer information.

In response to the message received from the PCF, the SMF may take one or more actions. In an example action, the SMF may select a CHF based on the vehicle manufacturer name and/or the vehicle model, for example, the SMF may select a CHF specifically for the vehicle terminals. In an example action, the SMF may send to the CHF a message (e.g. charging data request). The charging data request message may comprise the vehicle manufacturer name and/or the vehicle model. The charging data request message may comprise the UE identity of the vehicle terminal (e.g. SUPI, SUCI, 5G-GUTI or PEI). The charging data request message may comprise the PDU session ID. The charging data request message may indicate different service for different bill payer by comprising the service and bill payer information. The service and bill payer information may be for the PDU session and/or the wireless device/vehicle terminal. In response to the message received from the SMF, based on service and bill payer information and/or the vehicle manufacturer name and/or the vehicle model and/or the UE identity of the vehicle terminal, the CHF may determine quota (e.g. volume quota, time quota) for the wireless device/vehicle terminal per service type per bill payer. The determined quota may be for the PDU session.

The determined quota may be for a QoS flow. For example, the CHF may determine a first volume quota and/or a first time quota for the wireless device/vehicle terminal and/or for the first service type and/or for the first bill payer. For example, the CHF may determine a second volume quota and/or a second time quota for the wireless device/vehicle terminal and/or for the second service type and/or for the second bill payer. The CHF may send to the SMF a response message (e.g. charging data response). The charging data response message may comprise the determined quota (e.g. the first volume quota and/or the first time quota, and/or the second volume quota and/or the second time quota).

In response to the message received from the CHF, the SMF may enforce the determined quota (e.g. received from the CHF) and/or the one or more PCC rules and/or the one or more charging control rules (e.g. received from the PCF). For example, based on the vehicle manufacturer name and/or the vehicle model and/or the UE identity of the vehicle terminal, the SMF may select a UPF for wireless device/vehicle terminal. In an example action, based on the determined quota received from the CHF, and/or based on the one or more PCC rule and/or one or more charging control rule, the SMF may determine at least one user plane rule for the PDU session and/or the wireless device/vehicle terminal. The at least one user plane rule may comprise: at least one packet detection rule; at least one forwarding action rule; at least one QoS enforcement rule; or at least one usage reporting rule. For example, the SMF may determine the at least one packet detection rule based on the service and bill payer information. For example, the at least one packet detection rule may be associated with a service type (e.g. the first service type). For example, based on the determined quota, the SMF may determine the at least one usage reporting rule associated with the at least one packet detection rule, wherein the usage reporting rule may comprise quota threshold (e.g. volume threshold, time threshold) and/or event (e.g. service stop) and/or trigger (e.g. every midnight) to report the usage.

In an example, the SMF may determine/keep mapping information in a mapping table for the wireless device/vehicle terminal (e.g. identified by the UE identity of the vehicle terminal). The mapping table may comprise the mapping information between the wireless device/vehicle terminal, and/or associated service type for the wireless device/vehicle terminal, and/or the associated bill payer information for the wireless device/vehicle terminal, and/or the associated at least one user plane rule for the wireless device/vehicle terminal, and/or the associated vehicle manufacturer name for the wireless device/vehicle terminal, and/or the associated vehicle model for the wireless device/vehicle terminal, and/or the associated PCC rule for the wireless device/vehicle terminal, and/or associated charging control rule for the wireless device/vehicle terminal, and/or associated PDU session for the wireless device/vehicle terminal. For example, the mapping table may comprise vehicle terminal 1 associated with a first service type (web browsing), and/or associated with the first bill payer (vehicle owner), and/or associated with the first user plane rule, and/or associated with Mercedes-Benz (vehicle manufacturer) GLE SUV (vehicle model), and/or associated with PCC rule 1, and/or associated with charging control rule 1, and/or associated with PDU session 1. For example, the mapping table may comprise a vehicle terminal 1 associated with a second service type (remote car maintenance), and/or associated with the second bill payer (vehicle manufacturer), and/or associated with the second user plane rule, and/or associated with Mercedes-Benz (vehicle manufacturer) GLE SUV (vehicle model), and/or associated with vehicle terminal 1, and/or associated with PCC rule 2, and/or associated with charging control rule 2, and/or associated with PDU session 1.

In an example action, the SMF may send to the UPF a message (e.g. N4 session establishment/modification request). The N4 session establishment/modification request message may comprise the at least one user plane rule and/or the UE identity of the vehicle terminal.

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), for example, the data/traffic packets may match the first service type, or the second service type. The UPF may apply other user plane rules (e.g. usage reporting rule) to the data/traffic packets matched the packet detection rule (e.g. the first service type, or the second service type).

In an example, the UPF may enforce the at least one usage reporting rule by measuring network resources usage in terms of traffic data volume, duration (e.g. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (e.g. time) and/or the UE identity of the vehicle terminal. For example, the traffic data volume, duration (e.g. time) may be applied to at least one of: the first service type, the second service type, the wireless device/vehicle terminal, the PDU session, a QoS flow, a service data flow, an application, a network slice, or a data network.

Based on the mapping information in the mapping table, the SMF may map the received network resources usage to the service type (e.g. first service type, the second service type) and/or the bill payer (e.g. the first bill payer, the second bill payer) and/or PDU session and/or network slice and/or the wireless device/vehicle terminal. The SMF may map the received network resource usage to the wireless device/vehicle terminal and/or associated vehicle manufacturer name and/or manufacturer model. In an example, the SMF may send to the CHF a message (e.g. charging data request [update]) comprising a CDR and/or associated wireless device/vehicle terminal and/or associated vehicle manufacturer name and/or manufacturer model. The CDR may comprise the network resources usage per service type per bill payer. For example, the CDR may comprise a first volume usage and/or a first time usage for the first service type and/or for the first bill payer. For example, the CDR may comprise a second volume usage and/or a second time usage for the second service type and/or for the second bill payer.

In an example, the SMF may send to the CHF a message (e.g. charging data request [update]) comprising one or more CDRs and/or associated wireless device/vehicle terminal and/or associated vehicle manufacturer name and/or manufacturer model. For example, the charging data request may comprise a first CDR and/or a second CDR. The first CDR may comprise the network resources usage for the first service type and/or for the first bill payer. For example, the first CDR may comprise a first volume usage and/or a first time usage for the first service type and/or for the first bill payer. For example, the second CDR may comprise the network resources usage for the second service type and/or for the second bill payer. For example, the second CDR may comprise a second volume usage and/or a second time usage for the second service type and/or for the second bill payer.

In response to the message received from the SMF, the CHF may take one or more actions. In an example action, the CHF may receive a CDR from the SMF, and the CDR may comprise network resources usage for one or more service types (e.g. the CDR may comprise a first volume/time usage for the first service type and/or a second volume/time usage for the second service type). Based on the UE identity of the vehicle terminal and/or vehicle manufacturer name and/or manufacturer model, the CHF may map the network resources usage of the one or more service types to one or more bill payers. For example, the CHF may map the first service type (e.g. web browsing) to the first bill payer (e.g. vehicle driver, the passenger in the vehicle). For example, the CHF may map the second service type (e.g. vehicle remote diagnostics) to the second bill payer (e.g. vehicle manufacturer).

In an example action, the CHF may receive a one or more CDRs (e.g. a first CDR and/or a second CDR) from the SMF, and the one or more CDRs may comprise network resources usage for one or more service types (e.g. a first service type and/or a second service type). For example, the first CDR may comprise a first volume/time usage for the first service type, and the second CDR may comprise a second volume/time usage for the second service type. In an example action, based on UE identity of the vehicle terminal and/or vehicle manufacturer name and/or manufacturer model, the CHF may map CDRs to bill payers. For example, the CHF may map the first CDR to a first bill payer (e.g. vehicle driver, the passenger in the vehicle). For example, the CHF may map the second CDR to a second bill payer (e.g. vehicle manufacturer).

In an example action, the CHF may send to a BD a message (e.g. CDR file message). The CDR file message may comprise the CDR and associated bill payer information. In an example, the CDR file message may comprise a CDR, wherein the CDR may comprise a first service type (e.g. web browsing), a first bill payer (e.g. vehicle driver, the passenger in the vehicle) for the first service type, a second service type (e.g. vehicle remote diagnostics), and/or a second bill payer (e.g. vehicle manufacturer) for the second service type. In an example, the CDR file message may comprise one or more CDRs (e.g. a first CDR and/or a second CDR) and/or associated bill payers (e.g. a first bill payer and/or a second bill payer). For example, the CDR file message may comprise a first CDR, a first bill payer for the first CDR, a second CDR, and/or a second bill payer for the second CDR.

In response to the message received from the CHF, the BD may perform the charging/accounting for bill payer based on the service type (e.g. the first bill payer pays for the first service, the second bill payer pays for the second service). The BD may perform the charging/accounting for bill payer based on the CDR (e.g. the first bill payer pays for the first CDR, the second bill payer pays for the second CDR).

Figure 28:
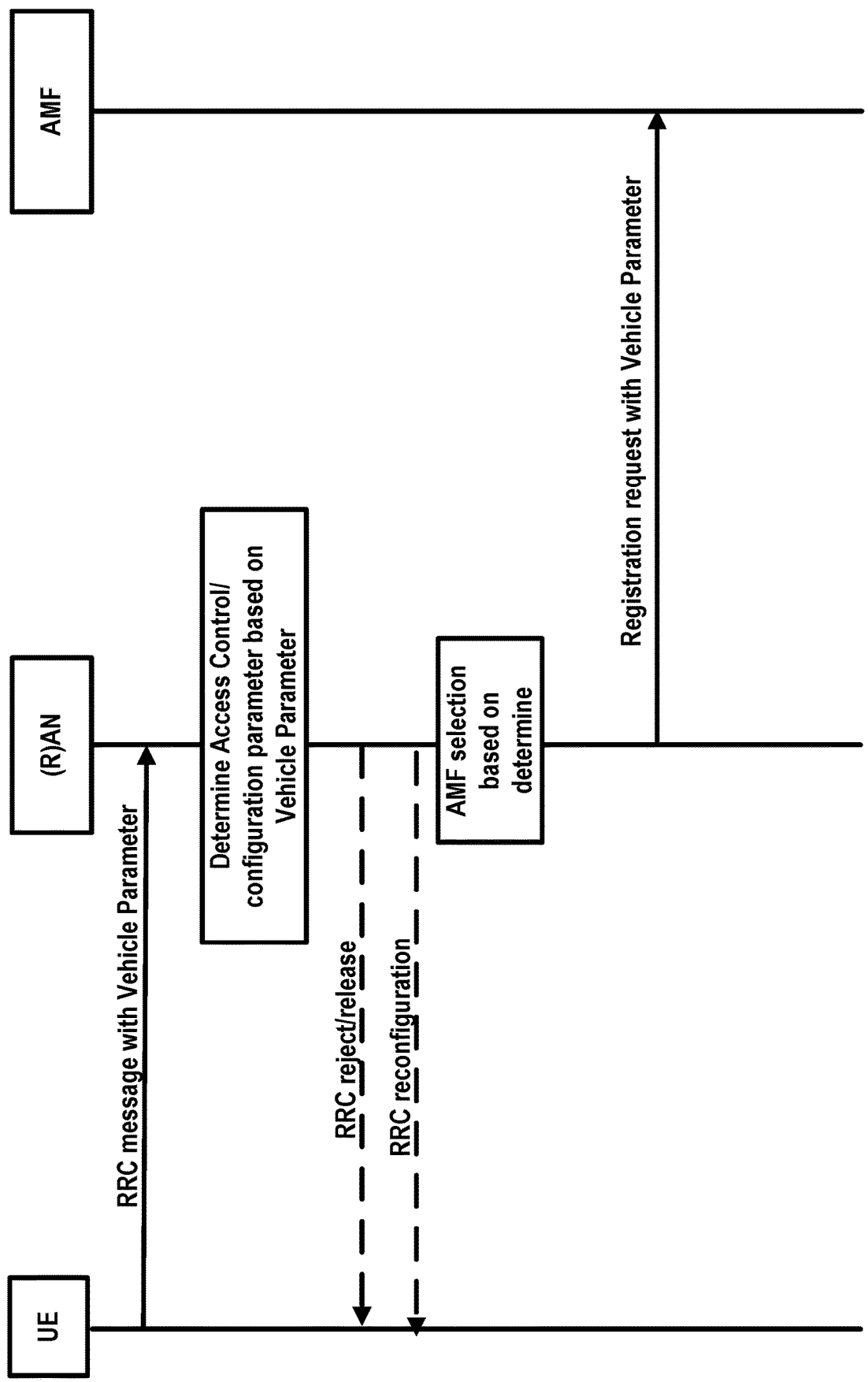
FIG. 28 is a call flow diagram illustrating an aspect of an example embodiment of the present disclosure.

FIG. 28 shows an example call flow which comprises one or more actions. In an example, a UE may send to a (R)AN RRC message. For example, the RRC message may be a RRCSetupRequest message. For example, the RRC message may be a RRCConnectionSetupComplete message. For example, the RRC message may be a RRC UE assistance information message and/or RRC UE Capability information message. The RRC message may comprise a parameter indicating vehicle parameter. In an example, the vehicle parameter may comprise a vehicle identification number (VIN). For example, the vehicle parameter may comprise a complete VIN. For example, the vehicle parameter may comprise a complete VIN, being determined based on a VIN, or part of VIN, e.g. world manufacturer identifier, vehicle descriptor section, vehicle identifier section, plant code, and/or production number. In an example, the UE identity of the vehicle terminal (e.g. 5G-S-TMSI, PEI) may comprise the VIN or part of VIN (e.g. world manufacturer identifier). For example, in the RRCSetupRequest message, a ue-Identity (e.g. ng-5G-S-TMSI-Part1) may comprise the VIN or part of VIN (e.g. world manufacturer identifier, and/or the like). For example, in the RRCConnectionSetupComplete message, the ng-5G-S-TMSI-Value may comprise part of VIN, e.g. world manufacturer identifier. FIG. 29 is a diagram depicting an example RRCSetupComplete message. The RRCSetupComplete message may comprise an information element/parameter indicating vehicle parameter, and the vehicle parameter may comprise par of VIN e.g. world manufacturer identifier, plant code. For example, an RRC UE assistance information message may comprise a vehicle parameter determined based on a VIN of a vehicle. For example, an RRC UE Capability information message may comprise a vehicle parameter determined based on a VIN of a vehicle. Multiple examples of the vehicle parameters are described in this specification.

In response to the message received from the UE and based on the vehicle parameter and/or local configuration, the (R)AN may determine/perform access control for the wireless device/vehicle terminal. In an example, vehicle terminals may comprise a plurality of a first type of vehicles and a plurality of a second type of vehicles. The first type of vehicles may have higher priority than the second type of vehicles. In an example, the first type of vehicles may have different type of services compared with services of the second type of vehicles. For example, the (R)AN may not allow some wireless devices/vehicle terminals (e.g. low-end car, second type of vehicle) access to the network in some conditions (e.g. network congestion, hot spot area, rush hour) to guarantee other high priority wireless device/vehicle terminal (e.g. high-end car, first type of vehicle). In an example, different vehicles of the first type may have different services. The network may allow some services to one or more first vehicles of the first type of vehicles and may not allow the services to one or more second vehicles of the first type. In an example, the (R)AN may not allow the UE access the network based on the determining, and the (R)AN may send to the UE a RRC reject message and/or a RRC release message indicating accessing to the network is not allowed. In an example, the (R)AN may allow the UE access to the network based on the determining, and the (R)AN may select an AMF based on the vehicle parameter, e.g. selecting an AMF specially for the vehicle terminals. The (R)AN may send to the AMF a registration request message comprising the vehicle parameter.

For example, a wireless device may transmit an RRC message comprising vehicle parameter to the base station. The RRC message may comprise RRC UE assistance information message and/or RRC UE Capability information message. In response to the message received from the UE and based on the vehicle parameter and/or local configuration, the (R)AN may transmit one or more RRC message comprising configuration parameters for the wireless device. The configuration parameters may be determined based on the vehicle parameter. In an example, RRC message may comprise configuration parameters for configured grant (e.g. periodic resource allocation) at least based on vehicle parameter. For example, a first type of vehicle may require a first configuration (e.g. periodicity) for configured grant and a second type of vehicle may require a second configuration (e.g. periodicity) for configured grant. In an example, RRC message may comprise different positioning configuration parameter based on the vehicle parameter. In an example, RRC message may configure different uplink channel resources based on the vehicle parameter. For example, a vehicle speed parameter may be determined based on the vehicle parameter, and channel and configuration parameter may be configured based on the vehicle speed parameter.

Figure 30:
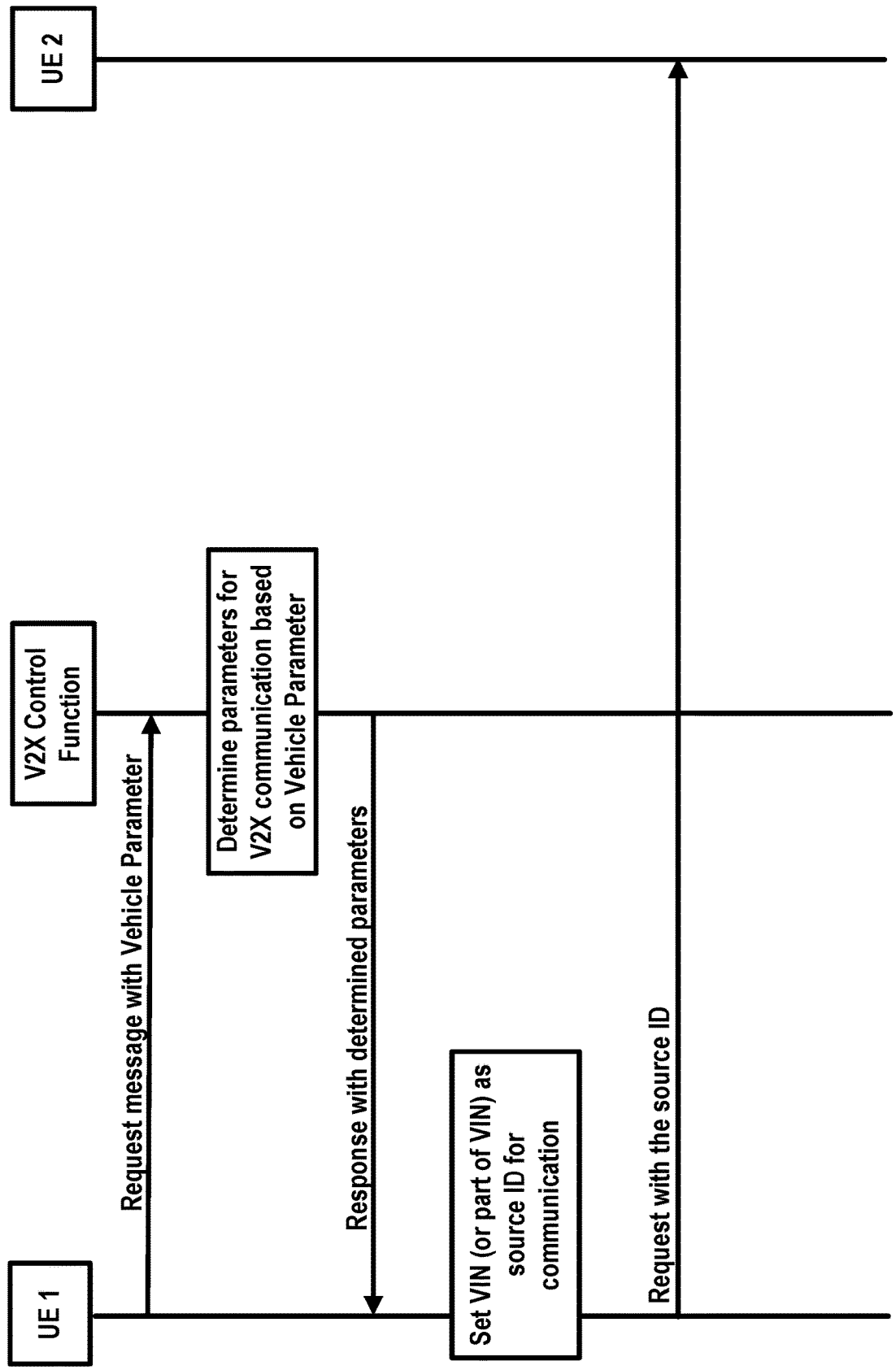
FIG. 30 is a call flow diagram as per an aspect of an example embodiment of the present disclosure.

FIG. 30 shows an example call flow which may comprise one or more actions. In an example, a first UE may send to a V2X control function a first message, the first message may comprise a vehicle parameter. In an example, the first message may comprise UE identity of the vehicle terminal (e.g. 5G-S-TMSI, PEI, and/or the like). In an example, the vehicle parameter may comprise a vehicle identification number (VIN). For example, the vehicle parameter may comprise a complete VIN. For example, the vehicle parameter may comprise part of VIN, e.g. world manufacturer identifier, vehicle descriptor section, vehicle identifier section, plant code, and/or production number. In an example, the UE identity of the vehicle terminal (e.g. 5G-S-TMSI, PEI) may comprise the VIN or part of VIN (e.g. world manufacturer identifier). In response to the message received from the first UE, based on the vehicle parameter and/or local configuration, the V2X control function may determine a parameter for V2X communication. For example, the parameter may comprise a destination layer-2 ID. For example, the parameter may comprise one or more radio resource parameter. For example, the parameter may comprise V2X application server address information. For example, the parameter may comprise mapping information between service type and V2X frequency. In an example, the V2X control function may send a response message to the first UE, the response message may comprise the parameter for V2X communication. In response to the response message and based on the parameter for V2X communication, the first UE may determine a source layer-2 ID for PC5 communication, wherein the source layer-2 ID may comprise the vehicle parameter (e.g. VIN). The first UE may send to a second UE a PC5 message, the PC5 message may comprise the source layer-2 ID.

In an example, a session management function (SMF) may receive a first message from a wireless device via an access and mobility management function (AMF). The first message may request establishment of a packet data unit (PDU) session of the wireless device, the first message may comprise a vehicle parameter. In an example, based on the vehicle parameter, the SMF may determine one or more charging parameters. In an example, the SMF may send to a charging function (CHF) a charging request message. The charging request message may comprise the charging parameters. In an example, the vehicle parameter may be based on a Vehicle Identification Number (VIN) of a vehicle. In an example, the vehicle parameter may indicate a vehicle manufacturer name (VMN) and/or a second parameter may indicate a vehicle model. In an example, the vehicle parameter may comprise a part of the VIN of the vehicle. In an example, the one or more charging parameters may comprise service and bill payer information. The service and bill payer information may comprise a first service type and/or a first bill payer for the first service type. In an example, the service and bill payer information may comprise a second service type and/or a second bill payer for the second service type. In an example, the determining may comprise determining policy and charging rules, and the policy and charging rules may comprise the one or more charging parameters.

In an example, the AMF may receive from the wireless device a registration request message comprising the vehicle parameter. In an example, the AMF may receive from the wireless device a PDU session establishment request message, the PDU session establishment request message may comprise the vehicle parameter. In an example, the SMF may send to a network function a subscription request message comprising the vehicle parameter. In an example, based on the vehicle parameter, the network function may determine a vehicle manufacturer name (VMN) and/or a vehicle model. In an example, based on the vehicle parameter, the network function may determine subscription service and bill payer information. In an example, the network function may send to the SMF a subscription response message. The subscription response message may comprise the vehicle manufacturer name (VMN) and/or the vehicle model. In an example, the subscription response message may comprise the service and bill payer information. In an example, based on the VMN and/or the vehicle model, the SMF may determine a policy and charging control (PCC) rule, the PCC rule may comprise the one or more charging parameters, and the one or more charging parameters may comprise service and bill payer information. In an example, the determining may be based on the subscription service and bill payer information. In an example, the SMF may send to the CHF a charging data request message, the charging data request message may comprise the vehicle parameter, a vehicle manufacturer name (VMN) and/or a vehicle model. In an example, based on the vehicle parameter, vehicle manufacturer name (VMN) and/or the vehicle model, the CHF may determine a quota for the wireless device. In an example, the CHF may send the determined quota to the SMF.

In an example, the vehicle parameter may comprise a vehicle identification numbers (VIN). In an example, the vehicle parameter may comprise a UE identity of the wireless device. The UE identity may comprise a subscription permanent identifier (SUPI). The UE identity may comprise a subscription concealed identifier (SUCI). The UE identity may comprise a permanent equipment identifier (PEI). The UE identity may comprise a generic public subscription identifier (GPSI). The UE identity may comprise a 5G globally unique temporary identifier (5G-GUTI). The UE identity may comprise a 5G S-Temporary Mobile Subscription Identifier (5G-S-TMSI). The UE identity may comprise a source layer-2 ID. In an example, the UE identity may comprise user biometric information. The user biometric information may comprise finger-print information. The user biometric information may comprise face recognition information. The user biometric information may comprise voice recognition information.

In an example, the SMF may receive from a UPF a first network resources usage for the first service type. In an example, the SMF may receive from a UPF a second network resources usage for the second service type. In an example, based on the first service type, the SMF may map the first network resources usage to the first bill payer. In an example, based on the second service type, the SMF may map the second network resources usage to the second bill payer. In an example, the SMF may send a CDR to the CHF. The CDR may comprise the first service type. The CDR may comprise the first bill payer for the first service type. The CDR may comprise the first network resources usage for the first service type. The CDR may comprise the second service type. The CDR may comprise the second bill payer for the second service type. The CDR may comprise the second network resources usage for the second service type. In an example, the SMF may determine a mapping table for the wireless device. The mapping table may comprise at least one of: UE identity of the wireless device; associated service type for the wireless device; associated bill payer information for the wireless device; associated at least one user plane rule for the wireless device; associated vehicle manufacturer name for the wireless device; associated vehicle model for the wireless device; associated PCC rule for the wireless device; associated charging control rule for the wireless device; or associated PDU session for the wireless device.

In an example, a charging function (CHF) may receive from a session management function (SMF) a charging request message. The charging request message may comprise a UE identity of a UE and/or a first charging data records (CDR) for the UE, and the first CDR may comprises a first service type. The charging request message may comprise a second CDR for the UE, and/or a second CDR. The second CDR may comprise a second service type. In an example, based on UE identity and/or the first service type and/or the second service type, the CHF may map the first CDR to a first bill payer. In an example, based on UE identity and/or the first service type and/or the second service type, the CHF may map the second CDR to a second bill payer. In an example, CHF may send to a billing domain a CDR file request message. The CDR file request message may comprise the first CDR and an identifier of the first bill payer. The CDR file request message may comprise the second CDR and an identifier of the second bill payer. In an example, the first bill payer is a vehicle driver. In an example, the second bill payer is a vehicle manufacturer. In an example, first CDR may comprise a first usage information for the first service type. In an example, the second CDR may comprise a second usage information for the second service type.

In an example, a session management function (SMF) may receive from a wireless device via an access and mobility management function (AMF), a first message requesting establishment of a packet data unit (PDU) session of the wireless device. The first message may comprise a parameter indicating vehicle parameter. In an example, the SMF may receive from a network function a second message. The second message may comprise a vehicle manufacturer name (VMN) mapped from the vehicle parameter. In an example, the SMF may send to a policy control function (PCF) a policy request message comprising the VMN and the vehicle parameter. In an example, the SMF may receive from the PCF a policy and charging control (PCC) rule determined based on the VMN and the vehicle parameter. The PCC rule may comprise service and bill payer information. The service and bill payer information may comprise a first service type. The service and bill payer information may comprise a first bill payer for the first service type. The service and bill payer information may comprise a second service type. The service and bill payer information may comprise a second bill payer for the second service type. In an example, the SMF may send to a charging function (CHF) a charging request message comprising the service and bill payer information.

In an example, a packet data network gateway (PGW) may receive from a wireless device via a serving gateway (SGW), a first message requesting establishment of an internet protocol connectivity access network (IP-CAN) session of the wireless device. The first message may comprise a parameter indicating vehicle parameter. In an example, the PGW may receive from a network function, a second message comprising a vehicle manufacturer name (VMN) mapped from the vehicle parameter. In an example, the PGW may send to a policy and charging rules function (PCF), a policy request message comprising the VMN and the vehicle parameter. In an example, the PGW may receive from the PCRF, a policy and charging control (PCC) rule determined based on the VMN and the vehicle parameter. The PCC rule may comprise service and bill payer information. The service and bill payer information may comprise a first service type. The service and bill payer information may comprise a first bill payer for the first service type. The service and bill payer information may comprise a second service type. The service and bill payer information may comprise a second bill payer for the second service type. In an example, the PGW may send to an offline charging system (OFCS), a charging request message comprising the service and bill payer information.

In an example, an offline charging system (OFCS) may receive from a packet data network gateway (PGW) a charging request message. The charging request message may comprise a UE identity of a UE. The charging request message may comprise a first charging data records (CDR) for the UE, and the first CDR may comprise a first service type. The charging request message may comprise a second CDR for the UE, and the second CDR may comprise a second service type. In an example, based on UE identity and/or the first service type and/or the second service type, the OFCS may map the first CDR to a first bill payer. The OFCS may map the second CDR to a second bill payer. In an example, the OFCS may send to a billing domain a CDR file request message. The CDR file request message may comprise the first CDR and an identifier of the first bill payer. The CDR file request message may comprise the second CDR and an identifier of the second bill payer.

In an example, a session management function (SMF) may receive from a wireless device via an access and mobility management function (AMF), a first message requesting establishment of a packet data unit (PDU) session of the wireless device. The first message may comprise a first parameter indicating a vehicle manufacturer name (VMN) and a second parameter indicating a vehicle model. In an example, the SMF may send to a policy control function (PCF), a policy request message comprising the VMN and the vehicle model. In an example, the SMF may receive from the PCF, a policy and charging control (PCC) rule determined based on the VMN and the vehicle model. The PCC rule comprises service and bill payer information. The service and bill payer information may comprise a first service type. The service and bill payer information may comprise a first bill payer for the first service type. The service and bill payer information may comprise a second service type. The service and bill payer information may comprise a second bill payer for the second service type. In an example, the SMF may send to a charging function (CHF) a charging request message comprising the service and bill payer information.

In an example, a base station may receive from a wireless device, a radio resource control (RRC) message comprising vehicle parameter. In an example, based on the vehicle parameter, the base station may determine access control for the wireless device. In an example, based on the determining, the base station may select an access and mobility management function (AMF). In an example, the base station may send to the AMF a registration request message comprising the vehicle parameter. In an example, the vehicle parameter may comprise a vehicle identification numbers (VIN).

In an example, a first wireless device may send to a vehicle-to-everything (V2X) control function, a first message comprising a vehicle parameter. In an example, the first wireless device may receive from the V2X control function, a second message comprising a parameter for V2X communication. The parameter may be determined based on the vehicle parameter. In an example, based on the parameter, the first wireless device may determine source layer-2 ID for PC5 communication. The source layer-2 ID may comprise the vehicle parameter. In an example, the first wireless device may send to a second wireless device a third message comprising the source layer-2 ID. In an example, the parameter may comprise a destination layer-2 ID. In an example, the parameter may comprise one or more radio resource parameter. In an example, the parameter may comprise V2X application server address information. In an example, the parameter may comprise mapping information between service type and V2X frequency.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

A session management function (SMF) may receive, from a wireless device, a first message requesting establishment of a packet data unit (PDU) session of the wireless device. The first message may comprise a vehicle parameter indicating a vehicle type. The SMF may determine, based on the vehicle parameter, one or more charging parameters. The SMF may send, to a charging function (CHF), a charging request message comprising the one or more charging parameters.

According to an example embodiment, the vehicle parameter may be based on a Vehicle Identification Number (VIN) of a vehicle. According to an example embodiment, the vehicle parameter may indicate a vehicle manufacturer name (VMN). According to an example embodiment, the vehicle parameter may indicate a vehicle model.

According to an example embodiment, the one or more charging parameters may comprise service and bill payer information. According to an example embodiment, the service and bill payer information may comprise a first service type. According to an example embodiment, the service and bill payer information may comprise a first bill payer for the first service type. According to an example embodiment, the service and bill payer information may comprise a second service type. According to an example embodiment, the service and bill payer information may comprise a second bill payer for the second service type.

According to an example embodiment, the determination may further comprise determining policy and charging rules. The policy and charging rules may comprise the one or more charging parameters.

According to an example embodiment, the SMF may receive, from a network function, a subscription response message comprising the vehicle parameter. According to an example embodiment, the SMF may receive, from a network function, a subscription response message comprising a VMN. According to an example embodiment, the SMF may receive, from a network function, a subscription response message comprising a vehicle model.

According to an example embodiment, the SMF may determine a policy and charging control (PCC) rule, based on the VMN or the vehicle model. According to an example embodiment, the PCC rule may comprise the one or more charging parameters. According to an example embodiment, the one or more charging parameters may comprise service and bill payer information.

According to an example embodiment, the SMF may send a charging data request to the CHF. According to an example embodiment, the charging data request may comprise the vehicle parameter. According to an example embodiment, the charging data request may comprise the VMN. According to an example embodiment, the charging data request may comprise the vehicle model.

According to an example embodiment, the CHF may determine a quota for the wireless device based on the vehicle parameter. According to an example embodiment, the CHF may determine a quota for the wireless device based on the VMN. According to an example embodiment, the CHF may determine a quota for the wireless device based on the vehicle model. According to an example embodiment, the CHF may send, to the SMF, the quota.

According to an example embodiment, the SMF may send, to the CHF, a CDR comprising a first service type. According to an example embodiment, the SMF may send, to the CHF, a CDR comprising a first bill payer for the first service type. According to an example embodiment, the SMF may send, to the CHF, a CDR comprising a first network resources usage for the first service type. According to an example embodiment, the SMF may send, to the CHF, a CDR comprising a second service type. According to an example embodiment, the SMF may send, to the CHF, a CDR comprising a second bill payer for the second service type. According to an example embodiment, the SMF may send, to the CHF, a CDR comprising a second network resources usage for the second service type.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   sending, by a wireless device of a vehicle, to an access and mobility function (AMF), a registration request message requesting registration of the wireless device, the registration request message comprising a wireless device identity of the wireless device;
   sending, by the wireless device of the vehicle, to a session management function (SMF), a message requesting establishment of a packet data unit (PDU) session of the wireless device, wherein:
   the message comprises an information element indicating a vehicle parameter comprising a vehicle identity of the vehicle;
   the vehicle identity is different from the wireless device identity;
   the message comprises a requested PDU session type indicating that the PDU session is for service of the vehicle; and
   the vehicle identity is derivable from the wireless device identity based on the information element; and
   receiving, by the wireless device from the SMF, a response message for establishment of the PDU session.

2. The method of claim 1, wherein the vehicle identity is based on a Vehicle Identification Number (VIN) of the vehicle.

3. The method of claim 2, wherein the VIN comprises at least one of:
   a world manufacturer identifier;
   a vehicle descriptor section;
   a vehicle identifier section;
   a plant code; or
   a production number.

4. The method of claim 1, wherein the vehicle identity indicates a vehicle manufacturer name (VMN).

5. The method of claim 1, wherein the vehicle identity indicates a vehicle model.

6. The method of claim 1, wherein the registration request message comprises the vehicle identity of the vehicle.

7. The method of claim 1, wherein the wireless device identity of the wireless device comprises at least one of:
   a globally unique 5G Subscription Permanent Identifier (SUPI);
   a Generic Public Subscription Identifier (GPSI);
   a 5G globally unique temporary identifier (5G-GUTI); or
   a permanent equipment identifier (PEI).

8. The method of claim 1, wherein the message requesting establishment of the PDU session is a non-access stratum (NAS) message.

9. The method of claim 1, wherein the message requesting establishment of the PDU session comprises a PDU session identifier.

10. The method of claim 1, further comprising:
    sending a request message with the vehicle parameter to a vehicle to everything (V2X) control function; and
    receiving, from the V2X control function, a parameter of V2X communication based on the vehicle parameter.

11. A wireless device of a vehicle comprising:
    one or more processors; and
    memory storing instructions that, when executed by the one or more processors, cause the wireless device to:
        send, to an access and mobility function (AMF), a registration request message requesting registration of the wireless device, the registration request message comprising a wireless device identity of the wireless device;
        send, to a session management function (SMF), a message requesting establishment of a packet data unit (PDU) session of the wireless device, wherein:
            the message comprises an information element indicating a vehicle identity of the vehicle;
            the vehicle identity is different from the wireless device identity;
            the message comprises a requested PDU session type indicating that the PDU session is for service of the vehicle; and
            the vehicle identity is derivable from the wireless device identity based on the information element; and
        receive, from the SMF, a response message for establishment of the PDU session.

12. The wireless device of claim 11, wherein the vehicle identity is based on a Vehicle Identification Number (VIN) the vehicle.

13. The wireless device of claim 12, wherein the VIN comprises at least one of:
    a world manufacturer identifier;
    a vehicle descriptor section;
    a vehicle identifier section;
    a plant code; or
    a production number.

14. The wireless device of claim 11, wherein the vehicle identity indicates a vehicle manufacturer name (VMN).

15. The wireless device of claim 11, wherein the vehicle identity indicates a vehicle model.

16. The wireless device of claim 11, wherein the registration request message comprises the vehicle identity of the vehicle.

17. The wireless device of claim 11, wherein the message requesting establishment of the PDU session is a non-access stratum (NAS) message.

18. The wireless device of claim 11, wherein the message requesting establishment of the PDU session comprises at least one of:
    a PDU session identifier; and
    the requested PDU session type.

19. A system comprising:
    a vehicle; and
    a wireless device of the vehicle comprising:
        one or more first processors; and
        memory storing first instructions that, when executed by the one or more first processors, cause the wireless device to:
            send, to an access and mobility function (AMF), a registration request message requesting registration of the wireless device, the registration request message comprising a wireless device identity of the wireless device;
    send, to a session management function (SMF), a message requesting establishment of a packet data unit (PDU) session of the wireless device, wherein
        the message comprises an information element indicating a vehicle identity of the vehicle;
        the vehicle identity is different from the wireless device identity;
        the message comprises a requested PDU session type indicating that the PDU session is for service of the vehicle; and
        the vehicle identity is derivable from the wireless device identity based on the information element; and
    receive, from the SMF, a response message for establishment of the PDU session.

20. The system of claim 19, wherein the vehicle identity:
    is based on a Vehicle Identification Number (VIN) of the vehicle;
    indicates a vehicle manufacturer name (VMN);
    indicates a vehicle model; or
    a combination thereof.

* * * * *